United States Patent
Hasegawa et al.

(10) Patent No.: US 6,643,107 B1
(45) Date of Patent: Nov. 4, 2003

(54) SPIN VALVE THIN FILM MAGNETIC ELEMENT AND METHOD OF MANUFACTURING THE SAME

(75) Inventors: Naoya Hasegawa, Niigata-ken (JP); Kiyoshi Sato, Niigata-ken (JP); Kenji Honda, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 254 days.

(21) Appl. No.: 09/679,724

(22) Filed: Oct. 4, 2000

(30) Foreign Application Priority Data

Oct. 5, 1999 (JP) .......................... 11-284896

(51) Int. Cl.$^7$ ................................. G11B 5/39
(52) U.S. Cl. .................. 360/324.1; 360/324.12; 360/322
(58) Field of Search .............. 360/324.1, 324.11, 360/324.12, 324.2, 322

(56) References Cited

U.S. PATENT DOCUMENTS

| | | | |
|---|---|---|---|
| 5,422,571 A | 6/1995 | Gurney et al. | 324/252 |
| 5,880,911 A | 3/1999 | Ishihara et al. | 324/252 |
| 5,991,125 A * | 11/1999 | Iwasaki et al. | 360/324.12 |
| 6,040,961 A * | 3/2000 | Gill | 360/324.11 |
| 6,208,491 B1 * | 3/2001 | Pinarbasi | 360/324.1 |
| 6,266,218 B1 * | 7/2001 | Carey et al. | 360/324.12 |
| 6,268,985 B1 * | 7/2001 | Pinarbasi | 360/324.12 |
| 6,317,298 B1 * | 11/2001 | Gill | 360/324.11 |
| 6,434,814 B1 * | 8/2002 | Chang et al. | 29/603.14 |
| 6,495,275 B2 * | 12/2002 | Kamiguchi et al. | 428/692 |

* cited by examiner

*Primary Examiner*—Jefferson Evans
(74) *Attorney, Agent, or Firm*—Brinks Hofer Gilson & Lione

(57) ABSTRACT

The invention provides a spin valve thin film element in which output characteristics and the stability of reproduced waveforms are improved, asymmetry is decreased, and the occurrence of side reading is prevented. The spin valve thin film element includes a lamination having an antiferromagnetic layer, a first pinned magnetic layer, a nonmagnetic intermediate layer, a second pinned magnetic layer, a nonmagnetic conductive layer, a free magnetic layer, and a backed layer composed of a nonmagnetic conductive material, which are laminated on a substrate. Hard bias layers are formed on both sides of the lamination, and orient the magnetization direction of the free magnetic layer in the direction crossing the magnetization direction of the second pinned magnetic layer. Electrode layers are formed on the hard bias layers to supply a sensing current J to the lamination. The electrode layers are formed to extend to the surface of the lamination toward the central portion from both sides of the lamination.

65 Claims, 32 Drawing Sheets

FIG. 20
(a)
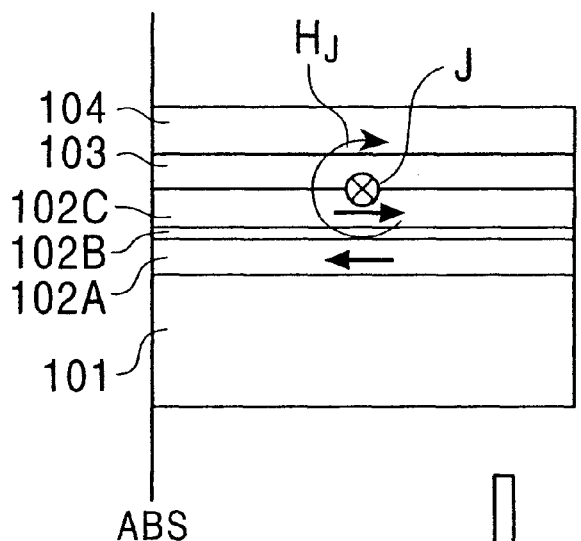
(b)  (c)
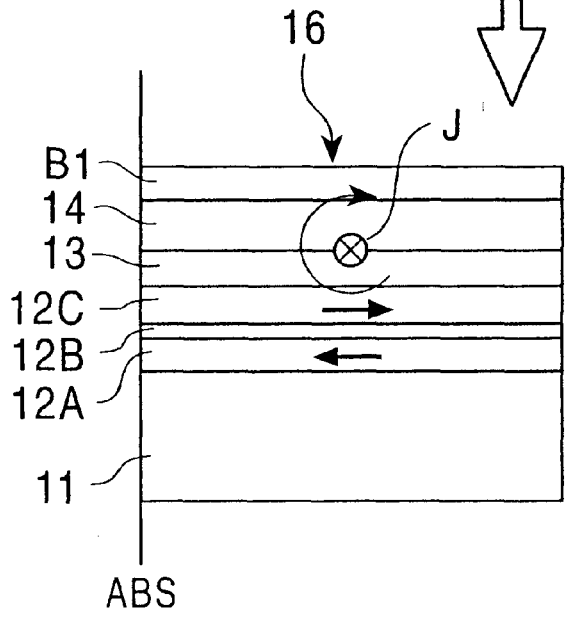 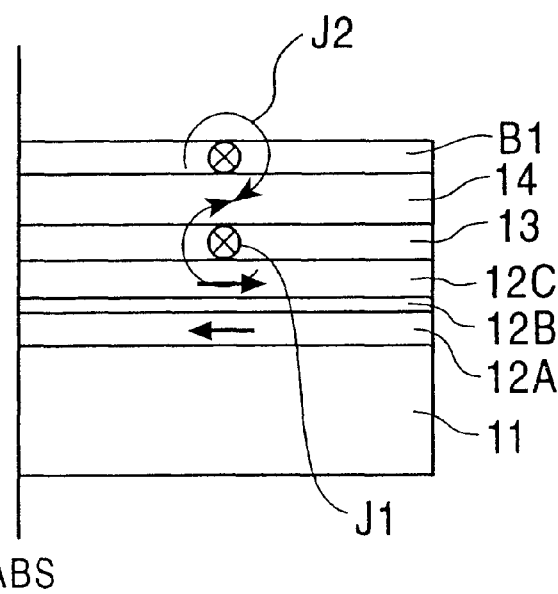

SPIN VALVE THIN FILM MAGNETIC ELEMENT AND METHOD OF MANUFACTURING THE SAME

BACKGROUND OF THE INVENTION

1. Field of the Invention

The invention generally relates to a spin valve thin film magnetic element in which electric resistance changes with the relation between the pinned magnetization direction of a pinned magnetic layer and the magnetization direction of a free magnetic layer affected by an external magnetic field, a method of manufacturing the spin valve thin film magnetic element, and a thin film magnetic head comprising the spin valve thin film magnetic element. Particularly, the invention relates to a technique suitable for a spin valve thin film magnetic element capable of decreasing asymmetry and the occurrence of Barkhausen noise, improving the stability of the element, and permitting sufficient control of the magnetic domain of a free magnetic layer.

2. Description of the Related Art

A spin valve thin film element is a GMR (giant magnetoresistive) element exhibiting a giant magnetoresistive effect, and usually is adapted to detect a recording magnetic field from a recording medium such as a hard disk or the like.

As a GMR element, the spin valve thin film magnetic element has a relatively simple structure, excellent properties of a high rate of change in resistance with an external magnetic field, and a change in resistance with a weak magnetic field.

FIG. 29 is a sectional view illustrating the structure of an example of a conventional spin valve thin film element, as viewed from the air bearing surface (ABS) facing a recording medium.

The spin valve thin film magnetic element shown in FIG. 29 is a bottom-type single spin valve thin film element comprising an antiferromagnetic layer, a pinned magnetic layer, a nonmagnetic conductive layer, and a free magnetic layer.

In the spin valve thin film element, the moving direction of a magnetic recording medium such as hard disk coincides with the Z direction shown in FIG. 29. The direction of a leakage magnetic field from the magnetic recording medium coincides with the Y direction.

The conventional spin valve thin film element shown in FIG. 29 has a lamination 109 comprising a base layer 106, an antiferromagnetic layer 101, a pinned magnetic layer 102, a nonmagnetic conductive layer 103, a free magnetic layer 104, and a protecting layer 107, which are laminated in turn on a substrate. The conventional spin valve thin film element also has a pair of hard bias layers 105 formed on both sides of the lamination 109 and a pair of electrode layers 108 respectively formed on the hard bias layers 105.

The base layer 106 is made of Ta (tantalum). The antiferromagnetic layer 101 is made of a NiO (nickel oxide) alloy, a FeMn (ferro-manganese) alloy, a NiMn (nickel manganese) alloy, or the like. Each of the pinned magnetic layer 102 and the free magnetic layer 104 is made of Co (colbalt), a NiFe (nickel iron) alloy, or the like. The nonmagnetic conductive layer 103 comprises a Cu (copper) film. Each of the hard bias layers 105 is made of Co—Pt (cobalt-platinum) alloy. Each of the electrode layers 108 is made of Cu or the like.

The pinned magnetic layer 102 is formed in contact with the antiferromagnetic layer 101 to produce an exchange coupling magnetic field (exchange anisotropic magnetic field) in the interface between the pinned magnetic layer 102 and the antiferromagnetic layer 101. The pinned magnetization of the pinned magnetic layer 102 is pinned in the Y direction shown in the drawing.

The hard bias layers 105 are magnetized in the X1 direction shown in the drawing to orient variable magnetization of the free magnetic layer 104 in the X1 direction. As a result, the variable magnetization of the free magnetic layer 104 crosses the pinned magnetization of the pinned magnetic layer 102.

The electrode layers 108 respectively comprise overlay portions 108a, which extend to the portions of the lamination 109 outside the sensing track width Tw. The overlay portions 108a may solve the problem of decreasing reproduced output due to dead regions formed near both edges of the lamination 109.

In the spin valve thin film element, a sensing current is supplied to the pinned magnetic layer 102, the nonmagnetic conductive layer 103, and the free magnetic layer 104 from the electrode layers 108 formed on the hard bias layers 105. The moving direction of the magnetic recording medium such as a hard disk coincides with the Z direction shown in the drawing. When a leakage magnetic field from the magnetic recording medium is applied in the Y direction, magnetization of the free magnetic layer 104 is changed from the X1 direction to the Y direction. The electric resistance value changes with the relation between the change in the magnetization direction of the free magnetic layer 104 and the pinned magnetization direction of the pinned magnetic layer 102. This is referred to as "magnetoresistive (MR) effect". The leakage magnetic field from the magnetic recording medium is detected by a change in voltage based on the change in the electric resistance value.

The central portion of the lamination 109, except the overlay portions 108a, substantially contributes to reproduction of the recording magnetic field from the magnetic recording medium. The control portion comprises a sensitive region exhibiting the magnetoresistive effect, and defines the sensing track width Tw. The both-side regions below the overlay portions 108a are the dead regions, which substantially do not contribute to reproduction of the recording magnetic field from the magnetic recording medium.

In the spin valve thin film element, the asymmetry of output is desired to be as small as possible and is defined by the relation between the variable magnetization direction of the free magnetic layer 104 and the pinned magnetization direction of the pinned magnetic layer 102. Therefore, the relation between the variable magnetization of the free magnetic layer 104 and the pinned magnetization of the pinned magnetic layer 102 is desired to be as close to 90° as possible, and in theory 90°.

The variable magnetization direction of the free magnetic layer 104 that affects the asymmetry of output is described below based on the drawings.

FIG. 30 is a schematic drawing illustrating a state in which the direction of variable magnetization $M_f$ of the free magnetic layer 104 is defined.

The magnetic fields that influence the direction of variable magnetization $M_f$ of the free magnetic layer 104 include three magnetic fields—a sensing current magnetic field $H_j$ due to a sensing current J, a demagnetizing (dipole) magnetic field $H_d$ due to the pinned magnetization of the pinned magnetic layer 102, and an interaction magnetic field $H_{int}$ due to the layer interaction between the free magnetic layer 104 and the pinned magnetic layer 102.

When these magnetic fields contribute less to the variable magnetization $M_f$ of the free magnetic field 104, asymmetry is decreased. In order to decrease asymmetry, when no external magnetic field is applied, the following condition is satisfied.

$$H_j+H_d+H_{int}=0$$

With the spin valve thin film element not operating, i.e., with no sensing current J supplied, no sensing current magnetic field $H_j$ occurs. In this state, the direction of the variable magnetization $M_f$ of the free magnetic layer 104 is oriented by the magnetic field of the hard bias layers 105. With no sensing current J supplied, the variable magnetization $M_f$ of the free magnetic layer 104 defined by the hard bias layers 105 does not cross perpendicularly to the pinned magnetization $M_p$ of the pinned magnetic layer 102. Therefore, a setting is performed in anticipation of contribution of the sensing current J so that these magnetization directions do not cross each other at right angles unless the sensing current J flows.

With no sensing current J supplied, no sensing current magnetic field $H_j$ is produced and the variable magnetization $M_f$ of the free magnetic field 104 tends to be opposite to the pinned magnetization $M_p$ of the pinned magnetic layer 102.

As shown in FIG. 29, in the spin valve thin film element, the electrode layers 108 formed on the hard bias layers 105 have the overlay portions 108a extending to the top of the lamination 109. As a result, when the sensing current is supplied to the pinned magnetic layer 102, the nonmagnetic conductive layer 103, and the free magnetic layer 104 from the electrode layers 108, the sensing current J mostly flows into the lamination 109 through the overlay portions 108a.

Therefore, the free magnetic layer 104 comprises a central portion 104a through which the sensing current J flows, and both-side portions (electrode overlay portions) 104b through which little or none of the sensing current J flows.

As described above, in the central portion 104a through which the sensing current J flows, the sensing current magnetic field $H_j$ occurs. The state of $H_j+H_d+H_{int}=0$ also occurs, in which contributions of the magnetic fields are balanced. Therefore, with no external magnetic field applied, the variable magnetization $M_f$ of the central portion 104a crosses perpendicularly to the pinned magnetization $M_p$ of the pinned magnetic layer 102.

However, in both-end portions 104b through which essentially no sensing current J flows, as described above, no sensing current magnetic field $H_j$ occurs. The variable magnetization $M_f$ of each of the both-side portions 104b tends to be opposite to the pinned magnetization $M_p$ of the pinned magnetic layer 102. Therefore, with no external magnetic field applied, the variable magnetization $M_f$ of each of the both-side portions 104b does not cross perpendicularly to the pinned magnetization $M_p$ of the pinned magnetic layer 102.

As a result, as shown in FIG. 31, deviations may occur in the magnetization direction of the free magnetic layer 104.

FIG. 31 is a vector map showing the magnetization distribution of the free magnetic layer 104 measured by micro magnetic simulation with a sensing current of 5 mA supplied in a spin valve thin film element without a backed layer.

This drawing shows that the magnetization direction of the central portion 104a of the element is greatly different from the magnetization direction of each of the electrode overlay portions 104b.

Therefore, in a state in which the free magnetic layer 104 is significantly divided near the edges of the overlay portions 108a as if magnetic walls 104c were formed in the free magnetic layer 104 to interfere with the formation of a single magnetic domain state, as shown in FIG. 32. This may cause nonuniformity in magnetization, and Barkhausen noise or the like which causes instability resulting in incorrect processing of signals from the magnetic recording medium in the spin valve thin film element.

FIG. 33 is a sectional view showing the structure of another example of conventional spin valve thin film elements, as viewed from the air bearing surface (ABS) side facing a recording medium.

Similar to the previously described spin valve thin film element, the spin valve thin film element shown in FIG. 33 is a top-type single spin valve thin film element comprising a ferromagnetic layer, a pinned magnetic layer, a nonmagnetic conductive layer, and a free magnetic layer.

In the spin valve thin film element, the movement direction of the magnetic recording medium such as a hard disk or the like coincides with the Z direction shown in the drawing. The direction of a leakage magnetic field from the magnetic recording medium coincides with the Y direction.

In FIG. 33, reference numeral 121 denotes a base layer provided on a substrate. A free magnetic layer 125 is formed on the base layers 121 and 121a, and a nonmagnetic conductive layer 124 is formed on the free magnetic layer 125. A pinned magnetic layer 123 is formed on the nonmagnetic conductive layer 124. An antiferromagnetic layer 122 is formed on the pinned magnetic layer 123. Furthermore, a protecting layer 127 is formed on the antiferromagnetic layer 122.

Reference numeral 126 denotes a hard bias layer. Reference numeral 128 denotes an electrode layer. Reference numeral 129 denotes a lamination.

In the spin valve thin film magnetic element, the magnetization direction of the pinned magnetic layer 123 is pinned in the direction opposite to the Y direction.

The base layer 121 is made of Ta, and the antiferromagnetic layer 122 is made of an IrMn (iridium manganese) alloy, an FeMn alloy, a NiMn alloy, or the like. Each of the pinned magnetic layer 123 and the free magnetic layer 125 is made of Co, a NiFe (nickel iron) alloy, or the like. The nonmagnetic conductive layer 124 comprises a Cu film. Each of the hard bias layers 126 is made of a CoPt (cobalt-platinum) alloy. Each of the electrode layers 128 is made of Cu or the like.

The electrode layers 128 formed on the hard bias layers 126 respectively comprise overlay portions 128a which extend to portions of the top of the lamination 129 outside the sensing track width Tw. The overlay portions 128a may solve the problem of decreasing reproduced output due to the dead regions formed near both edges of the lamination 129.

The central portion of the lamination 129 except the overlay portions 128a substantially contributes to reproduction of a recording magnetic field from the magnetic recording medium. The central portion comprises a sensitive region exhibiting the magnetoresistive effect and defining the sensing track width Tw. The both-side regions below the overlay portions 128a are the dead regions that substantially do not contribute to reproduction of the recording magnetic field from the magnetic recording medium.

Like in the example shown in FIG. 29, in the spin valve thin film element, when a sensing current J is supplied to a portion near the pinned magnetic layer 123, the nonmagnetic conductive layer 124, and the free magnetic layer 125 from the electrode layers 128, the sensing current J mostly flows into the lamination 129 through the overlay portions 128a.

However, in the spin valve thin film element, the antiferromagnetic layer 122 is located in the upper portion of the lamination 129 in contact with the overlay portions 128a. The pinned magnetic layer 123 and the free magnetic layer 125 are present below the antiferromagnetic layer 122. Therefore, in order that the sensing current J flows to the portion near the pinned magnetic layer 123, the nonmagnetic conductive layer 124, and the free magnetic layer 125 through the overlay portions 128a, it is necessary that the sensing current J passes through a portion near the antiferromagnetic layer 122.

The antiferromagnetic layer 122 is made of an IrMn alloy, an FeMn alloy, or a NiMn alloy, which has high resistivity. For example, the IrMn alloy, FeMn alloy, or NiMn (nickel manganese) alloy has a resistivity of about 200 $\mu\Omega\text{cm}^{-1}$ which is about ten times as high as the resistivity of about 10 $\mu\Omega\text{cm}^{-1}$ order of a NiFe alloy which constitutes the pinned magnetic layer 123 and the free magnetic layer 125, and which is about hundred times as high as the resistivity of about 1 $\mu\Omega\text{cm}^{-1}$ order of Cu which constitutes the nonmagnetic conductive layer 124.

Since the antiferromagnetic layer 122 has high resistivity, the sensing current J flowing through the overlay portions 128a shown in FIG. 33 is subjected to high resistance. The component of a shunt J' flowing directly into the portion below the antiferromagnetic layer 122 through the hard bias layers 126 becomes so large that it cannot be neglected.

As a result, in FIG. 33, the sensing current flows through regions D of the lamination 129 below the overlay portions 128a. The regions D are the dead regions and cause a change in magnetoresistance thus adding an output signal to the reproduced output of the sensitive region.

Particularly, side reading occurs when the recording track width and the recording track interval are decreased to narrow the track width in a magnetic recording medium with increases in the recording density of the magnetic recording medium. Information on a magnetic recording track adjacent to a magnetic recording track on which information to be read by the sensitive region is read by the regions D, thus causing error due to noise in output signals.

Fundamentally, there is need to improve output characteristics and sensitivity of the spin valve thin film element.

SUMMARY OF THE INVENTION

In consideration of the above circumstances, the objects of the invention are as follows:

(1) To improve the output characteristics of a spin valve thin film element;
(2) To decrease asymmetry;
(3) To improve the stability of a reproduced waveform;
(4) To prevent the occurrence of side reading;
(5) To provide a method of manufacturing the above-mentioned spin valve thin film element; and
(6) To provide a thin film magnetic head comprising the spin valve thin film element.

In order to achieve these objects, the invention provides a spin valve thin film element having a substrate, an antiferromagnetic layer, a first pinned magnetic layer, a nonmagnetic intermediate layer, a second pinned magnetic layer, a non-magnetic conductive layer, a free magnetic layer, a backed layer, hard bias layers, and electrode layers. The antiferromagnetic layer is formed on the substrate. The first pinned magnetic layer is formed in contact with the antiferromagnetic layer so that the magnetization direction of the first pinned magnetic layer is pinned by an exchange coupling magnetic field with the antiferromagnetic layer The nonmagnetic intermediate layer is formed between the first pinned magnetic layer and a second pinned magnetic layer, in which the magnetization direction of the second pinned magnetic layer is oriented in antiparallel with the magnetization direction of the first pinned magnetic layer. The nonmagnetic conductive layer is formed between the second pinned magnetic layer and the free magnetic layer, in which the magnetization direction of the free magnetic layer is oriented in a direction crossing the magnetization direction of the second pinned magnetic layer. The backed layer has a nonmagnetic conductive material and is formed in contact with the side of the free magnetic layer opposite to the nonmagnetic conductive layer side. Hard bias layers are formed on both sides of a lamination comprising at least the antiferromagnetic layer, the first and second pinned magnetic layers, the nonmagnetic conductive layer, the free magnetic layer, and the backed layer. The hard bias layers orient the magnetization direction of the free magnetic layer in a direction crossing the magnetization direction of the pinned magnetic layers. The electrode layers are formed on the hard bias layers and supply a sensing current to the lamination. The electrode layers are formed to extend from both sides of the lamination to the central portion of the surface of the lamination.

In one aspect, the extension length of one of the electrode layers on both sides of the lamination toward the central portion of the surface of the lamination is set in the range of about 0.1 $\mu$m through about 0.5 $\mu$m.

In one aspect, the extension length of one of the electrode layers on both sides of the lamination toward the central portion of the surface of the lamination is set in the range of about 0.03 $\mu$m through about 0.10 $\mu$m.

The lamination may be formed by means for laminating in turn the antiferromagnetic layer, the first pinned magnetic layer, the nonmagnetic intermediate layer, the second pinned layer, the nonmagnetic conductive layer, the free magnetic layer, and the backed layer on the substrate.

In one aspect, the backed layer comprises a material selected from Au (gold), Ag (silver), and Cu.

The protecting layer may be made of Ta and may be formed on the surface of the backed layer.

The intermediate layer may be made of Ta or Cr chromium and may be provided between the backed layer and the hard bias layers.

The intermediate layer may be made of Ta or Cr and may be provided between the backed layer and the electrode layers.

The intermediate layer may be made of Ta or Cr and may be provided between the hard bias layers and the electrode layers.

Each of the electrode layers may comprise a single layer film or a multilayer film and may be made of at least one element selected from Cr, Au, Ta and W (tungsten).

Each of the electrode layers of the present invention may comprise a multilayer film formed by alternately depositing Au and Ta or W.

In one aspect, the hard bias layers are arranged at the same layer position as the free magnetic layer on the substrate. The hard bias layers may be formed so that the upper surfaces thereof are joined to the sides of the lamination at positions nearer the substrate than the upper edges of the sides of the lamination.

In one aspect, the hard bias layers may be formed so that the upper surfaces thereof are joined to the sides of the lamination at positions between the upper and lower surfaces of the free magnetic layer.

In the present invention, the antiferromagnetic layer may comprise any X—Mn alloy and Pt—Mn—X' alloy, where X represents one element selected from Pt, Pd, Ir, Rh, Ru, and Os, and where X' represents at least one element selected from Pd, Cr, Ru, Ni, Ir, Rh, Os, Au, Ag, Ne, Ar, Xe, and Kr.

In one aspect, the free magnetic layer may be divided into two layers separated by nonmagnetic intermediate layer so that the divided layers are brought into a ferrimagnetic state in which the magnetization directions are about 180° different.

The lamination also may comprise a sensitive region in the central portion that has excellent reproduction sensitivity and substantially exhibits the magnetoresistive effect. The lamination may have dead region which are formed on both sides of the sensitive region, which have poor reproduction sensitivity, and which substantially cannot exhibit the magnetoresistive effect.

The electrode layers formed on both sides of the lamination may be formed to extend to the dead regions of the lamination and adhere to the lamination.

A thin film magnetic head of the present invention may comprise the above-described spin valve thin film magnetic element.

A method of manufacturing a spin valve thin film element according to an embodiment of the invention includes forming a laminated film on a substrate. The laminated film comprises at least an antiferromagnetic layer, a first pinned magnetic layer, a second pinned magnetic layer, a non-magnetic intermediate layer, a free magnetic layer, a non-magnetic conductive layer, and a backed layer. The first pinned magnetic layer is formed in contact with the antiferromagnetic layer so that the magnetization direction is pinned by an exchange coupling magnetic field with the antiferromagnetic layer. The second pinned magnetic layer is formed on the first pinned magnetic layer. The nonmagnetic intermediate layer is provided between the first and second pinned magnetic layers so that the magnetization direction of the second pinned magnetic layer is oriented in antiparallel with the magnetization direction of the first pinned magnetic layer. The free magnetic layer is formed on the second pinned magnetic layer. The nonmagnetic conductive layer is provided between the free magnetic layer and the second pinned magnetic layer so that the magnetization direction of the free magnetic layer is oriented in a direction crossing the magnetization direction of the second pinned magnetic layer. The backed layer is comprised of a nonmagnetic conductive material and is formed in contact with the side of the free magnetic layer opposite to the nonmagnetic conductive layer side. A lift off resist is formed on the laminated film. The lift off resist has notch portions formed on the lower side facing the laminated film. The portions not covered with the lift off resist are removed by ion milling, leaving a portion of the antiferromagnetic layer to form a lamination having a substantially trapezoidal sectional shape. Hard bias layers are formed at the same layer position as the free magnetic layer on both sides of the lamination by any one or a combination of ion beam sputtering, long slow sputtering, collimation sputtering, and the like. The hard bias layers orient the magnetization direction of the free magnetic layer in a direction crossing the magnetization direction of the second pinned magnetic layer. Electrode layers are formed on the hard bias layers and the portions of the lamination, which are opposite to the notch portions of the lift off resist. Any one or a combination of ion beam sputtering, long slow sputtering, collimation sputtering, and the like may be used to form the electrode layers along with a target opposed to the substrate obliquely at an angle with the substrate. The electrode layers supply a sensing current to the lamination.

In one aspect, with respect to the width dimension of the lift off resist in the width direction of the lamination, the width dimension of each of the notch portions in the width direction of the lamination, which do not contact the lamination, may be set in the range of about 0.03 µm through about 0.10 µm.

An alternate method of manufacturing a spin valve thin film element according to an embodiment of the invention includes forming a laminated film on a substrate. The laminated film comprises at least an antiferromagnetic layer, a first pinned magnetic layer, a second pinned magnetic layer, a non-magnetic intermediate layer, a free magnetic layer, a non-magnetic conductive layer, and a backed layer. The first pinned magnetic layer is formed in contact with the antiferromagnetic layer so that the magnetization direction of the first pinned magnetic layer is pinned by an exchange coupling magnetic field with the antiferromagnetic layer. The second pinned magnetic layer is formed on the first pinned magnetic layer. The nonmagnetic intermediate layer is provided between the first and second pinned magnetic layers so that the magnetization direction of the second pinned magnetic layer is oriented in antiparallel with the magnetization direction of the first pinned magnetic layer. The free magnetic layer formed on the second pinned magnetic layer. The nonmagnetic conductive layer is provided between the free magnetic layer and the second pinned magnetic layer so that the magnetization direction free magnetic layer is oriented in a direction crossing the magnetization direction of the second pinned magnetic layer. The backed layer is comprised of a nonmagnetic conductive material and is formed in contact with the side of the free magnetic layer opposite to the nonmagnetic conductive layer side. A first lift off resist is formed on the laminated film. The first lift off resist has notch portions formed on the lower side facing the laminated film. The portions not covered with the first lift off resist are removed by ion milling leaving a portion of the antiferromagnetic layer to form a lamination having a substantially trapezoidal sectional shape. Hard bias layers are formed at the same layer position as the free magnetic layer on both sides of the lamination by any one or a combination of ion beam sputtering, long slow sputtering, collimation sputtering, and the like. The hard bias layers orient the magnetization direction of the free magnetic layer in a direction crossing the magnetization direction of the second pinned magnetic layer. The first lift off resist is separated from the laminated film. A second lift off resist is formed on the laminated film and has a portion in contact with the lamination. The second lift off resist has a smaller width dimension than that of the first lift off resist in the width direction of the lamination, and has notch portions formed on the lower side facing the lamination. Electrode layers are formed on the portions, which are not covered with the second lift off resist, by any one or a combination of ion beam sputtering, long slow sputtering, collimation sputtering, and the like. The electrode layers supply a sensing current to the lamination.

In one aspect, the difference between the width dimensions of the first and second lift off resists in the width direction of the lamination may be set in the range of about 0.2 µm through about 1.0 µm.

In one aspect, with respect to the width dimension of the second lift off resist in the width direction of the lamination, the width dimension of each of the notch portions in the width direction of the lamination, which do not contact the lamination, may be set in the range of about 0.01 µm through about 0.10 µm.

Portions of the surface of the lamination, which are opposite to the notch portions of the lift off resist or the second lift off resist, may be removed by ion milling, reverse sputtering, and the like after the step of forming the hard bias layers.

The antiferromagnetic layer may comprise any one of X—Mn alloy and Pt—Mn—X' alloys, where X represents an element selected from Pt, Pd, Ir, Rh, Ru, and Os, and where X' represents at least one element selected from Pd, Cr, Ru, Ni, Ir, Rh, Os, Au, Ag, Ne, Ar, Xe, and Kr.

In one aspect, the sensitive region of the lamination, as measured by a micro track profile technique, is defined as a region in which the output is 50% or more of the maximum reproduced output when a spin valve thin film magnetic element comprises the electrode layers formed on both sides of the lamination. A the spin valve thin film magnetic element is scanned on a microtrack on which a signal has been recorded in the direction of the track width. The dead regions of the lamination are defined as regions on both sides of the sensitive region, in which the output is 50% or less of the maximum output.

In one aspect, the sensitive region of the lamination is formed to have the same dimension as an optical track width dimension (O-Tw).

In a lamination formed by laminating the antiferromagnetic layer, the first pinned magnetic layer, the nonmagnetic intermediate layer, the second pinned magnetic layer, the free magnetic layer, and the backed layer, the whole region of the lamination may not exhibit the magnetoresistive effect. Only the central region may be the sensitive region having excellent reproduction sensitivity, and exhibiting the magnetoresistive effect.

The region of the lamination, which exhibits excellent reproduction sensitivity, may be referred to as the "sensitive region". The regions on both sides of the sensitive region, which exhibit poor reproduction sensitivity, may be referred to as the "dead regions". The sensitive region and the dead regions of the lamination are measured by the micro track file technique.

The micro track profile technique will be described with reference to FIG. 26.

As shown in FIG. 26, a spin valve thin film magnetic element comprising a lamination exhibiting the magnetoresistive effect, hard bias layers formed on both sides of the lamination, and electrode layers formed on the hard bias layers is formed on a substrate. The electrode layers are formed only on both sides of the lamination, without the overlay portions 108a or 128a shown in FIG. 29 or 33.

Next, the width dimension A of the upper surface of the lamination, which is not coated with the electrode layers, is measured. The width dimension A is defined as the track width Tw (referred to as "optical track width dimension O-Tw" hereinafter) measured by the optical method.

A predetermined signal is recorded as a micro track on a magnetic recording medium. The spin valve thin film magnetic element is scanned on the micro track in the direction of the track width to measure the relation between the width dimension A of the lamination and reproduced output. Alternatively, the magnetic recording medium on which the micro track has been recorded may be scanned on the spin valve thin film magnetic element in the direction of the track width to measure the relation between the width dimension A of the lamination and reproduced output. The results of measurement are shown in the lower portion of FIG. 26.

The results of measurement indicate that reproduced output is high in a portion near the center of the lamination. Reproduced output is low in portions near both sides of the lamination. The results also indicate that in the portion near the center of the lamination, the magnetoresistive effect is sufficiently exhibited to contribute to the reproducing function. In the portions near both sides, the magnetoresistive effect deteriorates to decrease the reproducing function.

In one aspect, the region of the lamination, which is formed with width dimension B and which produces reproduced output of 50% or more of the maximum reproduced output is defined as the sensitive region. The regions of the lamination, which are formed with width dimension C and which produce reproduced output of 50% or less of the maximum reproduced output are defined as the dead regions.

In one aspect, the nonmagnetic intermediate layer is provided between the first pinned layer and the second pinned layer in the lamination so that the magnetization direction of the second pinned layer is oriented in antiparallel with the magnetization direction of the first pinned magnetic layer. This arrangement forms a synthetic-ferri-pinned type in which the pinned magnetic layers are brought into a ferrimagnetic state. A demagnetizing (dipole) field due to the pinned magnetization of the pinned magnetic layer may be canceled by counteraction between the magnetostatic coupling magnetic fields of the first and second pinned magnetic layers. It is thus possible to decrease the contribution of the demagnetizing (dipole) magnetic field due to the pinned magnetization of the pinned magnetic layer, which affects the variable magnetization direction of the free magnetic layer.

In a spin valve thin film element in which the pinned magnetic layer is divided into two layers with a nonmagnetic intermediate layer provided between the layers, one of the two divided pinned magnetic layers assists in pinning the other pinned magnetic layer in an appropriate direction, thus maintaining the pinned magnetic layer in a very stable state.

In one aspect, no external magnetic field is applied as a contribution to variable magnetization of the free magnetic layer. To decrease asymmetry in one aspect, the sensing current magnetic field $H_j$ due to the sensing current, the demagnetizing (dipole) field $H_d$ due to pinned magnetization of the pinned magnetic layer, and the interaction magnetic field $H_{int}$ due to the interlayer interaction between the free magnetic layer and the pinned magnetic layer satisfy the following condition.

$$H_j + H_d + H_{int} = 0$$

The demagnetizing (dipole) field may be made substantially zero ($H_d = 0$).

The variable magnetization direction of the free magnetic layer may be easily corrected in the desired direction. The variable magnetization direction of the free magnetic layer may be easily controlled to obtain an excellent spin valve thin film element exhibiting low asymmetry.

The asymmetry represents the degree of asymmetry of a reproduced output waveform. A symmetric reproduced output waveform exhibits low asymmetry. The symmetry of the reproduced output waveform is improved as the asymmetry approaches zero.

The asymmetry is zero when the variable magnetization direction of the free magnetic layer crosses perpendicularly to the pinned magnetization direction of the pinned magnetic layer. With a great deviation in asymmetry, information cannot be precisely read from a recording medium and causes error. Therefore, with low asymmetry, the reliability of reproducing signal processing is improved to provide an excellent spin valve thin film element.

In general, the demagnetizing (dipole) field $H_d$ due to pinned magnetization of the single pinned magnetic layer has a nonuniform distribution in which it is high at both ends, and low in the central portion in the direction of the element height. In a portion of the spin valve thin film element, the condition, $H_j+H_d+H_{int}=0$, is not completely satisfied, thereby hindering the free magnetic layer from being put into a single magnetic domain state in some cases.

In the pinned magnetic layers having the above-described multilayer structure, the dipole magnetic field $H_d$ may be made substantially zero to prevent the formation of domain walls in the free magnetic layer. This may prevent the occurrence of nonuniform magnetization due to a hindrance to putting the free magnetic layer into a single magnetic domain state, thereby preventing Barkhausen noise or the like which causes instability resulting in incorrectness of processing of signals from the magnetic recording medium in the spin valve thin film element.

In one aspect, the backed layer is made of a nonmagnetic conductive material and is provided in contact with the free magnetic layer. The height of the center of a sensing current flow in the lamination may be changed to the backed layer side, as compared with a state in which with no backed layer provided. The central position is located on the pinned magnetic layer side. This may decrease the intensity of the sensing current magnetic field at the position of the free magnetic layer to decrease the contribution of the sensing current magnetic field to the variable magnetization of the free magnetic layer. The variable magnetization direction of the free magnetic layer may be easily corrected in the desired direction. The variable magnetization direction of the free magnetic layer may be easily controlled for obtaining a spin valve thin film element having small asymmetry.

In one aspect, the backed layer is made of a nonmagnetic conductive material and is provided in contact with the free magnetic layer. The electrode layers are formed to extend from both sides of the lamination to the central portion of the surface of the lamination. The sensing current from flowing from the electrode layers into the junctions between the hard bias layers and the lamination. Therefore, the ratio of the sensing current directly flowing into the lamination without passing through the hard bias layers may be increased. By increasing the contact area between the lamination and the electrode layers, the junction resistance, which does not contribute to the magnetoresistive effect, may be decreased to improve reproduction characteristics.

As described below, the backed layer comprises a material selected from the group consisting of Au, Ag, and Cu. The backed layer may lengthen the mean free path of +spin (up-spin) electrons contributing to the magnetoresistive effect, thereby producing a high rate of change in resistance $\Delta R/R$ due to the spin filter effect in the spin valve thin film element. The backed layer may make the element adaptable to high-density recording.

In one aspect, the lamination is a bottom type comprising the antiferromagnetic layer, the first pinned magnetic layer, the nonmagnetic intermediate layer, the second pinned magnetic layer, the nonmagnetic conductive layer, the free magnetic layer, and the backed layer. These layers are laminated from the bottom, thus increasing the ratio of the sensing current supplied to the lamination without passing through the antiferromagnetic layer having high resistivity. The shunt component of the sensing current may decrease and flows directly into a portion near the first and second pinned magnetic layers, the nonmagnetic conductive layer, and the free magnetic layer, which are located below the antiferromagnetic layer. The shunt component flows through the hard bias layers in a top type. Side reading may be prevented. The spin valve thin film element may be made adaptable to higher density magnetic recording.

In one aspect, the protecting layer is made of Ta and is formed on the surface of the backed layer to protect the lamination from a necessary atmosphere in the manufacturing process.

The intermediate layers may be made of Ta or Cr and are provided between the backed layer and the head bias layers. The intermediate layers function as a diffusion barrier in exposure to high temperature during the subsequent step of curing the insulating resist ultraviolet (UV) curing or hard baking) in the process for manufacturing an inductive head (write head). Thermal diffusion may be prevented between the backed layer made of Cu and the hard bias layers made of a CoPt alloy or the like, preventing deterioration in the magnetic properties of the hard bias layers.

Furthermore, the intermediate layers may be made of Ta or Cr and are provided between the backed layer and the electrode layers. The intermediate layers prevent thermal diffusion between the backed layer and the electrode layers. The backed layers may be made of Cu. The electrode layers may be made of Cr or the like. Thermal diffusion may occur when the backed layer and electrode layers are exposed to high temperature during the curing of the insulating resist (e.g., UV curing or hard baking) in a process for manufacturing an inductive head (e.g., a write head). The intermediate layers prevent deterioration of the film properties in the backed layer and deterioration of the conduction properties in the electrode layers.

The intermediate layers may be made of Ta or Cr and are provided between the hard bias layers and the electrode layers. The intermediate layers prevent thermal diffusion between the electrode layers made of Cr or the like and the hard bias layers made of a CoPt alloy or the like. Thermal diffusion may occur whether hard bias layers and electrode layers are exposed to high temperature during the curing of the insulating resist (e.g., UV curing or hard baking) in the process for manufacturing an inductive head (e.g., write head). The intermediate layers prevent deterioration of the film properties in the hard bias layers.

When Cu is used for the electrode layers, the intermediate layers of Ta function as a diffusion barrier during a thermal process to prevent deterioration in the magnetic properties of the hard bias layers. The thermal process may be curing the resist. When Ta is used for the electrode layers, the intermediate layers of Cr facilitate the deposition of Ta crystals having a low-resistance body-centered cubic structure on Cr.

In one aspect, when each of the electrode layers comprises a single layer film or multilayer film of at least one material selected from Cr, Au, Ta, and W, the resistance value is decreased. When Cr is selected for the electrode layers and is epitaxially grown on Ta to form the electrode layers, the electric resistance value decreases further.

In one aspect, when each of the electrode layers comprises a multilayer film formed by alternately depositing soft Au and hard Ta or W, it is possible to prevent the phenomenon of smearing in that Au of the electrode layers is extended in the subsequent step of polishing, grinding or cutting to cause a electrical short circuit between the electrode layers and a shield or the like.

In one aspect, the hard bias layers are located at the same layer position as the free magnetic layer on the substrate. The upper surfaces of the hard bias layers are joined to the sides of the lamination at positions nearer the substrate than the upper edges of the sides of the lamination. A leakage magnetic field from each of the hard bias layers is less absorbed by a layer located above the lamination. The layer may be an upper shield layer or the like. A decrease in an effective magnetic field applied to the free magnetic layer is prevented. As a result, the free magnetic layer is readily put into a single magnetic domain state. A spin valve thin film element may be obtained with excellent stability in which the domains of the free magnetic layer can be sufficiently controlled.

In the spin valve thin film element, the hard bias layers are arranged at the same layer position as the free magnetic layer. A strong bias magnetic field may be easily applied to the free magnetic layer to put the free magnetic layer in a signal magnetic domain state, thereby decreasing the occurrence of Barkhausen noise.

Furthermore, the upper surfaces of the hard bias layers are joined to the sides of the lamination at positions between the upper and lower surfaces of the free magnetic layer. The magnetization direction of the free magnetic layer may be oriented in the desired direction by magnetization of the hard bias layers. By increasing the contact area between the lamination and the electrodes layers formed on the hard bias layers, the contact resistance to the sensing current in the junction portions between the electrode layers and the lamination may be decreased.

In one aspect, each of the hard bias layers has a thickness greater than the free magnetic layer in the direction of the thickness. At positions away from the lamination, the upper surfaces of the hard bias layers are arranged at positions farther from the substrate than the upper surface of the free magnetic layer.

In this spin valve thin film element, a stronger bias magnetic field may be easily applied to the free magnetic layer to put the free magnetic layer into a single magnetic domain state, further decreasing the occurrence of Barkhausen noise.

A layer "arranged at the same layer position as the free magnetic layer" includes the state in which at least the hard bias layers and the free magnetic layer are magnetically connected, and includes the state in which the thickness of the junction portions between the hard bias layers and the free magnetic layer is smaller than the thickness of the free magnetic layer.

The upper surfaces of the hard bias layers represent the surfaces opposite to the substrate side.

A "junction" includes not only a direct connection but also connection to the lamination or the like through a base layer, an intermediate layer, another layer, multiple layers, and the like.

In one aspect of the spin valve thin film element, the antiferromagnetic layer comprises an alloy represented by the formula X—Mn wherein X represents one element selected from Pt, Pd, Ru, Ir, Rh, and Os, where X is in the range of about 37 atomic % through about 63 atomic %. In another aspect spin valve thin film element, the antiferromagnetic layer comprises an alloy represented by the formula X'—Pt—Mn, wherein X' represents at least one element selected from Pd, Cr, Ru, Ni, Ir, Rh, Os, Au, Ag, Ne, Ar, Xe, and Kr, and wherein the total of X'+Pt is in the range of about 37 atomic % through about 63 atomic %.

A spin valve thin film element comprising an antiferromagnetic layer made of an alloy represented by the formula X—Mn or X'—Pt—Mn exhibits excellent properties such as a high exchange coupling magnetic field, a high blocking temperature, and excellent corrosion resistance, as compared with the use of a NiO alloy, FeMn alloy, or NiMn alloy which is conventionally used for the antiferromagnetic layer.

In one aspect of the spin valve thin film element, a bias base layer made of Cr may be provided between the hard bias layers and the lamination. A bias base layer made of Cr also may be provided between the hard bias layers and the substrate.

By providing a bias base layer comprising Cr with a body-centered cubic crystal structure (bcc structure), the coercive force and remanence ratio of the hard bias layers may be increased. The bias magnetic field necessary for putting the free magnetic layer into a single magnetic domain state also may be increased.

In one aspect of the spin valve thin film element, the free magnetic layer may be divided into two layers. A nonmagnetic intermediate layer may be provided between the layers to create a ferrimagnetic state in which the magnetization directions of the divided layers are about 180° different.

In a spin valve thin film element in which the free magnetic layer is divided into two layers with a nonmagnetic intermediate layer provided between the layers, an exchange coupling magnetic field occurs between the two divided free magnetic layers to cause the ferrimagnetic state. The magnetic thickness is decreased to permit sensitive reversal with an external magnetic field.

In one aspect, the lamination comprises the central sensitive region and the dead regions. The central sensitive region exhibits excellent reproduction sensitivity and substantially exhibits the magnetoresistive effect. The dead regions are formed on both sides of the sensitive region and exhibit poor reproduction sensitivity and substantially no magnetoresistive effect. The electrode layers are formed on both sides of the lamination and may be formed to extend to the dead regions of the lamination.

In this case, the sensing current mainly flows through the tips of the electrode layers, which extend to the upper surface of the lamination. If the electrode layers extend into the sensitive region, substantially exhibits the magnetoresistive effect, the sensing current flows less into the portions of the sensitive region that are covered by the electrode layers. The sensitive region sufficiently exhibiting the magnetoresistive effect also produces no reproduced output. Namely, the reproducing track width may be defined by the distance between the electrode layers.

In the spin valve thin film element having a structure shown in FIG. 26, the effective track width is mainly defined by the distance between the right and left hard bias layers. However, the track is narrowed to increase the ratio of the dead regions in the optical track width, thus significantly decreasing the reproduced output of the spin valve thin film element. In a structure in which the track width is defined by the distance between the electrode layers, the dead regions may be located outside the reproducing track to improve reproduced output. Even when the electrode layers cover the sensitive region, no problem occurs.

Furthermore, the objects of the invention may be achieved by the thin film magnetic head comprising the above-mentioned spin valve thin film element.

In a method of manufacturing a spin valve thin film element according to an embodiment of the invention, a resist pattern is formed on a laminated film by forming a lift off resist having notch portions. The lift off resist is followed by etching (e.g. ion milling) to form a lamination. The, hard bias layers and electrode layers are formed in a desired shape by any one or a combination of ion beam sputtering, long slow sputtering, collimation sputtering, and the like. A target is used and is opposed to the substrate in a state where the target is selectively inclined or not inclined at a set inclination angle, thus obtaining the above-mentioned spin valve thin film element.

The width dimension of each of the notch portions may be set to define the length portions of each of the portions of the electrical layers. The width dimension of each of the notch portions, may not contact the lamination. The width direction of the lamination may be relative to the width dimension of the lift off resist in the width direction of the lamination. The dimension in the direction of the track width may be set to define the length dimension of each of the portions of the electrode layers, which are formed inside the notch portions. The overlay portions of the electrode layers may be formed to extend from both sides of the lamination to the central portion of the surface thereof.

The lamination, hard bias layers, and the electrodes may be formed in desired shapes by a one time of formation of a photoresist (lift off resist). The hard bias layers and the electrode layers may be formed in desired shapes by the sputtering process or the like using the target opposed to the substrate in a state in which the target is selectively inclined or not inclined at an angle with the substrate. The spin valve thin film element may be easily obtained through a small number of steps.

In one aspect, the extension length of one of the electrode layers may extend on both sides of the lamination, and may extend to the surface of the lamination toward the other electrode layer. The length of each of the overlay portions may be set in the range of about 0.03 $\mu$m through about 0.10 $\mu$m by setting the dimension of each of the notch portions in the track width direction. With the overlay portions having a dimension less than about 0.03 $\mu$m in the track width direction, the formation of the overlay portions do not exhibit a sufficient effect. When the overlay portions have a dimension over about 0.10 $\mu$m in the track width direction, the electrode layers must be deposited by sputtering with a target opposed to the substrate at a high inclination angle. In this case, the electrode layers having a sufficient thickness cannot be formed inside the notch portions. The shunt of the sensing current flowing to the lamination (GMR film) below (substrate side) the thin overlay portions of the electrode layers cannot be neglected, thereby causing a trouble of side reading or the like.

In a method of manufacturing a spin vale thin film element according to an embodiment of the invention, a lamination and hard bias layers are formed using two types of lift off resist having different width dimensions and notch portions formed on a laminated film. Electrode layers are formed in a desired shape by any one or a combination of ion beam sputtering, long slow sputtering, collimation sputtering, and the like. A target is used and is opposed to the substrate in a state above the target is selectively inclined or not inclined at the set inclination angle, thus obtaining the above-mentioned spin valve thin film element.

In the first lift off resist, the width dimension of each of the notch portions in the direction of the track width, i.e., the width dimension of each of the notch portions, which do not contact the lamination, in the width direction of the lamination relative to the width dimension of the lift off resist in the width direction of the lamination. The dimension in the direction of the track width, and the ion beam incidence angle in ion milling may be set to set the dimension of the lamination in the track width direction, and the shape of the hard bias layers.

Similarly, in the second lift off resist, the dimension of the second lift off resist in the direction of the track width may be set to set the length dimension of each of the portions of the electrode layers, i.e., the overlay portions of the electrode layers, which are formed to extend from both sides of the lamination to the central portion of the surface thereof.

In one aspect, the extension length of one of the electrode layers on both sides of the lamination, which extends to the surface of the lamination toward the other electrode layer. The length of each of the overlay portions, may be set in the range of about 0.1 $\mu$m through about 0.5 $\mu$m by setting the difference between the dimensions of the first and second lift off resists in the direction of the track width. With the overlay portions having a dimension of less than about 0.1 $\mu$m in the track width direction, sufficient alignment precision may not be obtained in forming the second lift off resist which may cause difficulties in uniformly forming the right and left overlay portions with high reproducibility, and which may cause variation in off-track characteristics. With the overlay portions having a dimension of over about 0.5 $\mu$m in the track width direction, the probability of causing error due to side reading of adjacent tracks is increased.

The dimension of each of the overlay portions in the direction of the track width may be set by setting the difference between the width dimensions of the first and second lift off resists in the width direction (track width direction) of the lamination to be in the range of about 0.2 $\mu$m through about 1.0 $\mu$m. The difference between the width dimensions of each side portions of the first and second lift off resists may be set in the direction of the track width to be in the range of about 0.1 $\mu$m through about 0.5 $\mu$m.

In another aspect, portions of the lamination may be removed. The portions are opposed to the notch portions of the lift off resist or the second lift off resist. The portions should be removed by ion milling or reverse sputtering after the hard bias layers are formed. In this case, the protecting layer and the backed layer in the uppermost layer of the lamination may be cleaned by ion milling or reverse sputtering to obtain sufficient connection between the electrode layers and the backed layer, thus decreasing contact resistance. This also permits an intermediate layer of Ta to be provided between the backed layer and the electrode layers. Cr used for the electrode layers may be epitaxially grown on Ta to form the electrode layers, further decreasing the electric resistance value.

While the arrangement of the layers in the spin valve thin film element has been described in several embodiments, the layers may be operatively connected in other fashions as long as the required electrical, mechanical, and magnetic properties of a spin valve are achieved. They may have one or more additional layers between any or all of them.

Other systems, methods, feature and advantages of the invention will be or will become apparent to one skilled in the art upon examination of the following figures and detailed description. All such additional systems, methods, features, and advantages are intended to be included within this description, within the scope of the invention, and protected by the accompanying claims.

BRIEF DESCRIPTION OF SEVERAL VIEWS OF THE DRAWINGS

The invention may be better understood with reference to the following figures and detailed description. The components in the figures are not necessarily to scale, emphasis being placed upon illustrating the principles of the invention. Moreover, like reference numerals in the figures designate corresponding parts throughout the different views.

FIGS. 20(a), 20(b), and 20(c) illustrate a decrease in contribution of a sensing current magnetic field $H_j$ to variable magnetization $M_f$ of a free magnetic layer due to a backed layer in a spin valve thin film element; in which, FIG. 20(a) is a cross-sectional view illustrating an example of a spin valve this film element without a backed layer, taken along a direction perpendicular to the air bearing surface (ABS) facing a medium; in which, FIG. 20(b) is a cross-sectional view illustrating an example of a spin valve thin film element in accordance with an embodiment of the invention, taken along a direction perpendicular to the air bearing surface (ABS) facing a medium; and in which, FIG. 20(c) is a cross-sectional view illustrating an example of a spin valve thin film element showing shunt circuits J1 and J2, in accordance with an embodiment of the invention.

FIGS. 25(a) and 25(a) are graphs showing the relation between the sensing current value and asymmetry of a spin valve thin film element, in which FIG. 25(a) shows a comparative example; and in which.

FIGS. 28(a) and 28(b) are graphs showing the relation between the cross track position and relative output of a spin valve thin film magnetic element; in which, FIG. 28(a) shows an example of the invention; and in which, FIG. 28(b) shows a comparative example.;

DESCRIPTION OF THE PREFERRED EMBODIMENTS

First Embodiment

A method of manufacturing a spin valve thin film magnetic element according to a first embodiment of the invention, and a thin film magnetic head comprising a spin valve thin film magnetic element is described below with reference to the drawings.

Figure 1:
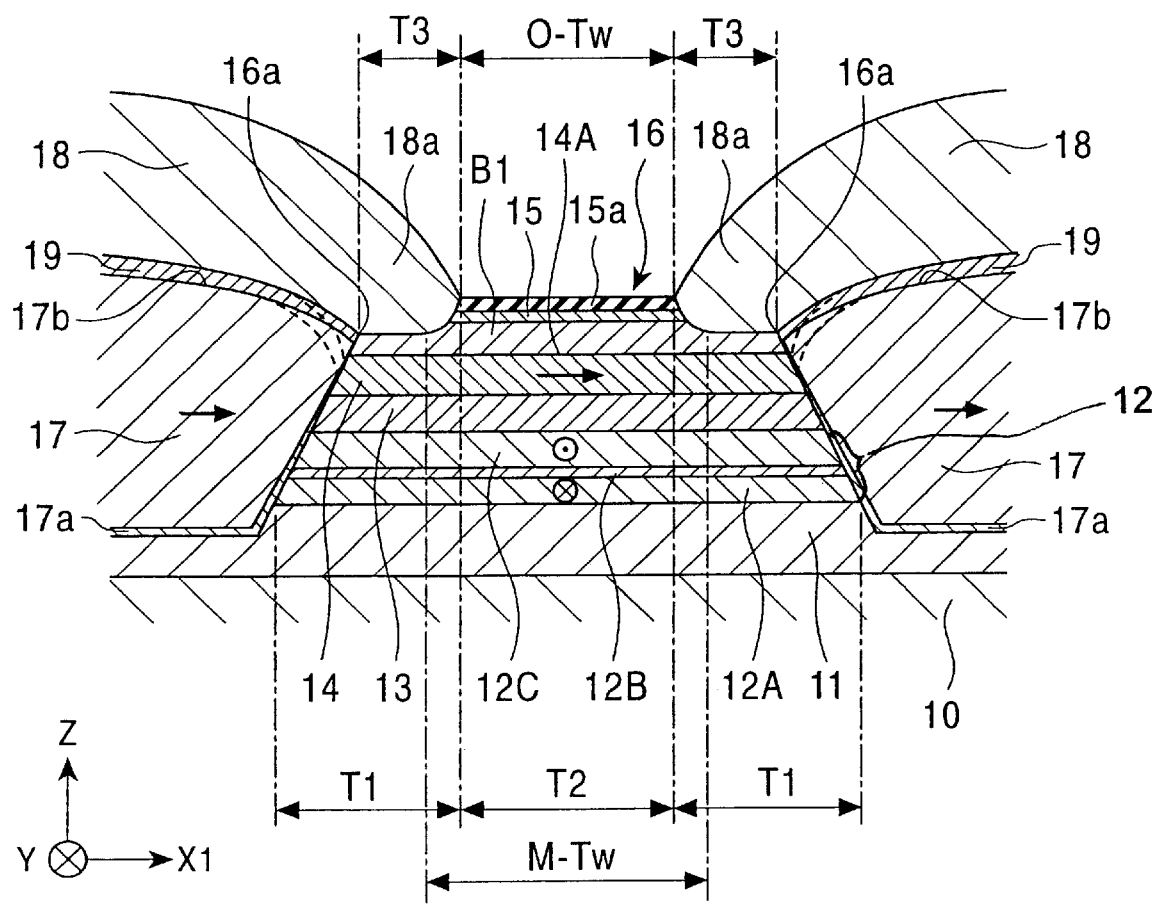
FIG. 1 is a sectional view of a spin valve thin film magnetic element in accordance with a first embodiment of the invention, as viewed from the side facing a recording medium.

FIG. 1 is a sectional view of a spin valve thin film element according to a first embodiment of the present invention, as viewed from the side facing a recording medium.

The spin valve thin film element of the invention is a GMR (giant magnetoresistive) element utilizing a giant magnetoresistive effect. The spin valve thin film element is provided at trailing side end of a floating slider provided on a hard disk device. The spin valve thin film element may be used to detect a recording magnetic field of a hard disk or the like, as described later. In FIG. 1, the moving direction of the magnetic recording medium, such as a hard disk or the like, coincides with the Z direction. The direction of a leakage magnetic field from the magnetic recording medium coincides with the Y direction.

The spin valve thin film element of the first embodiment of the invention is a bottom type comprising an antiferromagnetic layer, a pinned magnetic layer, a nonmagnetic conductive layer, and a free magnetic layer. The spin valve thin film element is also a synthetic-ferri-pinned type single spin valve thin film element in which the pinned magnetic layer comprises a first pinned magnetic layer and a second pinned magnetic layer. A nonmagnetic intermediate layer is provided between the first and second pinned magnetic layers. The magnetization direction of the second pinned magnetic layer is oriented in antiparallel with the magnetization direction of the first pinned magnetic layer, bringing the pinned magnetic layers into a synthetic ferrimagnetic state.

In FIG. 1, an antiferromagnetic layer 11 is provided on a substrate 10. A pinned magnetic layers 12 is formed on the antiferromagnetic layer 11.

The pinned magnetic layer 12 includes a first pinned magnetic layer 12A and a second pinned magnetic layer 12C formed on the first pinned magnetic layer 12A. A nonmagnetic intermediate layer 12B is provided between the first pinned magnetic layer 12A and the second pinned magnetic layer 12C. The magnetization direction of the second pinned layer 12C is oriented in antiparallel with the magnetization direction of the first pinned magnetic layer 12A.

Furthermore, a nonmagnetic conductive layer 13 made of Cu or the like is formed on the second pinned magnetic layer 12C. A free magnetic layer 14 is formed on the nonmagnetic conductive layer 13. A backed layer B1 is formed on the free magnetic layer 14. A protecting layer 15 made of Ta or the like is formed on the backed layer B1. The protecting layer 15 comprises an oxide layer 15a made of tantalum oxide (Ta-oxide) or the like formed on the upper side of the protecting layer 15.

As shown in FIG. 1, the layers ranging from a portion of the antiferromagnetic layer 11 to the oxide layer 15a constitute a lamination 16 having a substantially trapezoidal sectional form.

Hard bias layers 17 are formed on the portions of the antiferromagnetic layer 11, which extend to both sides of the lamination 16. Bias base layers 17a are provided between the antiferromagnetic layer 11 and the hard bias layers 17. Electrode layers 18 are formed on the hard bias layers 17. Intermediate layers 19 of Ta, Cr, or the like are provided between the electrode layers 18 and the hard bas layers 17.

In atop type spin valve thin film element, the antiferromagnetic layer is located at the top. The top-type exhibits a high ratio of a shunt component which flows through the hard bias layers into a portion near the first and second pinned magnetic layers, the nonmagnetic conductive layer, and the free magnetic layer. In a top-type, these layers are located below the antiferromagnetic-layer (i.e., the lower portion of the lamination). However, in a bottom type spin valve thin film element, the ratio of the sensing current supplied to the lamination 16 without passing through the antiferromagnetic layer 11, which has high resistivity, may be improved.

Side reading may be prevented to make it possible to comply with higher-density magnetic recording. In addition, as described later, overlay portions 18a of the electrode layers 18 are brought into contact with the exposed portions of the backed layer B1 to further decrease contact resistance, thus decreasing the shunt component flowing into the lower portion of the lamination 16 through the hard bias layers 17.

In one aspect of the spin valve thin film element of the first embodiment of the present invention, the antiferromagnetic layer 11 has a thickness in the range of about 80 angstroms through about 110 angstroms in the central portion of the lamination 16. The antiferromagnetic layer 11 may be made of a PtMn (platinum-manganese) alloy. A PtMn alloy has a higher corrosion resistance, a higher blocking temperature, and a higher exchange coupling magnetic field (exchange anisotropic magnetic field) than the NiMn and FeMn alloys conventionally used for an antiferromagnetic layer.

The antiferromagnetic layer 11 also may be made of an alloy represented by the formula X—Mn, where X represents one element selected from Pd, Ru, Ir, Rh, and Os, or Pt—Mn—X', where X' represents at least one element selected from Pd, Ru, Ir, Rh, Os, Au, Ag, Cr, Ni, Ar, Ne, Xe, and Kr). In the PtMn alloy and the alloy represented by the formula X—Mn, Pt or X is in one aspect in the range of about 37 atomic % through about 63 atomic %. In another aspect, Pt or X is the range of about 47 atomic through about 57 atomic %.

In the alloy represented by the formula X'—Pt—Mn, the total of X'+Pt in one aspect is in the range of about 37 atomic % through about 63 atomic %. In another aspect, X'+Pt is in the range of about 47 atomic % through about 57 atomic %. In one aspect, X' is in the range of 0.2 atomic % through about 10 atomic %.

However, where X' is at least one of Pd, Ru, Ir, Rh, and Os, X' is in one respect in the range of about 0.2 atomic % through about 40 atomic %.

For the antiferromagnetic layer 11, an alloy in the above-mentioned composition range is annealed to obtain the antiferromagnetic layer 11 producing a high exchange coupling magnetic field. Particularly, in use of the PtMn alloy, it is possible to obtain an excellent antiferromagnetic layer 11 having an exchange coupling magnetic field of more than 800 (Oe) and a blocking temperature as high as 380° C. The blocking temperature is the temperature when the exchange coupling magnetic field is lost. An Oersted (Oe) is about 80 A/m.

Each of the first and second pinned magnetic layers 12A and 12C may comprise a ferromagnetic thin film made of Co, a NiFe alloy, a CoNiFe (cobalt-nickel-iron) alloy, a CoFe (cobalt-iron) alloy, a CoNi (cobalt-nickel) alloy, or the like. The first and second pinned magnetic layers 12A and 12C have a thickness of about 40 angstroms. The first pinned magnetic layer 12A may be made of Co and may have a thickness in the range of 13 angstroms through about 15 angstroms. The second pinned magnetic layer 12C may be made of Co and may have a thickness in the range of about 20 angstroms through about 25 angstroms.

In one aspect, the nonmagnetic intermediate layer 12B is made of an alloy of at least one of Ru, Rh, Ir, Cr, Re, and Cu, and has a thickness of about 8 angstroms.

The first pinned magnetic layer 12A is formed in contact with the antiferromagnetic layer 11. The first pinned magnetic layer 12A is annealed in a magnetic field to produce an exchange coupling magnetic field (exchange anisotropic magnetic field) at the interface between the first pinned magnetic layer 12A and the antiferromagnetic layer 11. The exchange coupling magnetic field pins the magnetization direction of the first pinned magnetic layer 12A in the Y direction shown in FIG. 1. When the magnetization of the first pinned magnetic layer 12A is pinned in the Y direction, the magnetization of the second pinned magnetic layer 12C is pinned in antiparallel with the magnetization of the first pinned magnetic layer (i.e., in the direction opposite to the Y direction). The second pinned magnetic layer 12C is formed opposite to the first pinned magnetic layer 12A. The nonmagnetic intermediate layer 12b is provided between the first and second pinned magnetic layers 12A and 12C.

With a higher exchange coupling magnetic field, the magnetizations of the first and second pinned magnetic layers 12A and 12C may be stably maintained in the antiparallel state. When a PtMn alloy is used for the antiferromagnetic layer 11, the magnetization states of the first and second pinned magnetic layers 12A and 12C may be stably maintained thermally. A PtMn alloy has a high blocking temperature and produces a high exchange coupling magnetic field (exchange anisotropic magnetic field) at the interface between the first pinned magnetic layer 12A and the antiferromagnetic layer 11. The thickness ratio of the first pinned magnetic layer 12A to the second pinned magnetic layer 12C may be set in a appropriate range to increase the exchange coupling magnetic field (Hex), An appropriately selected thickness ratio maintains the magnetizations of the first and second pinned magnetic layers 12A and 12C in a thermally stable antiparallel state (ferrimagnetic state). In addition, a rate of change in resistance ($\Delta R/R$) comparable in the same level as conventional elements may be ensured. By controlling the magnitude and direction of a magnetic field during heat treatment, the magnetization directions of the first and second pinned magnetic layers 12A and 12C may be controlled in desired directions.

The nonmagnetic conductive layer 13 may be made of Cu and may have a thickness in the range of about 20 angstroms through about 25 angstroms.

The free magnetic layer 14 may have a thickness in the range of about 20 angstroms through about 25 angstroms, and in one aspect is made of the same material as the pinned magnetic layers 12A and 12B.

The backed layer B1 may be made of a metallic material such as Cu, or a nonmagnetic conductive material, such as a material selected from Au, Ag, and Cu. The backed layers B1 may have a thickness in the range of about 12 angstroms through about 20 angstroms.

The protecting layer 15 may be made of Ta. The surface of the protecting layer 15 may have an oxide layer 15a formed by oxidation. The protecting layer 15 may be formed so that both side regions in the track width direction (the X1 direction shown in FIG. 1) are shorter than the upper surface of the lamination 16, thus exposing the both side portions of the backed layer B1 of the lamination 16.

Each of the bias base layers 17a may be a buffer film or oriented film, and may be made of Cr or the like. The thickness of each bias base layer 17A is in the range of about 20 angstroms through about 50 angstroms. In one aspect, each bias base layer 17a has a thickness of about 35 angstroms. Each of the intermediate layers 19 may be made of Ta, and may have a thickness of about 50 angstroms.

The bias base layers 17a and the intermediate layers 19 function as a diffusion barrier when exposed to high temperature such as during the curing of the insulating resist (UV curing or hard baking) in the process for manufacturing an inductive head (write head). The bias base layers 17a also prevent thermal diffusion between the hard bias layers 17 and the peripheral layers, and also prevent deterioration of magnetic properties in the hard bias layers 17.

In one aspect, each of the hard bias layers 17 has a thickness in the range of about 200 angstroms through about 500 angstroms and bias layer 17 may be made of a CoPt alloy, a Co—Cr—Pt (cobalt-chromium-platinum) alloy, a Co—Cr—Ta (cobalt-chromium and tantalum) alloy, or the like.

The hard bias layers 17 are magnetized in the X1 direction shown in FIG. 1 to orient magnetization of the free magnetic layer 14 in the X1 direction. As a result, the variable magnetization of the free magnetic layer 14 and the pinned magnetization of the second pinned magnetic layer 12C cross at 90°.

In one aspect, the hard bias layers 17 are arranged at the same layer position as the free magnetic layer 14. The hard bias layers 17 may have a thickness greater than that of the free magnetic layer 14 in the thickness direction of the free magnetic layer 14. The upper surfaces 17b of the hard bias layers 17 are arranged farther away from the substrate 10 than the upper surface 14A of the free magnetic layer 14 (i.e., arranged on the upper side. The lower surfaces of the hard bias layers 17 are arranged nearer the substrate 10 than the lower surface of the free magnetic layer 14 (i.e., arranged on the lower side).

The junction points between the upper surfaces 17b of the hard bias layers 17 and the sides of the lamination 16 are in one aspect located at positions nearer the substrate 10 than the upper edges 16a of the sides of the lamination 16 (e.g., on the lower side of FIG. 1), and lower than the top positions of the hard bias layers 17 (in the example shown in FIG. 1, both side ends of the upper surfaces 17b of the hard bias layers 17) at a distance from the lamination 16. As a result, flux control of a magnetic field applied to the free magnetic layer 14 from the hard bias layers 17 occurs. A leakage magnetic field from the hard bias layers 17 is less absorbed by an upper shield layer or the like formed above the lamination 16 to prevent a decrease in the effective magnetic field applied to the free magnetic layer 14. The free magnetic layer 14 may be easily put into a single magnetic domain state, permitting sufficient domain control of the free magnetic layer 14.

Each of the electrode layers 18 may have comprises a single film or multilayer film of at least one element selected from Cr, Au, Ta, and W, thus decreasing the resistance value. In one aspect, Cr is selected for the electrode layers 18, and is grown epitaxially on the intermediate layers 19 made of Ta to form the electrode layers 18, thus decreasing the electric resistance value.

The electrode layers 18 are extended to the exposed portions of the backed layer B1 at the top of the lamination 16. The electrode layers form the overlay portions 18a, which are adhered to the lamination 16 and connected to the backed layer B1.

The dimension of the top portion of the lamination 16, in which the overlay portions 18 are not formed, in the direction of the track width (the X1 direction shown in FIG. 1) is the optical track width dimension O-Tw. The magnetic track width dimension M-Tw is defined by the width dimension of the sensitive region. The optical track width dimension O-Tw may be the same as the magnetic track width dimension M-Tw. The magnetic track width dimension M-Tw may be slightly greater than the optical track width dimension O-Tw.

The sensing current supplied to the lamination from the electrode layers 18 flows less into the lamination through the hard bias layers 17, thus increasing to increase the ratio of the sensing current flowing directly into the lamination 16 without passing through the hard bias layers 17. In one aspect, the junction area between the lamination and the electrode layers 18 can be increased to decrease junction resistance that does not contribute to the magnetoresistive effect, thus improving the reproduction properties of the element.

In one aspect, the sensing current is supplied to the lamination 16 from the electrode layers 18. When a magnetic field is applied from the magnetic recording medium in the Y direction shown in FIG. 1, magnetization of the free magnetic layer 14 is changed from the X1 direction to the Y direction. At the same time, spin-dependent conduction electron scattering occurs in the interface between the nonmagnetic conductive layer 13 and the free magnetic layer 14, thus changing the electric resistance. Accordingly, the leakage magnetic field from the recording medium is detected.

In the spin valve thin film element, the mean free path of +spin (up-spin) electrons contributing the magnetoresistive effect is lengthened by the backed layer B1 to obtain a higher rate of change in resistance ΔR/R due to the spin filter effect, thus making it possible to comply with higher-density recording.

The spin filter effect is described below.

Figure 18A:
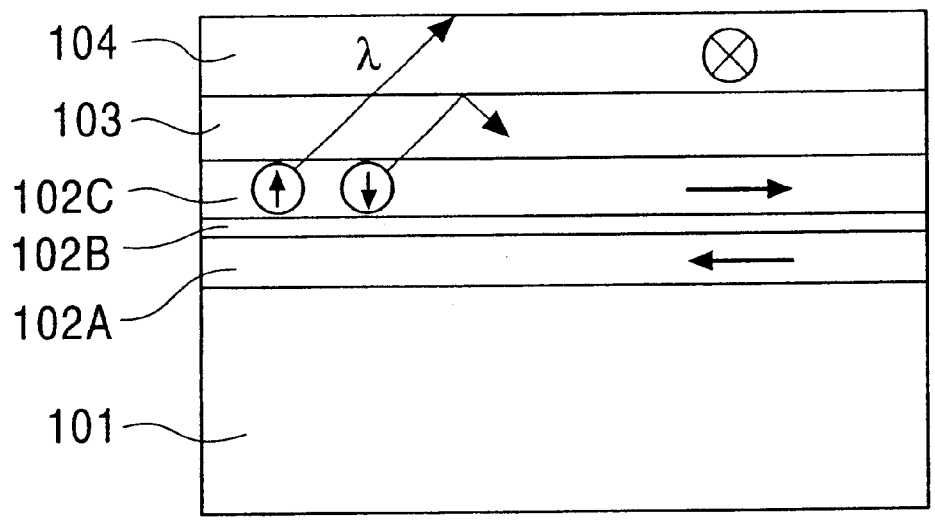
FIGS. 18(a) and 18(b) are schematic drawings illustrating the contribution of a backed layer.
Figure 18B:
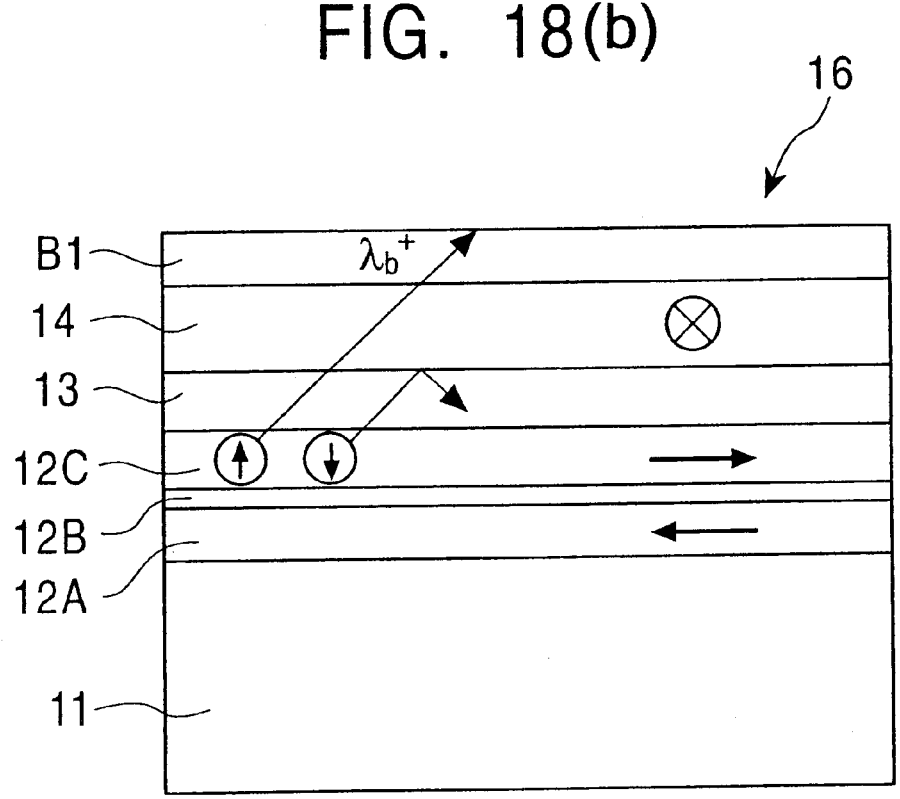

FIGS. 18(a) and 18(b) are schematic drawings illustrating the contribution of the backed layer B1 to the spin filter effect in the spin valve thin film element.

The giant magnetoresistive GMR effect observed in a magnetic material is mainly due to "spin-dependent scattering" of electrons. Namely, the GMR effect utilizes the difference between the mean free path ($\lambda^+$) of conduction electrons having spin (for example, +spin (up spin)) parallel to the magnetization direction of a magnetic material, i.e., the free magnetic layer 14, and the mean free path ($\lambda^-$) of conduction electrons having spin (for example, -spin (down spin)) antiparallel to the magnetization direction of the magnetic material. In FIGS. 18(a) and 18(b), conduction electrons having up spin are denoted by upward arrows, and conduction electrons having down spin are denoted by downward arrows. In FIG. 18(a), reference numerals 101 to 104 correspond to the spin valve thin film element shown in 18(b).

In passage of electrons through the free magnetic layer 14, the electrons with +spin parallel to the magnetization direction of the free magnetic layer 14 freely move, while the electrons with -spin are immediately scattered.

This is because the mean free path $\lambda^+$ of the electrons with +spin is, for example, about 50 angstroms, while the mean free path $\lambda^-$ of the electrons with -spin is about 6 angstroms, which is as small as about one tenth.

In one aspect, the thickness of the free magnetic layer 14 is set to be greater than the mean free path X of -spin electrons of about 6 angstroms, and smaller than the mean free path $\lambda^+$ of +spin electrons of about 50 angstroms.

Therefore, in passage through the free magnetic layer 14, -spin conduction electrons (minority carriers) are effectively blocked by the free magnetic layer 14 (i.e., filtered out), while +spin conduction electrons (majority carriers) substantially move through the free magnetic layer 14.

The majority carriers and minority carriers produced in the second pinned magnetic layer 12C, i.e., +spin electrons and -spin electrons corresponding to the magnetization direction of the second pinned magnetic layer 12C, move toward the free magnetic layer 14 to cause charge movement, i.e., carriers.

These carriers are scattered in different states when magnetization of the free magnetic layer 14 is rotated. Namely, the difference between the states of passage through the free magnetic layer 14 brings about the above GMR effect.

Although the electrons moving from the free magnetic layer 14 to the second pinned magnetic layer 12C also contribute to GMR, the electrons moving from the second pinned magnetic layer 12C to the free magnetic layer 14 and the electrons moving from the free magnetic layer 14 to the second pinned magnetic layer 12C, on average, move in the same direction. Therefore, the electrons moving from the free magnetic layer 14 to the second pinned magnetic layer 12C are not described here. In regard to electrons produced in the nonmagnetic conductive layer 13, the number of +spin electrons is equal to the number of -spin electrons, and thus the total of the mean free paths is not changed. Therefore, these electrons are also not described here.

The number of the minority carriers produced in the second pinned magnetic layer 12C and passing through the nonmagnetic conductive layer 13, i.e., the number of -spin electrons, equals the number of the -spin electrons scattered at the interface between the second pinned magnetic layer 12C and the nonmagnetic conductive layer 13. The -spin electrons are scattered in the vicinity of the interface between the nonmagnetic conductive layer 13 and the second pinned magnetic layer 12C before they reach the interface with the free magnetic layer 14. Namely, even when the magnetization direction of the free magnetic layer 14 is rotated, the mean free path of the -spin electrons is not changed, and remains short as compared with the mean free path of the +spin electrons, thereby causing no influence on a change in resistance value which contributes to the rate of change in resistance resulting in the GMR effect.

Therefore, for the GMR effect, only the behavior of the +spin electrons may be taken into consideration.

The majority carriers produced in the second pinned magnetic layer 12C, i.e., the +spin electrons, move through the nonmagnetic conductive layer 13 shorter than the mean free path $\lambda^+$ of the +spin electrons to reach the free magnetic layer 14.

With no external magnetic field applied to the free magnetic layer 14 to cause no rotation of the magnetization direction of the free magnetic layer 14, the majority carriers can freely pass through the free magnetic layer 14 because the +spin electrons have +spin parallel to the magnetization direction of the free magnetic layer 14.

Furthermore, as shown in FIG. 18B, the +spin electrons passing through the free magnetic layer 14 move in the backed layer B1 for the additional mean free path $\lambda^+_b$ determined by the material of the backed layer B1, and are then scattered. Without the backed layer B1, as shown in FIG. 18A, the +spin electrons move in the free magnetic layer 14, and are then scattered by the upper surface of the free magnetic layer 14. With the backed layer B1 provided, the mean free path is lengthened by the additional mean free path $\lambda^+_b$.

Therefore, by using a conductive material having a relatively low resistance value (i.e., a long mean free path), the resistance value of the spin valve thin film element is decreased.

When the magnetization of the free magnetic layer 14 is rotated by applying an external magnetic field, the +spin electrons are scattered in the free magnetic layer 14 due to the difference between the magnetization direction of the magnetic material and the spin direction, thereby abruptly decreasing the effective mean free path. Namely, the resistance value is increased.

As a result, in comparison with a case without the backed layer B1, the GMR effect with a higher rate of change in resistance (ΔR/R) may be observed to improve the reproduction output characteristics of the spin valve thin film element.

The variable magnetization direction of the free magnetic layer 14 which influences output asymmetry is described below with reference to the drawings.

Figure 19:
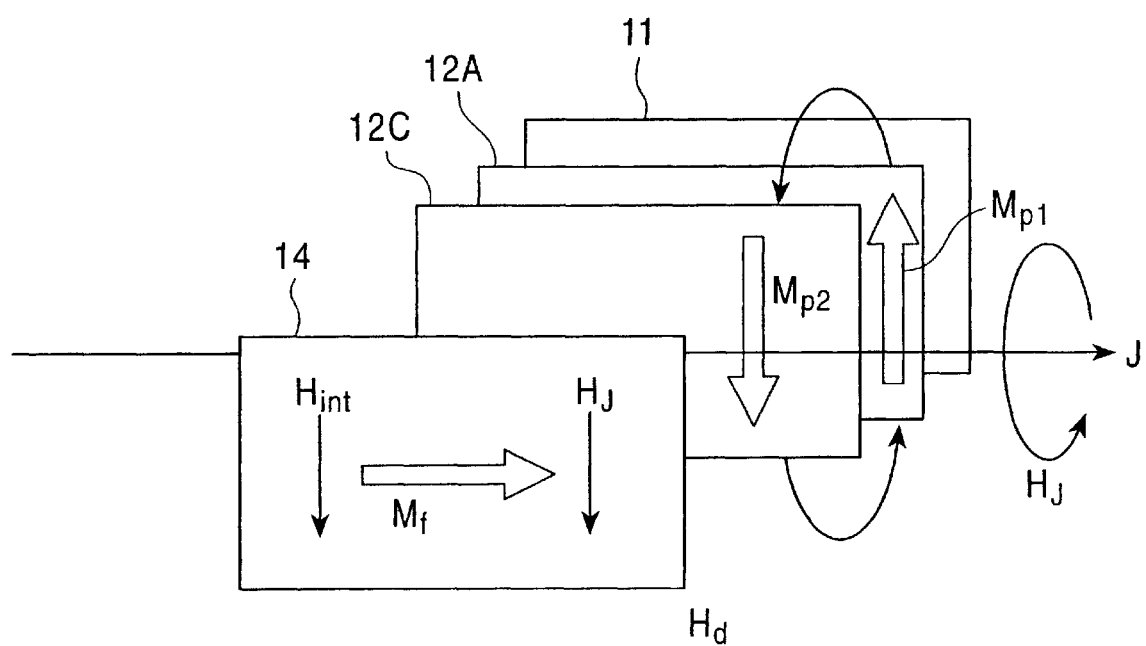
FIG. 19 is a schematic drawing illustrating the direction of variable magnetization of $M_f$ of a free magnetic layer of a spin valve thin film element.

FIG. 19 is a schematic drawing illustrating the direction of variable magnetization $M_f$ of the free magnetic layer 14.

The direction of variable magnetization $M_f$ of the free magnetic layer 14 is influenced by the three magnetic fields—a sensing current magnetic field $H_j$, a demagnetizing (dipole) magnetic field $H_d$, and an interaction magnetic field $H_{int}$. The sensing current magnetic field $H_j$ is due to the sensing current J. The demagnetizing (dipole) magnetic field $H_d$ is due to the pinned magnetization of the pinned magnetic layers 12A and 12C. The interaction magnetic field $H_{int}$ is due to the interlayer interaction between the free magnetic layer 14 and the pinned magnetic layers 12A, 12B and 12C.

When these magnetic fields contribute less to the variable magnetization $M_f$ of the free magnetic layer, asymmetry is decreased. Namely, in order to decrease asymmetry, with no external magnetic field applied, the following condition is satisfied.

$$H_j + H_d + H_{int} = 0$$

The spin valve thin film element of this embodiment is a synthetic-ferri-pinned type. The first and second pinned magnetic layers 12A and 12C are formed with the nonmagnetic intermediate layer 12B provided between the first and second pinned magnetic layers 12A and 12C. The magnetization direction of the second pinned magnetic layer 12C is oriented in antiparallel with the magnetization direction of the first pinned magnetic layer 12A, thus creating a synthetic ferrimagnetic state. The demagnetizing (dipole) magnetic field $H_d$ may be canceled by counteraction between the magnetostatic coupling magnetic field $M_{p1}$ of the first pinned magnetic layer 12A and the magnetostatic coupling magnetic field $M_{p2}$ of the second pinned magnetic layer 12C.

Therefore, the demagnetizing (dipole) magnetic field $H_d$ having an influence on the variable magnetization direction of the free magnetic layer 14 may be made substantially zero ($H_d=0$). This greatly decreases the contribution of the demagnetizing (dipole) magnetic field $H_d$ due to the pinned magnetization of the pinned magnetic layers to the variable magnetization $M_f$ of the free magnetic layer.

A decrease in contribution of the sensing current magnetic field $H_j$ due to the sensing current J influencing asymmetry is described below.

FIGS. 20(a), 20(b), and 20(c) are drawings illustrating a decrease in contribution of the sensing current magnetic field $H_j$ due to the sensing current J to the variable magnetization $M_f$ of the free magnetic layer 14. FIG. 20(a) is a cross-sectional view illustrating an example of the spin valve thin film element without the backed layer, taken along the direction perpendicular to the air bearing surface (ABS) facing a medium. FIG. 20(b) is a cross-sectional view illustrating an example of the spin valve thin film element, taken along the direction perpendicular to the air bearing surface (ABS) facing a medium.

Figure 29:
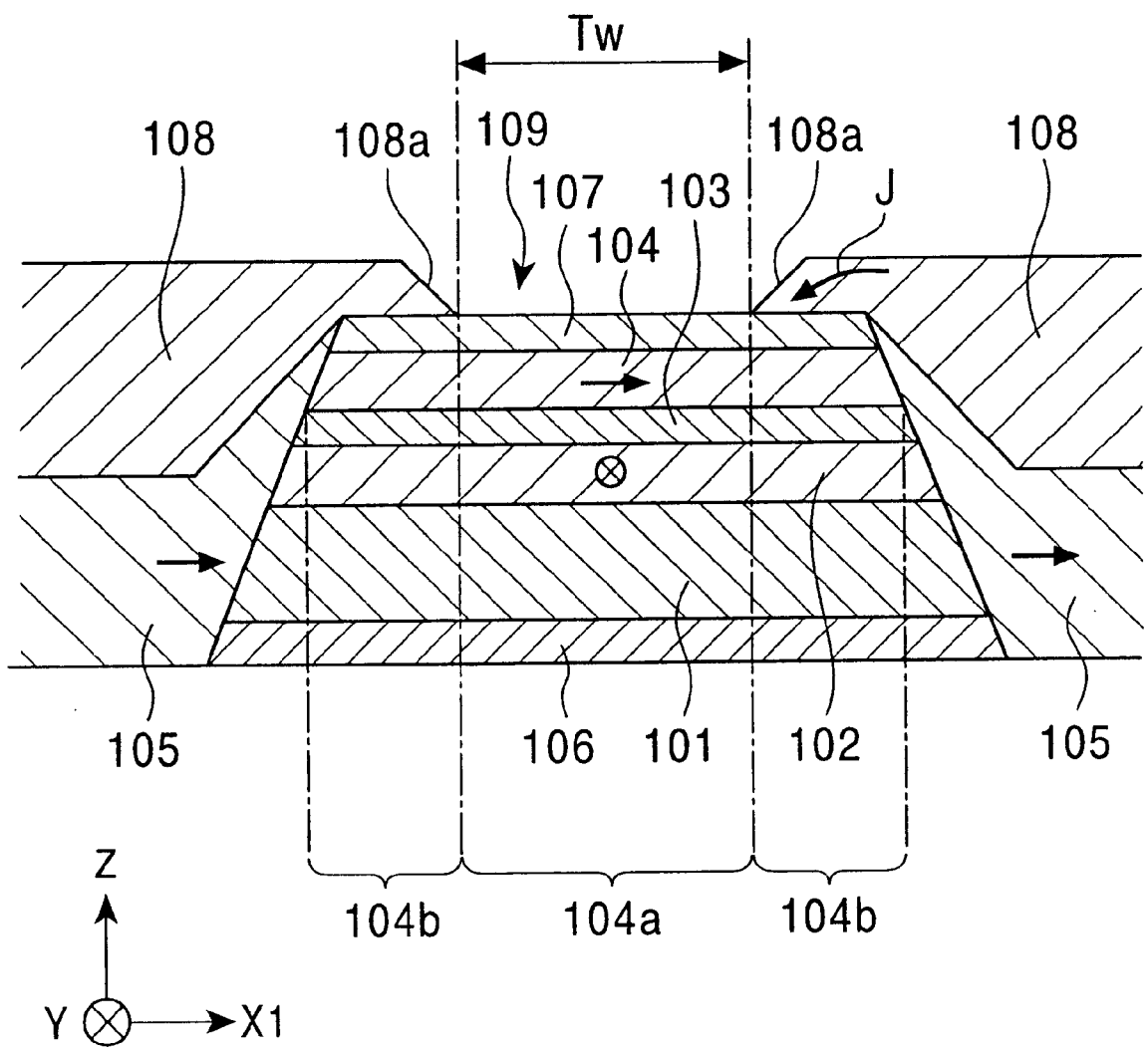
FIG. 29 is a sectional view illustrating the structure of an example of a spin valve thin film magnetic element according to the prior art, as viewed from the side facing a recording medium.
Figure 30:
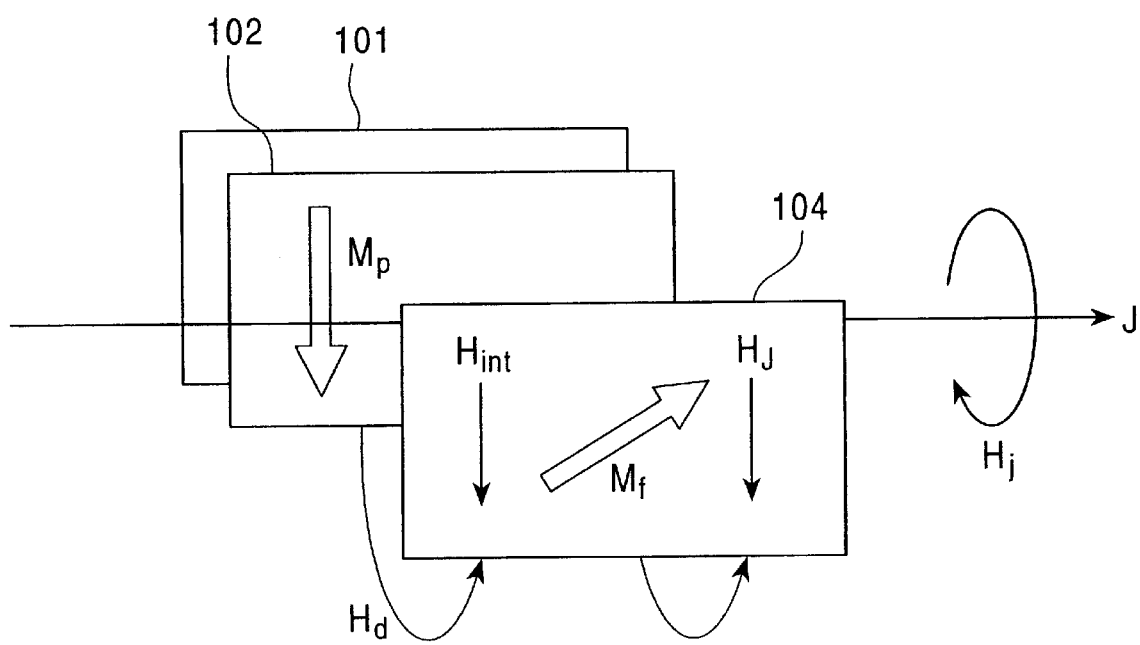
FIG. 30 is a schematic drawing illustrating the direction of variable magnetization $M_f$ of a free magnetic layer of a spin valve thin film magnetic element according to the prior art.

In FIG. 20(a), reference numerals 101 to 104 correspond to the conventional spin valve thin film element without the backed layer shown in FIG. 29. The example shown in FIG. 20(a) is a synthetic-ferri-pinned type in which a first pinned magnetic layer 102A, a nonmagnetic intermediate layer 102B and a second pinned magnetic layer 102C are provided instead of the pinned magnetic layer 102 shown in FIG. 29.

In the bottom type spin valve thin film element without the backed layer, the sensing current J supplied to the antiferromagnetic layer 101, the first pinned magnetic layer 102A, the nonmagnetic intermediate layer 102B, the second pinned magnetic layer 102C, the nonmagnetic conductive layer 103, and the free magnetic layer 104 tends to mainly flow through a portion near the center of the lamination.

However, since the antiferromagnetic layer 101 is present in the lower portion of these layers, the sensing current J tends to flow through a portion below the free magnetic layer 104 at the desired position (i.e., a portion near the lower side of the nonmagnetic conductive layer 103, as shown in FIG. 20(a).)

Therefore, the sensing current magnetic field $H_j$ due to the sensing current J greatly contributes clockwise to the position of the free magnetic layer 104, thereby causing difficulties in correcting the direction of the variable magnetization $M_f$ of the free magnetic layer 104 in the desired direction in order to decrease asymmetry, as described above.

Referring to FIGS. 20(b) and 20(c), the backed layer B1 is provided in one aspect at the top of the lamination 16 to move the center of the current in the lamination 16 to the free magnetic layer 14 side. Therefore, the center of the sensing current J flows through the position of the free magnetic layer 14. As a result, the contribution of the sensing current $H_j$ in the lateral direction in the drawing may be eliminated. Namely, the sensing current magnetic field $H_j$ may be made substantially zero ($H_j=0$).

In other words, the sensing current J shown in FIG. 20(b) is divided into shunt currents J1 and J2 in the same direction in the nonmagnetic conductive layer 13 and the backed layer B1, respectively, as shown in FIG. 20(c). The clockwise magnetic field formed by the shunt current J1 and the counterclockwise magnetic field formed by the shunt current J2 are canceled by each other so that the sensing current magnetic field $H_j$ in the free magnetic layer 14 may be made substantially zero ($H_j=0$).

Therefore, of the three magnetic fields having the influence on the direction of the variable magnetization $M_f$ of the free magnetic layer 14 shown in FIG. 19, the two magnetic fields having great contribution may be substantially canceled.

Namely, the sensing current magnetic field $H_j$ due to the sensing current J, and the demagnetizing (dipole) magnetic field $H_d$ due to the pinned magnetization of the pinned magnetic layers 12A, and 12C are substantially canceled. Therefore, in order to decrease asymmetry, only the interaction magnetic field $H_{int}$ due to interlayer interaction between the free magnetic layer 14 and the pinned magnetic layers 12A and 12C, which has the least contribution, may be taken into consideration.

With the spin valve thin film element not operating (i.e., with no sensing current J supplied to produce no sensing current magnetic field $H_j$,) the variable magnetization $M_f$ of the free magnetic layer 14 may be oriented in a direction near the X1 direction shown in FIG. 1 by magnetization of the hard bias layers 17.

With no sensing current J supplied, the variable magnetization $M_f$ of the free magnetic layer 14 defined by the hard bias layers 17 may be perpendicular to the pinned magnetization $M_p$ of the second pinned magnetic layer 12C. It is thus unnecessary to perform setting so that these magnetization directions do not cross perpendicularly unless the sensing current J is supplied.

With no sensing current J supplied to produce no sensing current magnetic field $H_j$, the variable magnetization $M_f$ of the free magnetic layer 14 may be prevented from being oriented in the direction opposite to the pinned magnetization $M_p$ of the second pinned magnetic layer 12C.

In on aspect, the spin valve thin film element has the overlay portions 18a of the electrode layers 18, which are formed on the hard bias layers 17 to extend to the upper surface of the lamination 16. When the sensing current J is supplied to the second pinned magnetic layer 12C, the nonmagnetic conductive layer 13, and the free magnetic layer 14 from the electrode layers 18, the sensing current J mainly flows into the lamination through the overlay portions 18a.

Consequently, the free magnetic layer 14 has the central portion through which the sensing current J flows, and both side portions through which substantially no sensing current flows.

The sensing current magnetic field $H_j$ is very low over the entire free magnetic layer 14. The central portion 14a through which the sensing current J flows, and both side portions 14b through which substantially no sensing current J flows, do not cause a great difference of contribution of each of the magnetic fields, thereby producing little or no deviation of the magnetization direction over the entire free magnetic layer 14, as shown in FIG. 21.

Figure 21:
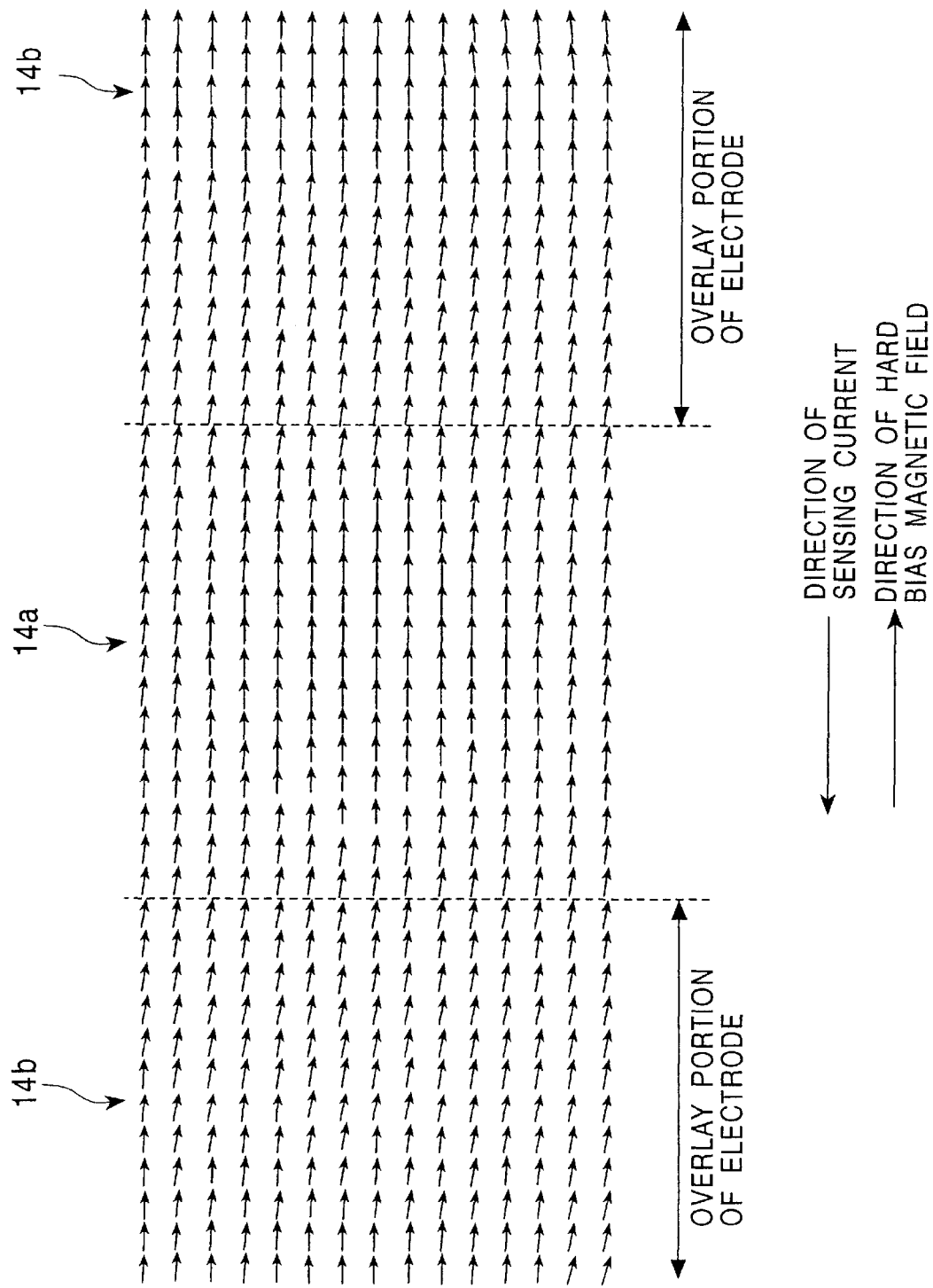
FIG. 21 is a drawing showing a magnetization direction distribution of a free magnetic layer of a spin valve thin film element of the invention.
Figure 31:
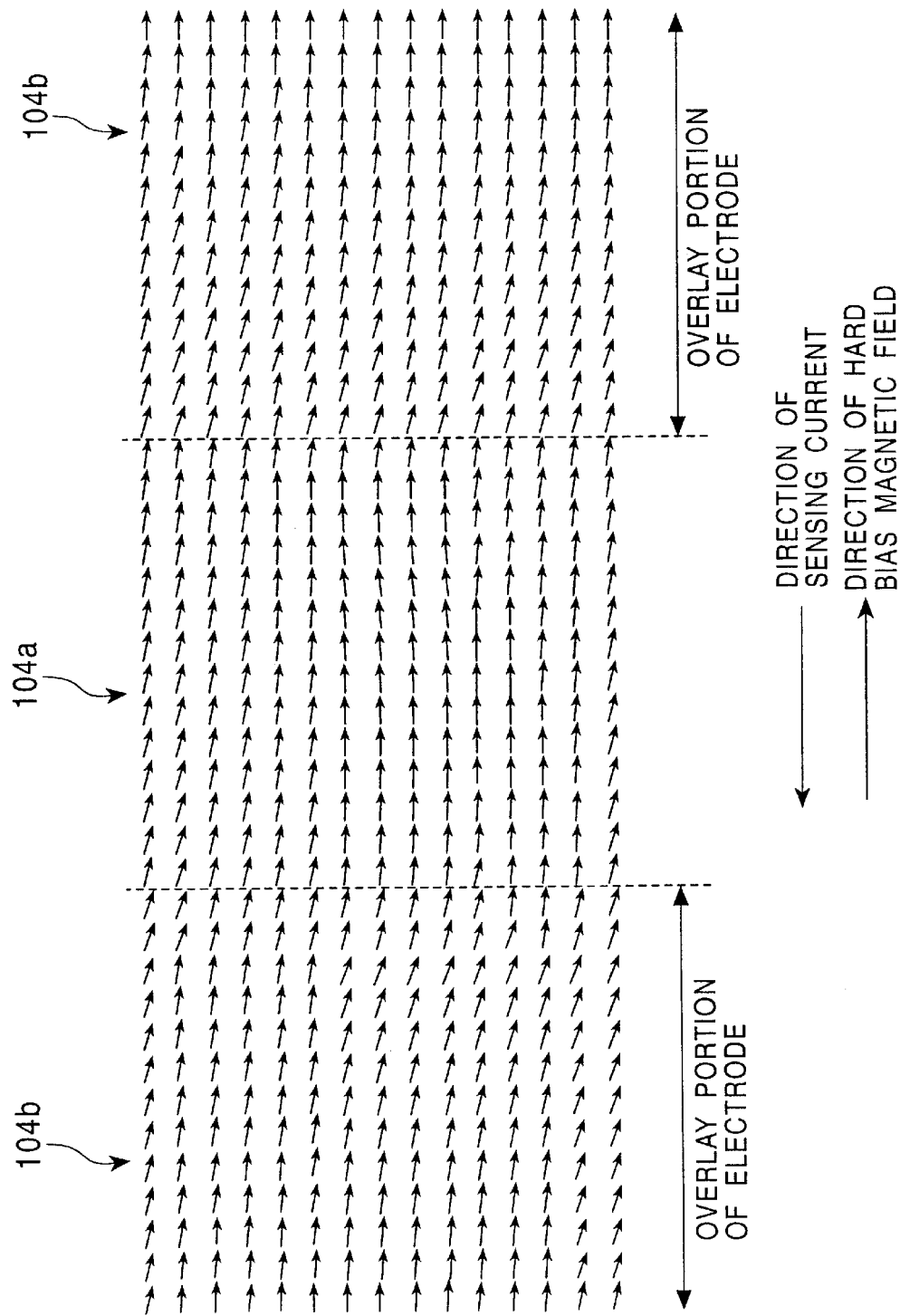
FIG. 31 is a drawing showing a magnetization direction distribution of a free magnetic layer in a spin valve thin film magnetic element according to the prior art.

FIG. 21 is a vector map showing the magnetization distribution of the free magnetic layer 14 measured by micro magnetic simulation with a sensing current of 5 Am supplied to a spin valve thin film element comprising a backed layer B1 made of Cu of about 15 angstroms thick. The difference between the magnetization direction of the central portion 14a of the element and the magnetization direction of both ends portions 14b below the electrode overlay portions 18a is significantly improved as compared with the case without the backed layer shown in FIG. 31.

Figure 32:
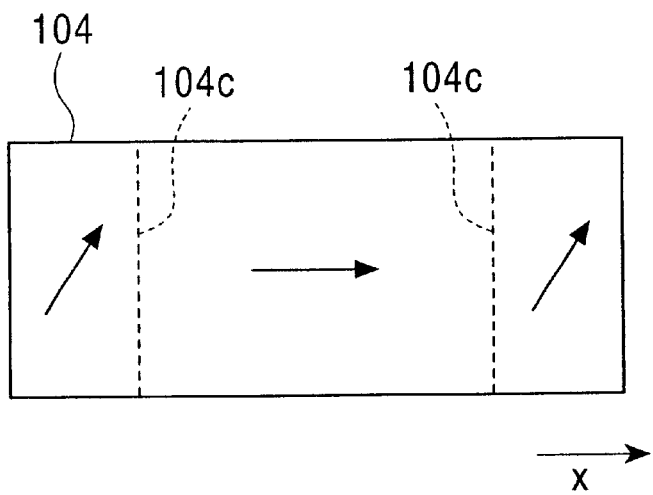
FIG. 32 is a drawing illustrating a state in which domain walls are formed in a free magnetic layer according to the prior art.
Figure 33:
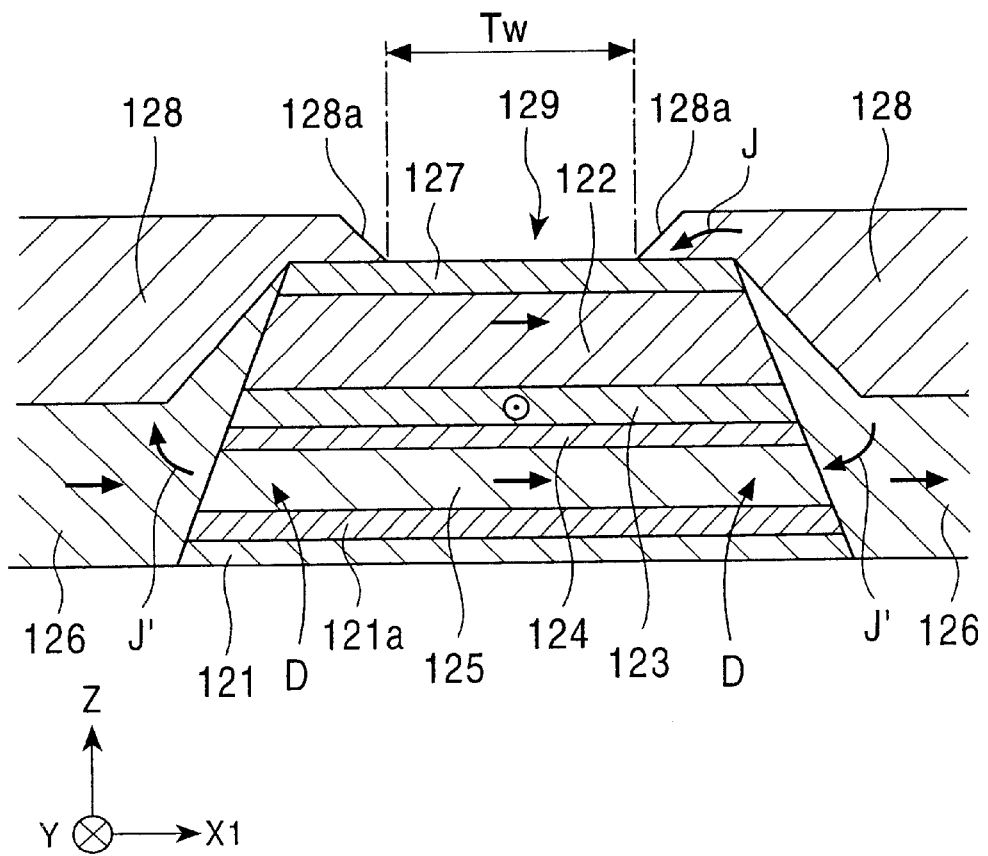
FIG. 33 is a sectional view of a spin valve thin film magnetic element, according to the prior art as viewed from the side facing a recording medium.

It is thus possible to prevent a hindrance to putting the free magnetic layer 14 into a single magnetic domain state due to the formation of domain walls, as shown in FIG. 32, thereby preventing the occurrence of nonuniformity in magnetization. Therefore, in the spin valve thin film element, the occurrence of Barkhausen noise may be prevented, and stability of processing of signals output from the magnetic recording medium may be improved.

Method of manufacturing the spin valve thin film element of this embodiment is described below with reference to the drawings.

FIGS. 2 to 6 are sectional front views illustrating a method of manufacturing a spin valve thin film element of the first embodiment.

The method of manufacturing the spin valve thin film element of the first embodiment includes forming on the substrate 10 a laminated film 16' comprising at least the antiferromagnetic layer 11, the first pinned magnetic layer 12A, the nonmagnetic intermediate layer 12B, the second pinned magnetic layer 12c, the nonmagnetic conductive layer 13 the free magnetic layer 14, and the backed layer B1. The first pinned magnetic layer 12A is formed in contact with the antiferromagnetic layer 11 so that the magnetization direction of the first pinned magnetic layer 12C is pinned by an exchange coupling magnetic field with the antiferromagnetic layer 11. The second pinned magnetic layer 12C is formed on the first pinned magnetic layer 12A. The nonmagnetic intermediate layer 12B is provided between the first and second pinned magnetic layers 12A and 12C. The magnetization direction of the second magnetic layer 12C is oriented in antiparallel with the magnetization direction of the first pinned magnetic layer 12A. The free magnetic layer 14 formed on the second pinned magnetic layer 12C. The nonmagnetic conductive layer 13 is provided between the second pinned magnetic layer 12C and the free magnetic layer 14. The magnetization direction of the free magnetic layer 14 is oriented in the direction crossing the magnetization direction of the second pinned magnetic layer 12C. The backed layer B1 may be made of a nonmagnetic conductive material and is formed in contact with the side of the free magnetic layer 14 opposite to the nonmagnetic conductive layer side.

A lift off resist 72 formed on the laminated film 16'. The lift off resist 72 has notch portions 72a formed on the lower side facing the laminated film 16'. The portions not covered with the lift off resist 72 are removed by ion milling leaving a portion of the antiferromagnetic layer 11 to form the lamination 16 having a substantially trapezoidal sectional shape. The hard bias layers 17 are formed at the same layer position as the free magnetic layer 14 on both sides of the lamination 16 by any one or a combination of ion beam sputtering, long slow sputtering, and collimation sputtering, and the like. The hard bias layers 17 orient the magnetization direction of the free magnetic layer 14 in the direction crossing the magnetization direction of the second pinned magnetic layer 12C. The electrode layers 18 are formed on the hard bias layers 17 and the portions of the lamination 16, (see FIG. 4) which are opposite to the notch portions 72a of the lift off resist 72, by any one or a combination of ion beam sputtering, long slow sputtering, and collimation sputtering using the target 76 (see FIG. 6) opposed to the substrate to be inclined at an angle with the substrate 10, for supplying a sensing current to the lamination 16.

Figure 2:
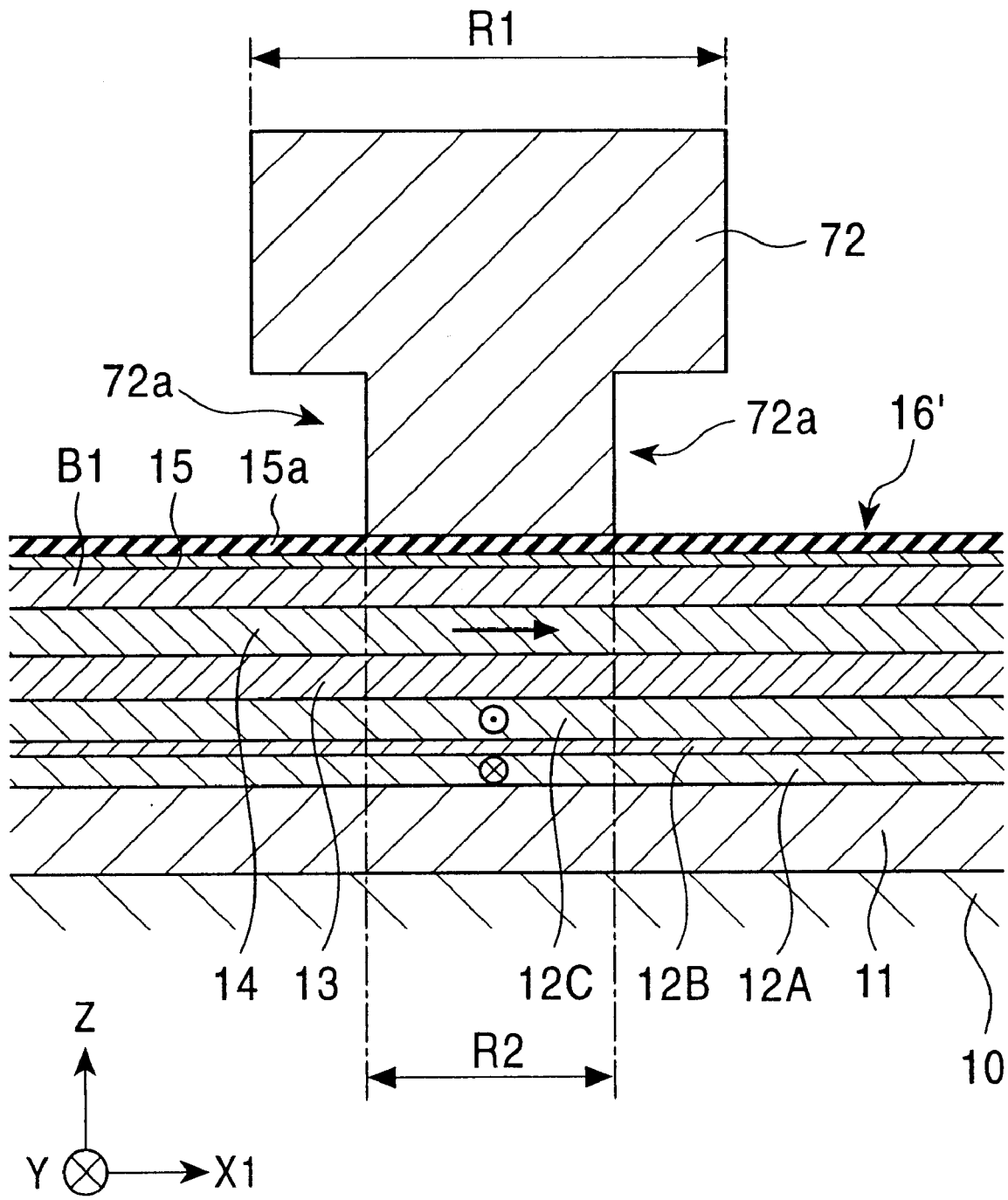
FIG. 2 is a sectional front view illustrating a method of manufacturing a spin valve thin film magnetic element in accordance with the first embodiment of the invention.

Referring to FIG. 2, the laminated film 16' is first formed on the substrate 10. The laminated film 16' comprises at least the antiferromagnetic layer 11, the first pinned magnetic layer 12A, The nonmagnetic intermediate layer 12B, the second pinned magnetic layer 12C, the nonmagnetic conductive layer 13, the free magnetic layer 14, and the back layer B1. The first pinned magnetic layer 12A is formed in contact with the antiferromagnetic layer 11 so that the magnetization direction is pinned by an exchange coupling magnetic field with the antiferromagnetic layer 11. The second pinned magnetic layer 12C is formed on the first pinned magnetic layer 12A. The nonmagnetic intermediate layer 12B is provided between the first and second pinned magnetic layers 12A and 12C. The magnetization direction of the first pinned magnetic layer 12A is oriented in antiparallel with the magnetization direction of the first pinned magnetic layer 12A. The free magnetic layer 14 is formed on the second pinned magnetic layer 12C. The nonmagnetic conductive layer 13 is provided between the second pinned magnetic layer 12C and the free magnetic layer 14. The magnetization direction of the free magnetic layer is oriented in the direction crossing the magnetization direction of the second pinned magnetic layer 12C. The backed layer B1 may be made of a nonmagnetic conductive material and formed in contact with the side of the free magnetic layer 14 opposite to the nonmagnetic conductive layer 13 side.

In one aspect, the antiferromagnetic layer 11 is made from an alloy represented by the formula X—Mn, where X represents at least one element selected from Pt, Pd, Ru, Ir, Rh, and Os, and where X is in the range of about 37 atomic % through about 63 atomic %. The antiferromagnetic layer 11 also may be made of an alloy represented by the formula X'—Pt—Mn, where X' represents at least one element selected from Pd, Cr, Ru, Ni, Ir, Rh, Os, Au, Ag, Ne, Ar, Xe, and Kr, and where the total of X'+Pt is in the range of about 37 atomic % through about 63 atomic %. When the antiferromagnetic layer 11 comprises the above-described material, heat treatment is required for producing an exchange coupling magnetic field at the interface with the first pinned magnetic layer 12A.

Figure 26:
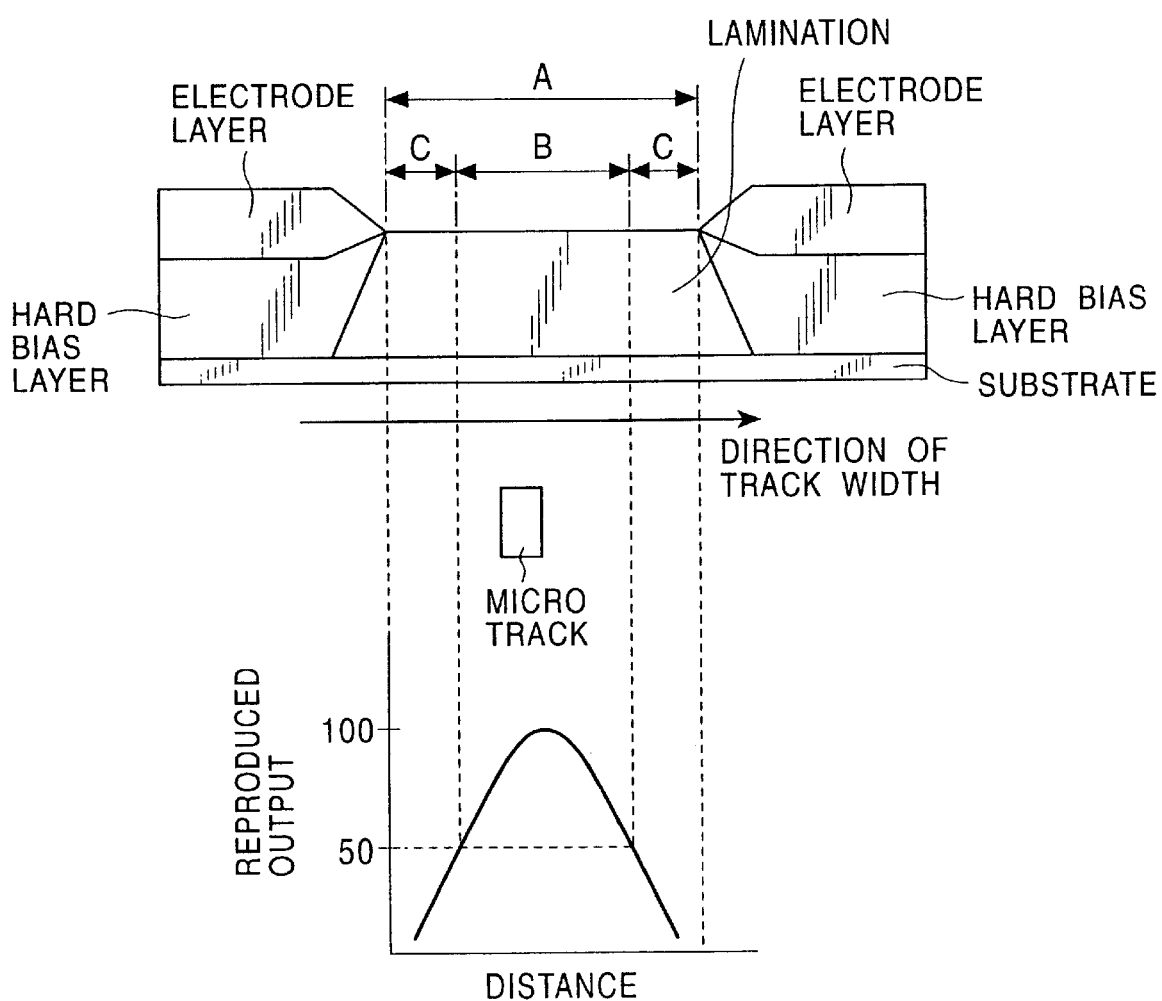
FIG. 26 is a schematic drawing illustrating a method of measuring a sensitive region and dead regions in a lamination of a spin valve thin film magnetic element.

In one aspect, the width dimension of sensitive and dead regions is determined as previously described. A spin valve thin film element of a type in which hard bias layers and electrode layers are formed only on both sides of a lamination, as shown in FIG. 26, is scanned on a micro track on which a signal has been recorded. The scanning occurs in the track width direction to detect reproduced output, and thus determines the sensitive and dead regions. The sensitive region produces reproduced output of 50% or more of the maximum output. The dead regions produce reproduced output of 50% or less of the maximum output.

The lift off resist 72 may be formed on the laminated film 16' with consideration of the width dimension of the dead regions, which in one aspect is determined by the micro track profile technique described above. As shown in FIG. 2, the resist 72 is formed to cover the laminated film 16' with a width dimension R1 in the direction of the track width (the X1 direction shown in FIG. 2). The resist 72 has notch portions 72a formed on the lower side of the resist film 72. The notch portions 72a are formed above the dead regions of the laminated film 16' so that the sensitive region of the laminated film 16' is completely covered with the resist 72 with a width dimension R2.

The track width dimension of the top of the lamination 16 is defined by the width dimension R2.

Figure 3:
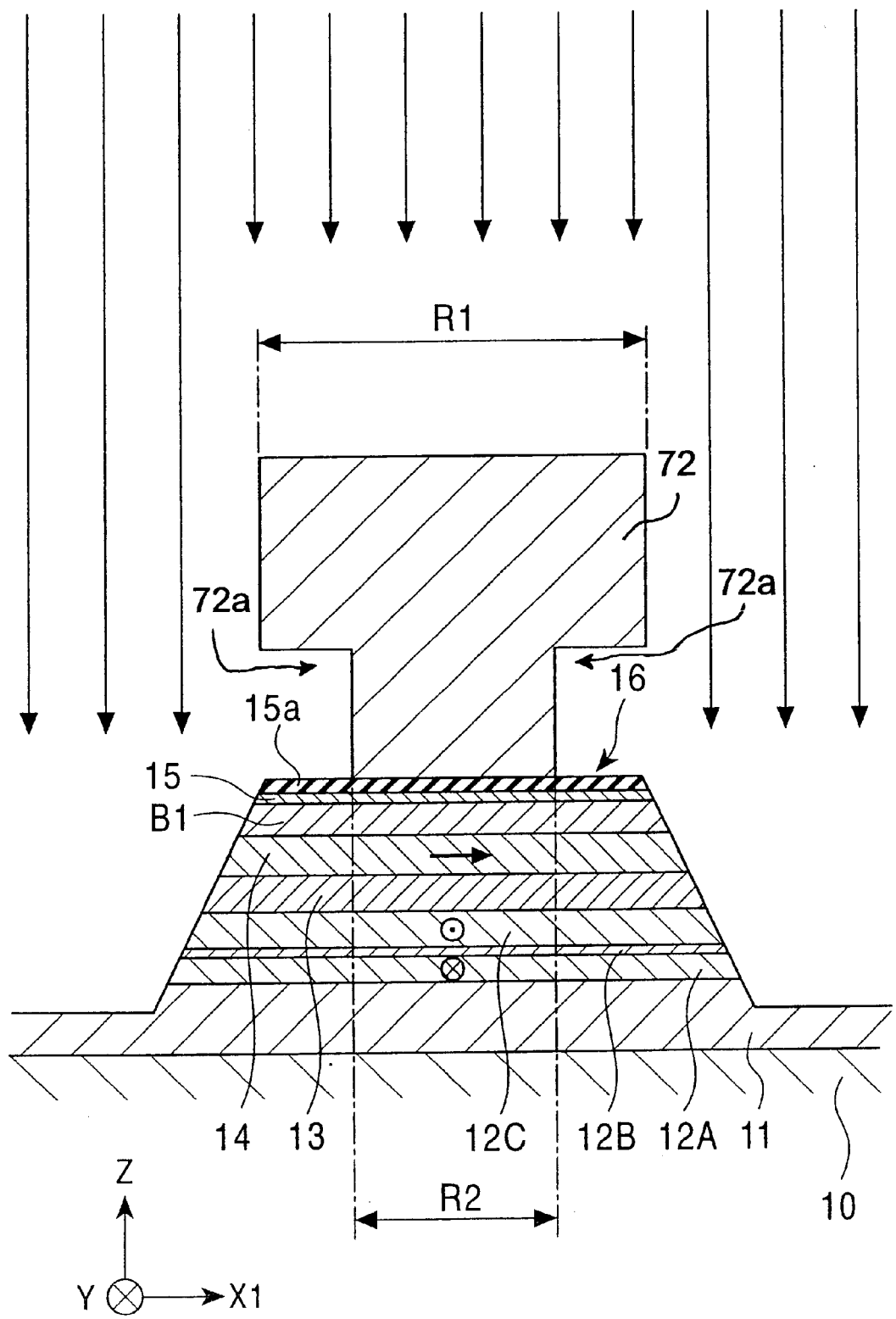
FIG. 3 is a sectional front view illustrating a method of manufacturing a spin valve thin film magnetic element in accordance with the first embodiment of the invention.

Referring to FIG. 3, both sides of the laminated film 16' are removed by etching to leave a lower portion of the antiferromagnetic layer 11 to form the lamination 16.

Figure 4:
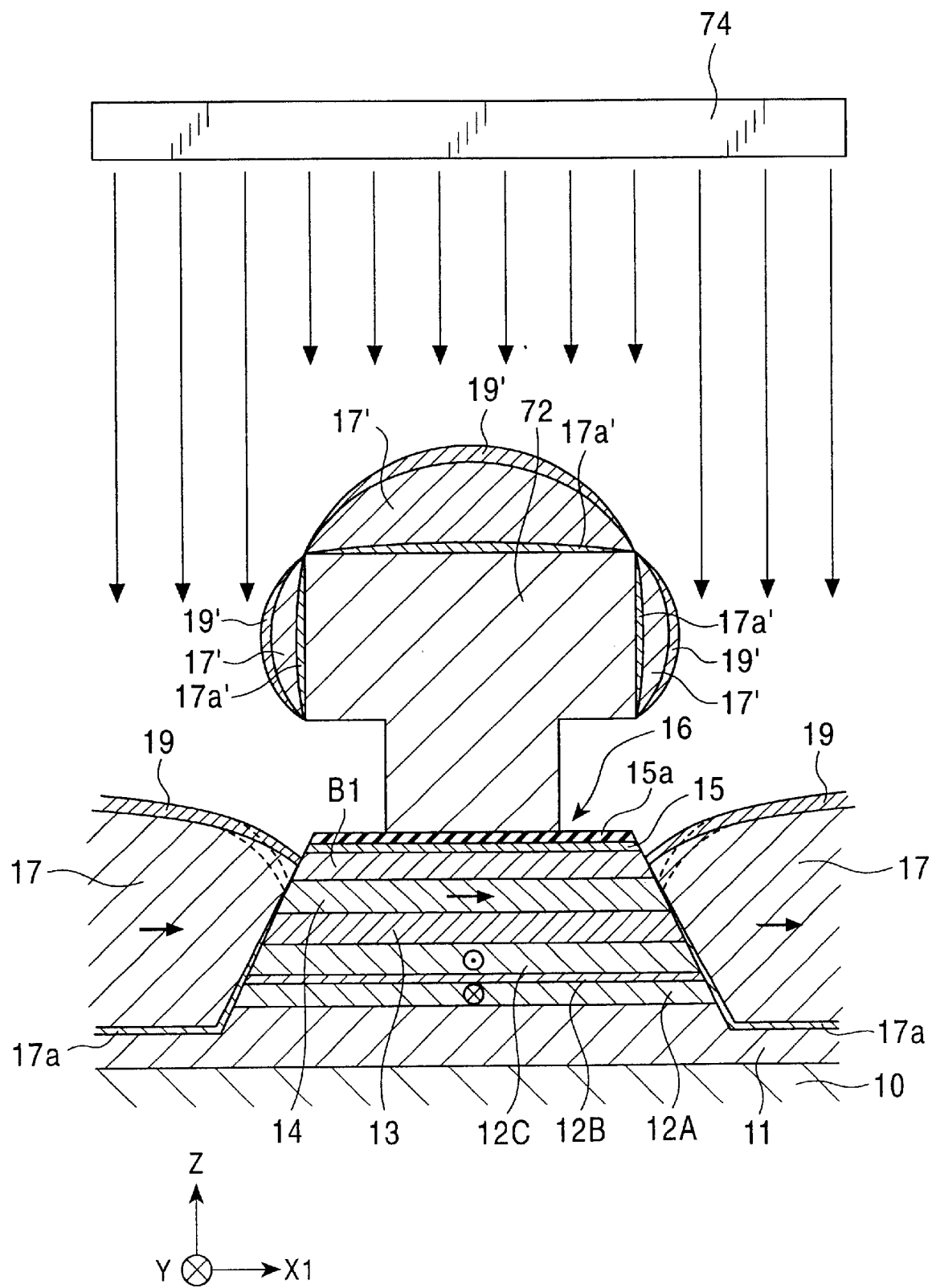
FIG. 4 is a sectional front view illustrating a method of manufacturing a spin valve thin film magnetic element in accordance with the first embodiment of the invention.

Referring to FIG. 4, the bias base layers 17a, the hard bias layers 17, and the intermediate layers 19 are then formed on both sides of the lamination 16.

The sputtering process used for depositing the hard bias layers 17, and depositing the electrode layers in the subsequent step may be any one or a combination of ion beam sputtering, long slow sputtering, collimation sputtering, and the like.

The substrate 10 on which the lamination 16 is formed is arranged substantially perpendicularly to beams emitted from a target 74 comprising the same composition as the hard bias layers 17 so that the hard bias layers 17 may be deposited substantially perpendicularly to the lamination 16 by using ion beam sputtering or other depositing techniques. The hard bias layers 17 are not formed on the portions of the lamination 16 corresponding to the notch portions 72a of the resist 72 formed on the lamination 16. At the same time, layers 17a', 17', and 19' having the same compositions as the bias base layers 17a, the hard bias layers 17, and the intermediate layers 19, respectively, are also formed on the resist 72.

Figure 5:
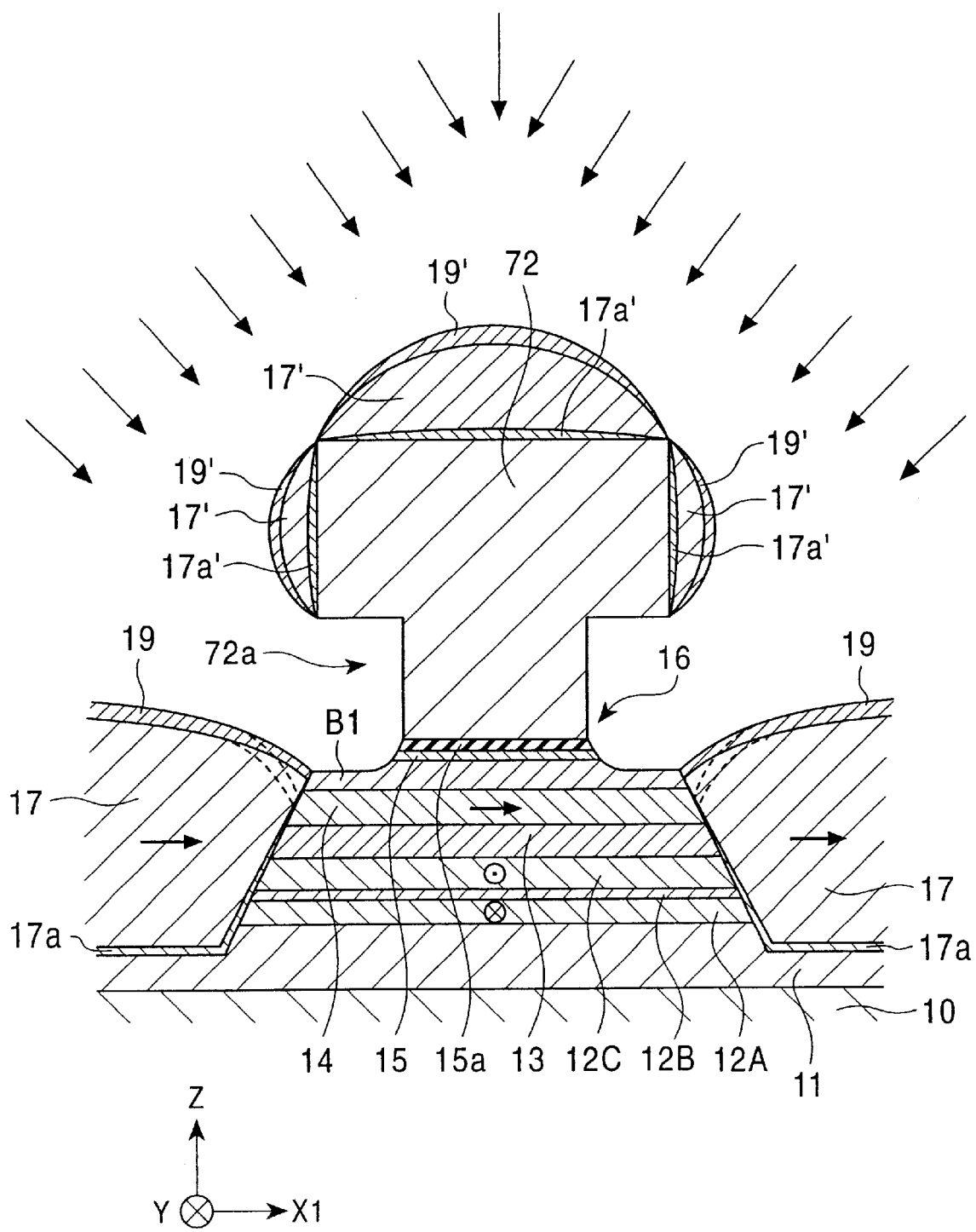
FIG. 5 is a sectional front view illustrating method of manufacturing a spin valve thin film magnetic element in accordance with the first embodiment of the invention.

In FIG. 5, the portions of the surface of the lamination 16 corresponding to the notch portions 72a are removed by ion milling with Ar, reverse sputtering, or the like obliquely to the lamination 16. As a result, the oxide layer 15a, the protecting layer 15 and the backed layer B1 are partly removed to form portions of direct contact between the electrode layers 18 and the lamination 16.

Figure 6:
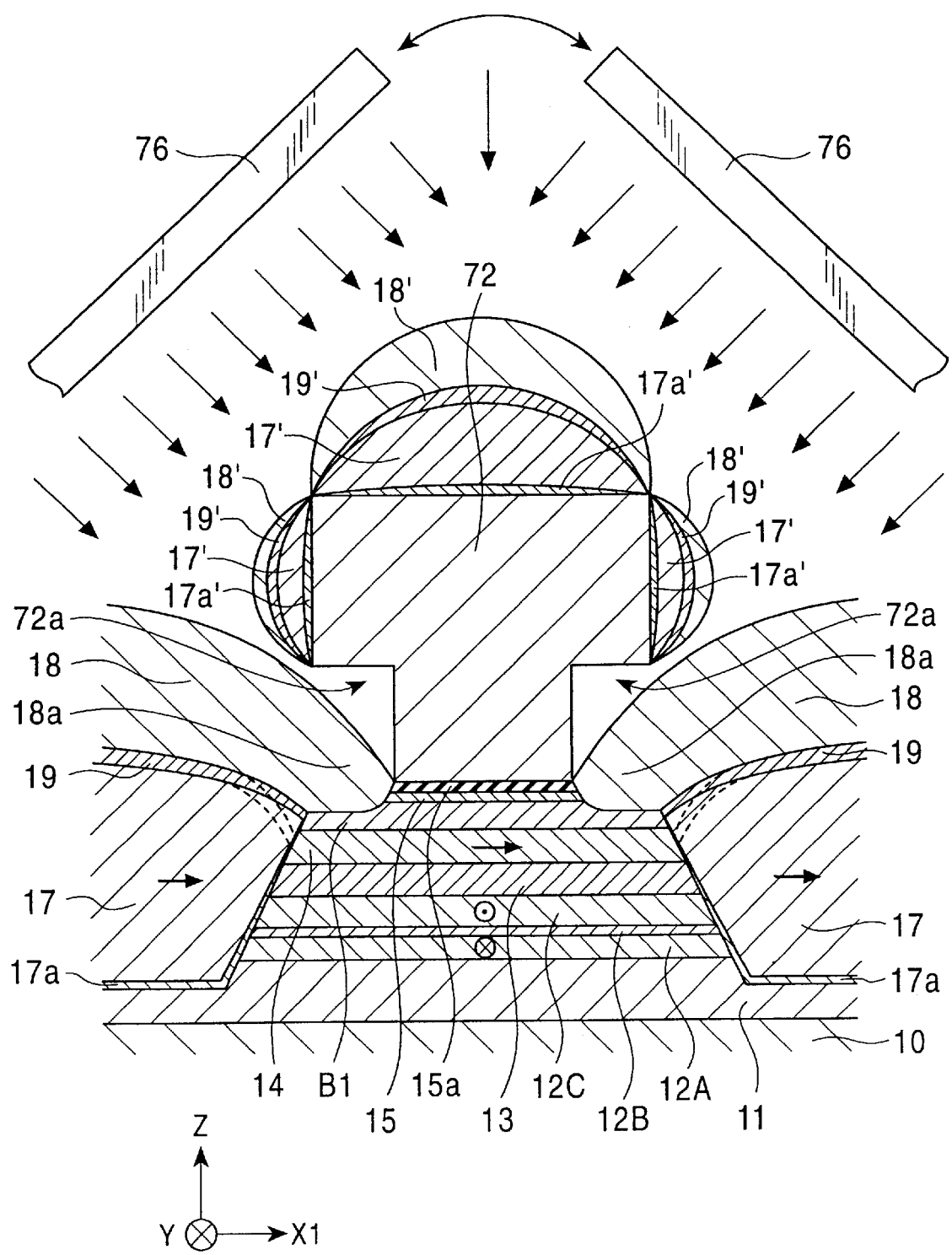
FIG. 6 is a sectional front view illustrating the method of manufacturing the spin valve thin film magnetic element in accordance with the first embodiment of the invention.

In FIG. 6, the electrode layers 18 are deposited on the hard bias layers 17 obliquely to the lamination 16. In this step, the electrode layers 18 are deposited up to the portions of the lamination 16 corresponding to the notch portions 72a of the resist 72 provided on the lamination 16.

In one aspect, a target 76 comprising the same composition as the electrode layers 18 is inclined at an angle with the substrate 10 on which the lamination 16 is formed. The target 76 is rotated during deposition of the electrode layers 18 on the hard bias layers 17 by ion beam sputtering.

The electrode layers 18 formed by oblique sputtering are deposited not only on the hard bias layers 17 but also on the portions of the lamination 16 corresponding to the notch portions 72a of the resist provided on the lamination 16 to form the overlay portions 18a. Namely, the overlay portions of the electrode layers 18 deposited inside the notch portions 72a are deposited to cover the dead regions of the lamination 16.

The target 76 may be obliquely moved or rotated with respect to the substrate 10 fixed. The substrate 10 may be obliquely moved or rotated with respect to the target 76 fixed. As shown in FIG. 6, a layer 18' having the same composition as the electrode layers 18 is also formed on the layer 19' on the resist 72.

The resist 72 shown in FIG. 6 is removed by lift off using a resist separating solution to complete the spin valve thin film magnetic element shown in FIG. 1. The electrode layers 18 are formed to extend to the dead regions of the lamination 16.

In one aspect, the length dimension of each of the overlay portions 18a of the electrode layers 18 in the track width direction is set in the range of about 0.03 μm through about 0.10 μm by setting the dimension of each of the notch portions 72a based on the width dimensions R1 and R2 of the resist 72 in the direction of the track width. When the dimension of each of the overlay portions 18a in the track width direction is set to less than about 0.03 μm, the effect of the overlay portions 18a may not be sufficiently obtained. When the dimension of each of the overlay portions 18a in the track width direction is set to about 0.10 μm or more, the electrode layers 18 must be deposited by sputtering with the target 76 inclined at a high angle with the substrate 10. In this case, the electrode layers 18 having a sufficient thickness may not be formed inside the notch portions 72a. he sensing current shunting to the lamination 16 (GMR film) present below the thin portions (the overlay portions 18a) of the electrode layers 18 cannot be neglected, undesirably causing a trouble of side reading, or the like.

The lamination 16, the hard bias layers 17, and the electrode layers 18 may be formed in the desired shapes by only one time of formation of the photoresist 72. The hard bias layers 17 and the electrode layers 18 may be formed in the desired shapes with the targets 74 and 76, respectively. The targets 74 and 76 are opposed to the substrate 10 in a state in which the targets are selectively inclined or not inclined at an angle with the substrate 10.

Second Embodiment

A method of manufacturing a spin valve thin film magnetic element according to a second embodiment of the invention, and a thin film magnetic head comprising the spin valve thin film magnetic element is be described below with reference to the drawings.

Figure 7:
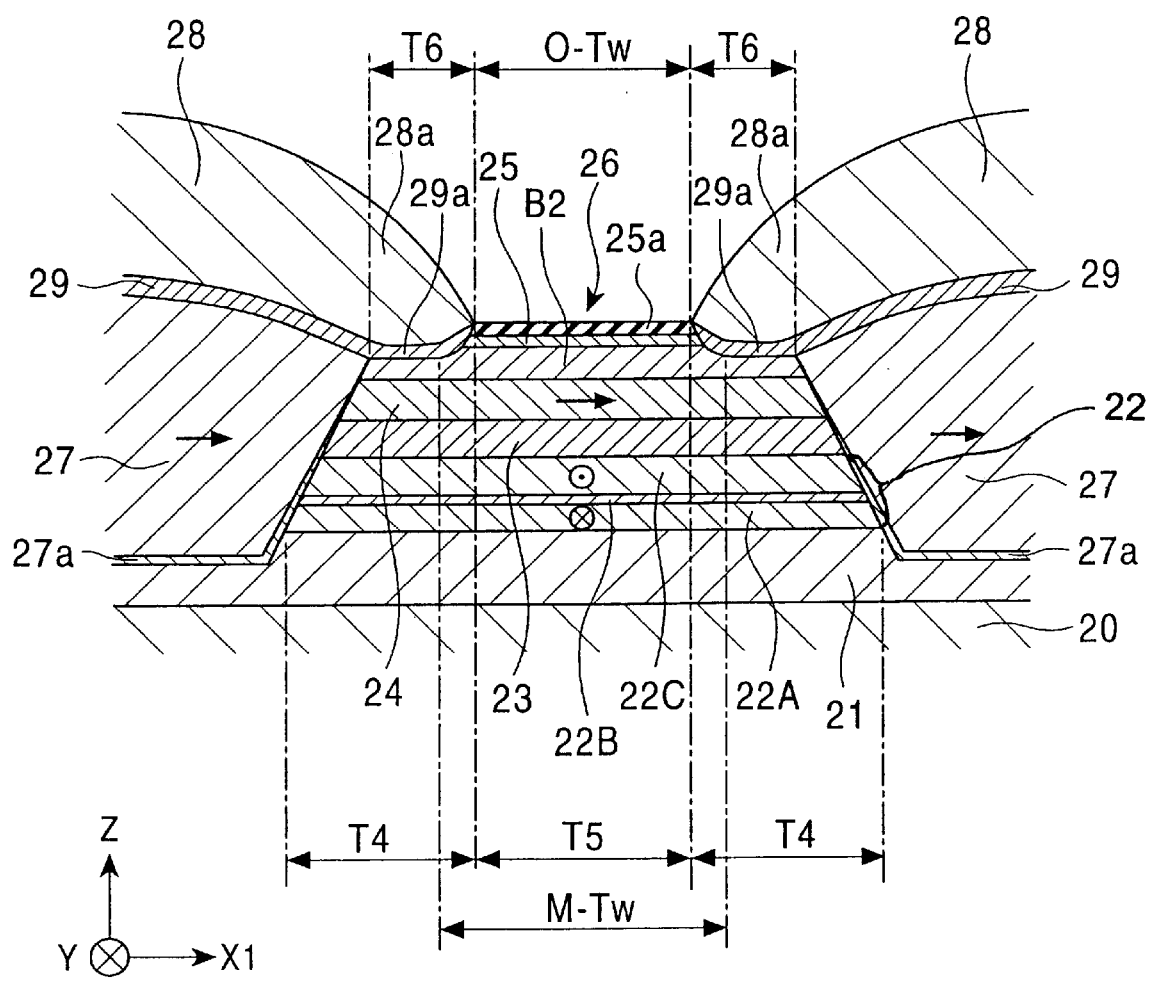
FIG. 7 is a sectional view of a spin valve thin film magnetic element in accordance with a second embodiment of the invention, as viewed from the side facing a recording medium.

FIG. 7 is a sectional view of a spin valve thin film element according to the second embodiment of the invention, as viewed from the side facing a recording medium.

The spin valve thin film element of this embodiment is also the bottom type synthetic-ferri-pinned single spin valve thin film element, which is different from the first embodiment shown in FIGS. 1 to 6 with respect to intermediate layers 29 and the manufacturing method.

In FIG. 7, an antiferromagnetic layer 21 is provided on a substrate 20. Pinned magnetic layer 22 is formed on the antiferromagnetic layer 21.

The pinned magnetic layer 22 includes the first pinned magnetic layer 22A and the second pinned magnetic layer 22C formed on the first pinned magnetic layer 22A. A nonmagnetic intermediate layer 22B is provided between the first and second pinned magnetic layers 22A and 22B. The magnetization direction of the second pinned layer 22C is oriented in antiparallel with the magnetization direction of the first pinned magnetic layer 22A.

In one aspect, a nonmagnetic conductive layer 23 made of Cu or the like is formed on the second pinned magnetic layer 22C. A free magnetic layer 24 is formed on the nonmagnetic conductive layer 23. A backed layer B2 is formed on the free magnetic layer 24. A protecting layer 25 made of Ta or the like is formed on the backed layer B2. The protecting layer 25 comprises an oxide layer 25a made of tantalum oxide (Ta-oxide) formed on the upper side the of the protecting layer 25.

As shown in FIG. 7, the layers ranging from a portion of the antiferromagnetic layer 21 to the oxide layer 25a form a lamination 26 having a substantially trapezoidal sectional form.

Hard bias layers 27 are formed on the portions of the antiferromagnetic layer 21, which extend to both sides of the lamination 26. The bias base layers 27a are provided between the antiferromagnetic layer 21 and the lamination 26. Electrode layers 28 are formed on the hard bias layers 27. Intermediate layers 29 of Ta or Cr are provided between the electrode layers 28 and the hard bias layers 27.

The electrode layers 28 are formed to extend to the exposed portions of the backed layer B2 at the top of the lamination 26. The electrode layers 28 form the overlay portions 28a, which are adhered to the lamination 26 and are connected to the backed layer B2.

In this embodiment, the antiferromagnetic layer 21, the first pinned magnetic layer 22A, the nonmagnetic intermediate layer 22B, the second pinned magnetic layer 22C, the nonmagnetic conductive layer 23, the free magnetic layer 24, the protecting layer 25, the lamination 26, the hard bias layers 27, the electrode layers 28, and the overlay portions 28a correspond to the antiferromagnetic layer 11, the first pinned magnetic layer 12A, the nonmagnetic intermediate layer 12B, the second pinned magnetic layer 12C, the nonmagnetic conductive layer 13, the free magnetic layer 14, the protecting layer 15, the lamination 16, the hard bias layers 17, the electrode layers 18, and the overlay portions 18a, respectively, of the first embodiment shown in FIGS. 1 to 6.

The intermediate layers 29 are provided between the hard bias layers 27 and the electrode layers 28. The intermediate layers 29 may comprise, Ta, and may have a thickness of about 50 angstroms.

In one aspect, the intermediate layers 29 are continued to the lamination 26 to respectively form continued portions 29a which extend in the connection portions between the backed layer B2 and the electrode layers 28. Namely, the electrode layers 28 are connected to the backed layer B2 through the continued portions 29a.

The spin valve thin film element of this embodiment exhibits the same effect as the spin valve thin film element of the first embodiment shown in FIGS. 1 to 6. The electrode layers 28 are made of Cr and are formed on the intermediate layers 29 continuously present on the backed layer B1 and the hard bias layers 27. The Cr may be epitaxially grown on the Ta to decrease the resistance value of Cr due to lattice control. Therefore, the DC resistance value may be decreased to improve the rate of change in resistance (ΔR/R).

When exposed to high temperature such as during the curing of the insulating resist (e.g., UV curing or hard baking) in the process for manufacturing an inductive head (e.g., write head), the intermediate layers 29 and the continued portions 29a function as diffusion barrier. It is thus possible to prevent thermal diffusion between the hard bias layers 27 and the electrode layers 28, and between the backed layer B2 and the electrode layers 28. The continued portions 29a prevent deterioration of the magnetic properties in the hard bias layers 27, and prevent deterioration of the layer properties for the spin filter effect in the backed layer B2.

A method of manufacturing the spin valve thin film element of this embodiment is described below with reference to the drawings.

FIGS. 8 to 13 are sectional front views illustrating a method of manufacturing the spin valve thin film element of this embodiment.

The method of manufacturing the spin valve thin film element of this embodiment includes forming a laminated film 26' on the substrate 20. The laminated film 26' comprises at least the antiferromagnetic layer 21 the first pinned magnetic layer 22A, the second pinned magnetic layer 22c, the nonmagnetic intermediate layer 22B, the free magnetic layer 24, the nonmagnetic conductive layer 23, and the backed layer B2. The first pinned magnetic layer 22A is formed in contact with the antiferromagnetic layer 21 so that the magnetization direction of the first pinned magnetic layer 22A is pinned by an exchange coupling magnetic field with the antiferromagnetic layer 21. The second pinned magnetic layer 22C is formed on the first pinned magnetic layer 22A. The nonmagnetic intermediate layer 22B is provided between the first and second pinned magnetic layers 22A and 22C. The magnetization direction of the second pinned magnetic layer 22C is oriented in antiparallel with the magnetization direction of the first pinned magnetic layer 22A. The free magnetic layer 24 is formed on the second pinned magnetic layer 22C. The nonmagnetic conductive layer 23 is provided between the second pinned magnetic layer 22e and the free magnetic layer 24. The magnetization direction of the free magnetic layer 24 is oriented in the direction crossing the magnetization direction of the second pinned magnetic layer 22C. The backed layer B2 may be a nonmagnetic conductive material and is formed in contact with the side of the free magnetic layer 24 opposite to the nonmagnetic conductive layer side. A first lift off resist 70 is formed on the laminated film 26'. The first lift off resist 70 has notch portions 70a formed on the lower side facing the laminated film 26'. Portions not covered with the first lift off resist 70 are removed by ion milling leaving a portion of the antiferromagnetic layer 21 to form the lamination 26 having a substantially trapezoidal sectional shape. The hard bias layers 27 are formed at the same layer position as the free magnetic layer 24 on both sides of the lamination 26 (See FIG. 9) by any one or a combination of ion beam sputtering, long slow sputtering, and collimation sputtering, and the like. The hard bias layers 27 orient the magnetization direction of the free magnetic layer 24 in the direction crossing the magnetization direction of the second pinned magnetic layer 22C.

The first lift off resist 70 is separated from the lamination 26. (See FIG. 10) A second liftoff resist 82 is formed on the lamination 26. (See FIG. 11) The second lift off resist 82 has notch portions 82a formed on the lower side facing the lamination 26. A portion of the second liftoff resist 82 is in contact with the lamination 26, which has a widthwise dimension R4 that is smaller than the widthwise dimension R3 of the portion of the first lift off resist 70 in contact with the lamination 26. The electrode layers 28 are formed on the portions not covered with the second lift off resist 82 (See FIG. 12) by any one or a combination of ion beam sputtering, long slow sputtering, collimation sputtering, and the like. The electrode layers 28 supply a sensing current to the lamination 26.

Similar to the first embodiment shown in FIG. 2, the laminated film 26' is formed on the substrate 20. The laminated film 26' comprises at least the antiferromagnetic layer 21, the first pinned magnetic layer 22A, the second pinned magnetic layer 22C, the nonmagnetic intermediate layer 22B, the free magnetic layer 24, the nonmagnetic conductive layer 23, and the backed layer B2. The first pinned magnetic layer 22A is formed in contact with the antiferromagnetic layer 21 so that the magnetization direction of the first pinned magnetic layer 22A is pinned by an exchange coupling magnetic field with the antiferromagnetic layer 21. The second pinned magnetic layer 22C is formed on the first pinned magnetic layer 22A. The nonmagnetic intermediate layer 22B is provided between the first and second pinned magnetic layers 22A and 22C. The magnetization direction of the second pinned magnetic layer 22C is oriented in antiparallel with the magnetization direction of the first pinned magnetic layer 22A. The free magnetic layer 24 formed on the second pinned magnetic layer 22C. The nonmagnetic conductive layer 23 is provided between the second pinned magnetic layer 22c and the free magnetic layer 24. The magnetization direction of the free magnetic layer 24 is oriented in the direction crossing the magnetization direction of the second pinned magnetic layer 22C. The backed layer B2 may be made from a nonmagnetic conductive material and is formed in contact with the side of the free magnetic layer 24 opposite to the nonmagnetic conductive layer side.

The antiferromagnetic layer 21 may be made from an alloy represented by the formula X—Mn, where X represents one element selected from Pt, Pd, Ru, Ir, Rh, and Os, and where X is in the range of about 37 atomic % through about 63 atomic %. The antiferromagnetic layer 21 also may be made from an alloy represented by the formula X'—Pt—Mn, where X' represents at least one element selected from Pd, Cr, Ru, Ni, Ir, Rh, Os, Au, Ag, Ne, Ar, Xe, and Kr, where the total of X'+Pt is in the range of about 37 atomic % through about 63 atomic %. With the antiferromagnetic layer 21 comprising the above-described material, heat treatment is required for producing an exchange coupling magnetic field at the interface with the first pinned magnetic layer 22A.

Figure 8:
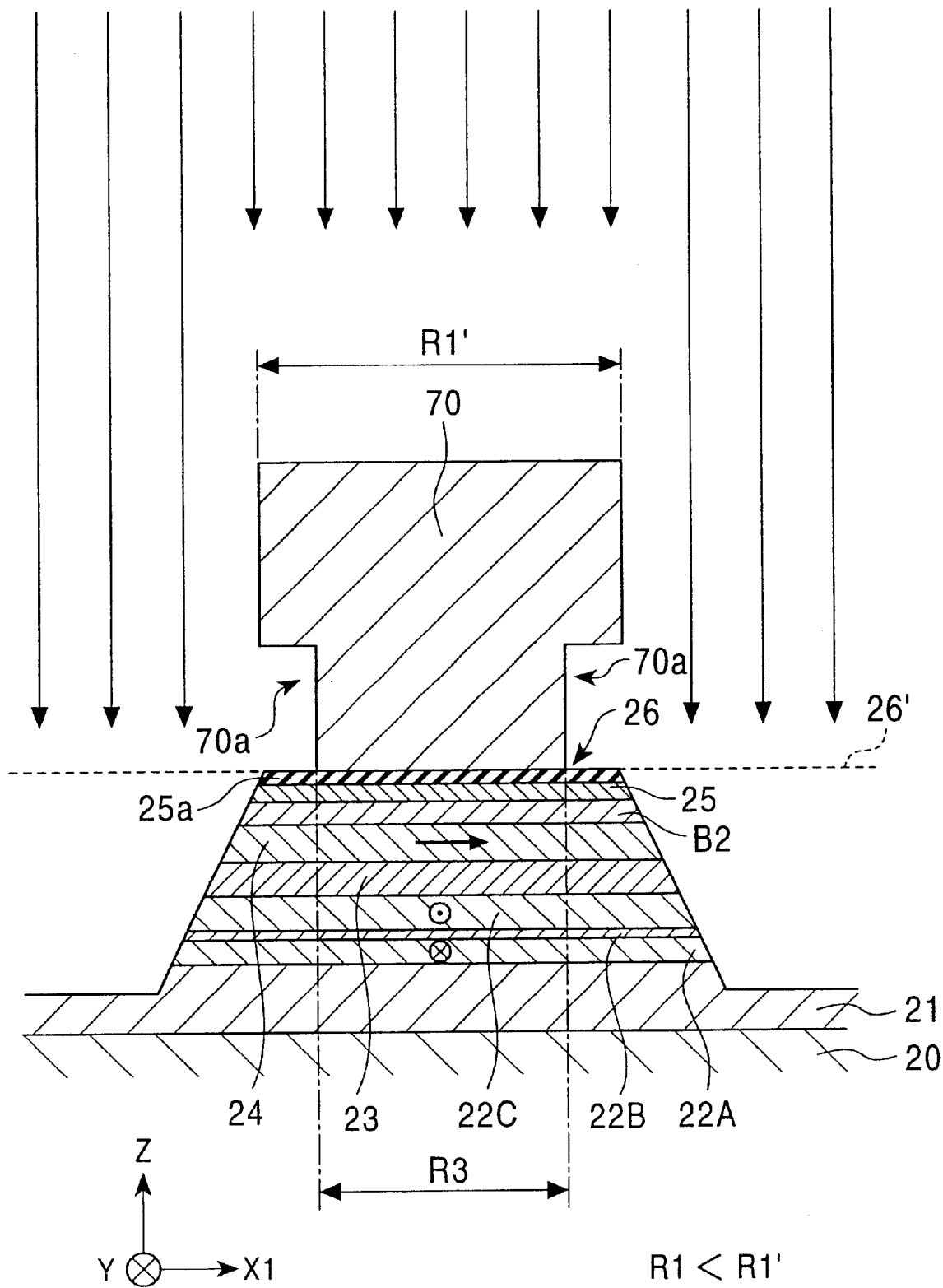
FIG. 8 is a sectional front view illustrating a method of manufacturing a spin valve thin film magnetic element in accordance with the second embodiment of the invention.

The first lift off resist 70 is formed on the laminated film 26'. As shown in FIG. 8, the first liftoff resist 70 is formed to cover the laminated film 26' with a width dimension R1' in the direction of the track width (the X1 direction shown in FIG. 8). The first liftoff resist 70 has a portion in contact with the laminated film 26', which has the width dimension R3 in the track width direction (the X1 direction).

The resist layer 70 also has notch portions 70a formed on the lower side. The notch portions 72a in one aspect have a size that may be lifted off. The width dimension R3 may be set to be greater than the width dimension R2 of the resist 72 shown in FIG. 2 in the X1 direction.

The track width dimension of the top of the lamination 26 is defined by the width dimension R1'. The width dimension R1' of the resist layer 70 may be set to be greater than the width direction R1 of the resist 72 shown in FIG. 2 in the X1 direction, i.e., establish the following relation:

$$R1 < R1'$$

Even when the overlay portions 28a are formed in the dead regions and in the sensitive region, as described above in the fist embodiment, the influence of the sensing current magnetic field may be decreased to improve the reproduction characteristics of the element. Therefore, the magnetic track width of the spin valve thin film element may be defined by the width dimension of the gap between the tips of the overlay portions 28a regardless of the length dimension of each of the overlay portions 28a in the track width direction (i.e., the overlay length).

The length dimension of each of the overlay portions 28a in the track width direction, i.e., the overlay length, may be set to be long.

Figure 9:
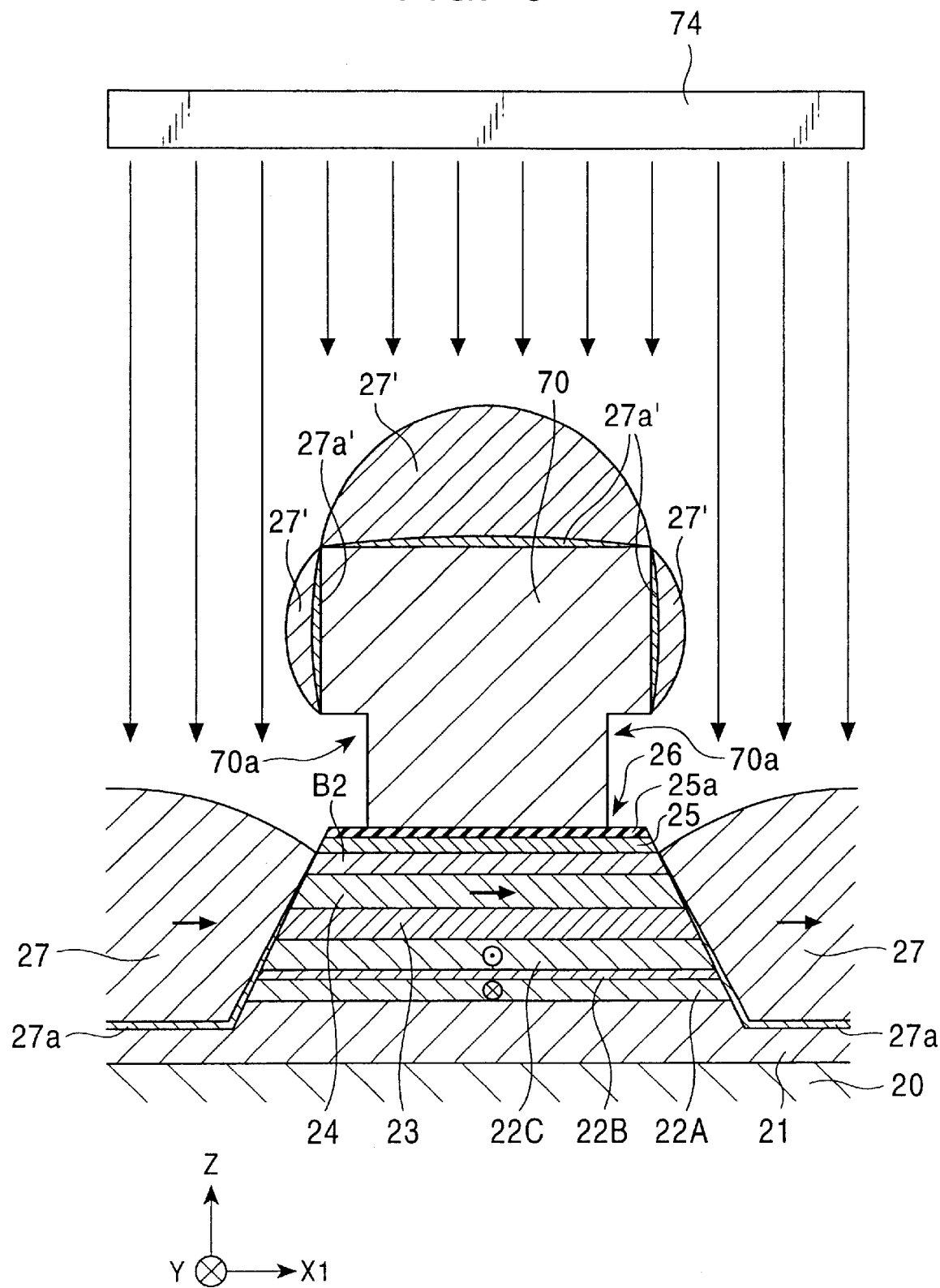
FIG. 9 is a sectional front view illustrating a method of manufacturing a spin valve thin film magnetic element in accordance with the second embodiment of the invention.

In FIG. 8, both sides of the laminated film 26' are removed by etching to leave a lower portion of the antiferromagnetic layer 21 to form the lamination 26. In FIG. 9, the bias base layers 27a, and the hard bias layers 27 are formed on both sides of the lamination 26.

In this embodiment, the sputtering process used for depositing the hard bias layers 27, and depositing the electrode layers 28 in the subsequent step may be any one or a combination of ion beam sputtering, long slow sputtering, collimation sputtering, and the like.

As shown in FIG. 9, in this embodiment, the substrate 20 on which the lamination 26 is formed is arranged substantially perpendicularly to beams emitted from a target 74 comprising the same composition as the hard bias layers 27. The hard bias layers 27 may be deposited substantially perpendicularly to the lamination 26 by using ion beam sputtering or another depositing technique. Therefore, the hard bias layers 27 are not formed on the portions of the lamination 16 corresponding to the notch portions 70a of the resist 70 formed on the lamination 26. At the same time, layers 27a' and 27' having the same compositions as the bias base layers 27a and the hard bias layers 27, respectively, are formed on the resist 70.

Figure 10:
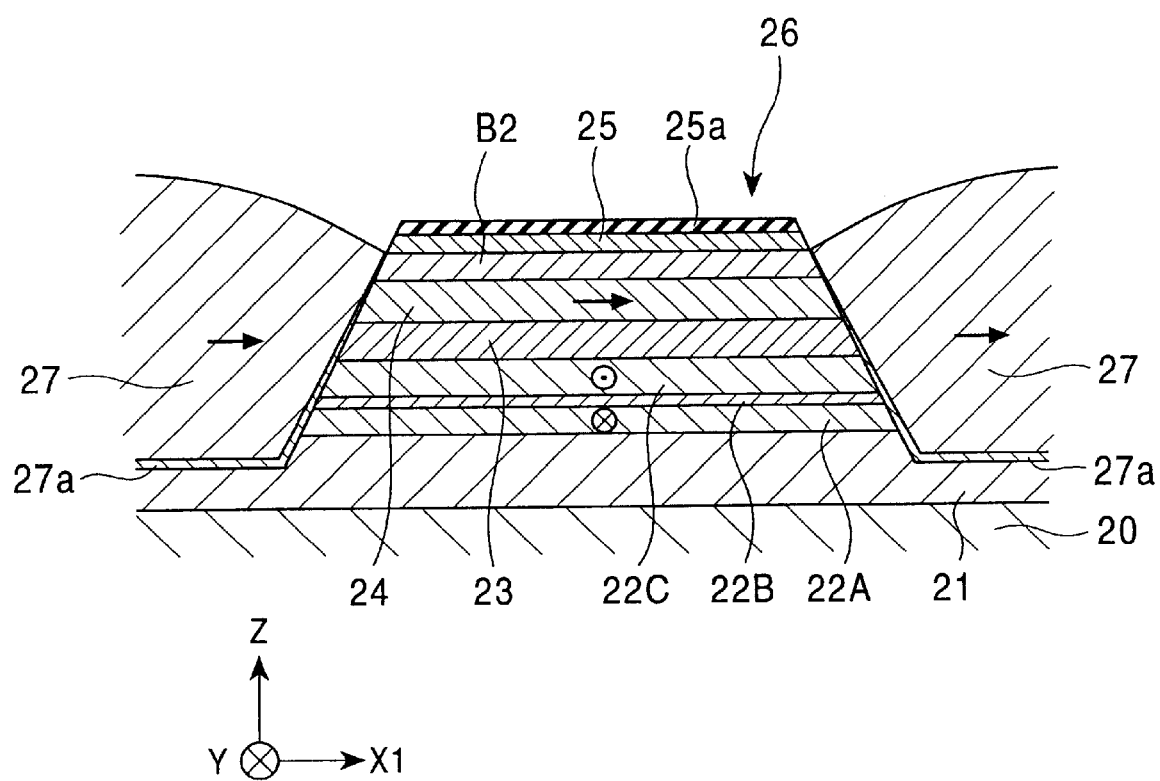
FIG. 10 is a sectional front view illustrating a method of manufacturing a spin valve thin film magnetic element in accordance with the second embodiment of the invention.
Figure 11:
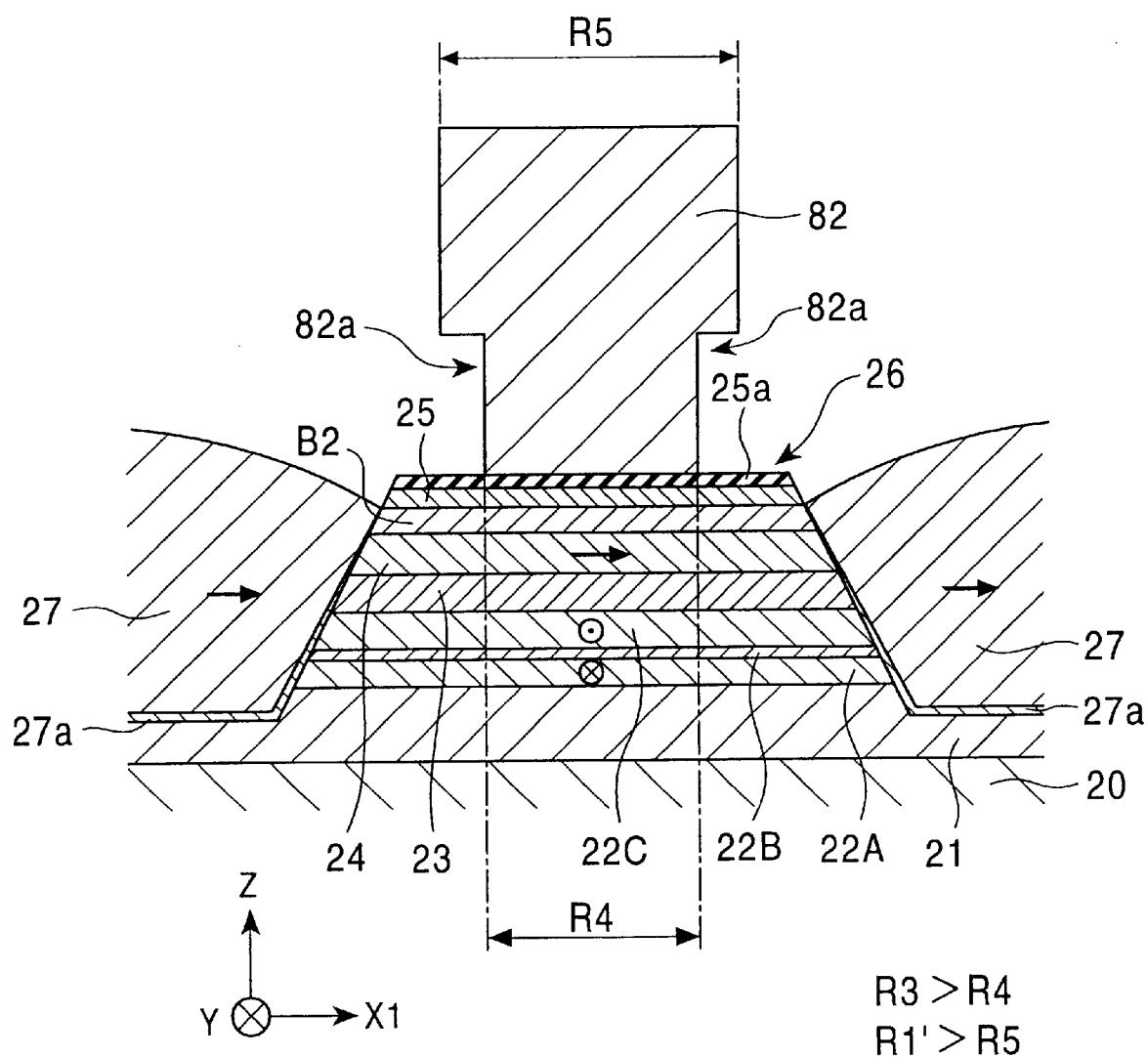
FIG. 11 is a sectional front view illustrating a method of manufacturing a spin valve thin film magnetic element in accordance with the second embodiment of the invention.

In FIG. 10, the first lift off resist 70 is removed with a resist separating solution. In FIG. 11, the second lift off resist or photoresist 82 is formed on the lamination 26.

In FIG. 11, the photoresist 82 contacts the lamination 26 with the width dimension R4 in the track width direction (the X1 direction shown in FIG. 11). The photoresist 82 covers the lamination 16 with the width dimension R5 in the track width direction (the X1 direction shown in FIG. 11). The resist layer 82 has notch portions 82a formed on the lower side.

The second lift off resist 82 is provided to be located at the center of the lamination 26 in the track width direction. As a result, the length dimensions of the right and left overlay portions 28a (See FIG. 13) in the track width direction, are set to be the same.

The difference between the width dimensions R4 and R5, (i.e., the difference between the width dimensions in the track width direction), may be set to define the length of extension of one of the electrode layers on the lamination 26, which extends to the surface of the lamination toward the other electrode layer 28, i.e., the dimension of each of the overlay portions 28a in the track width direction, or the overlay length. The magnetic track width dimension of the spin valve thin film element may be set by the width dimension R4.

Figure 12:
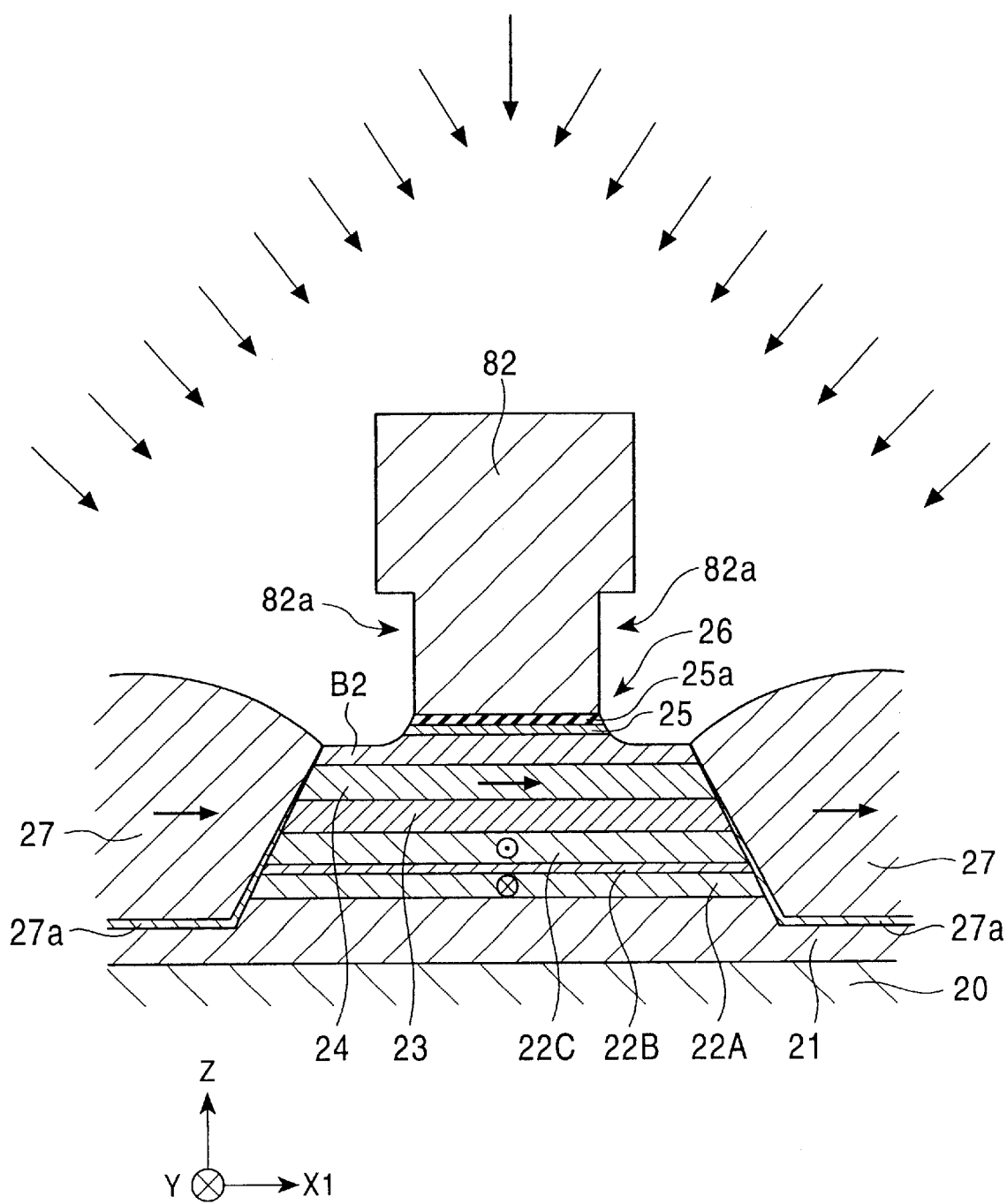
FIG. 12 is a sectional front view illustrating a method of manufacturing a spin valve thin film magnetic element in accordance with the second embodiment of the invention.

In FIG. 12, the portions of the surface of the lamination 26, which are not covered with the second lift off resist 82, are removed obliquely to the lamination 16 by ion milling with Ar, reverse sputtering, or the like. As a result, the oxide layer 25a, the protecting layer 25 and the backed layer B2 are partly removed to form portions of direct contact between the electrode layers 28 and the lamination 26.

Figure 13:
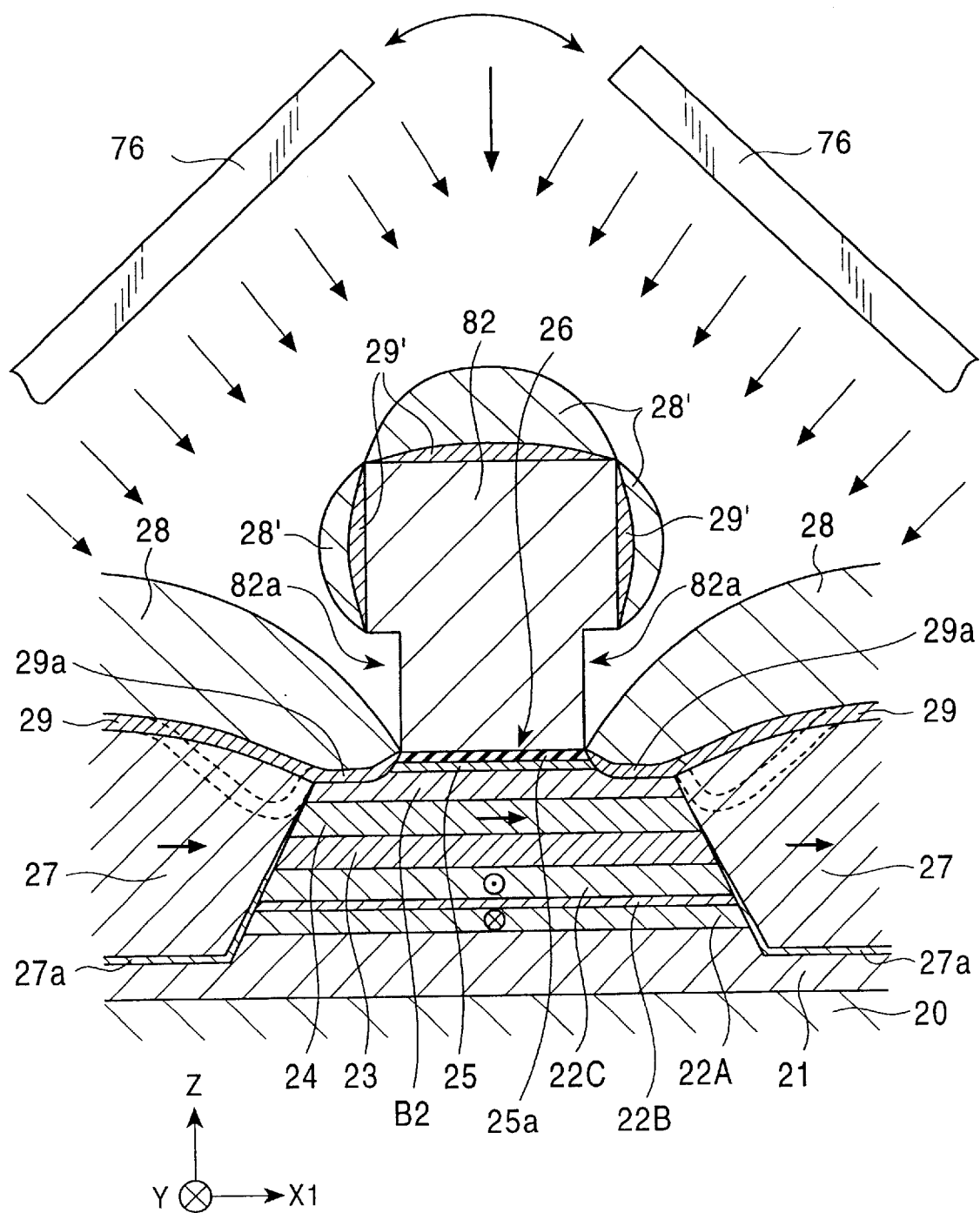
FIG. 13. is a sectional front view illustrating a method of manufacturing a spin valve thin film magnetic element in accordance with the second embodiment of the invention.

In FIG. 13, the intermediate layers 29 of Ta are deposited on the hard bias layers 27 by ion beam sputtering or the like.

At the same time, the continued portions 29a continued from the intermediate layers 29 are deposited on the exposed portions of the backed layer B2.

Similarly, the electrode layers 28 of Cr are deposited on the intermediate layers 29 and the continued portions 29a by epitaxial growth.

In FIG. 13, layers 29' and 28' having the same compositions as the intermediate layers 29 and the electrode layers 28, respectively, are also formed on the resist 82.

The photoresist 82 shown in FIG. 13 is removed by lift off using a resist separating solution to complete the spin valve thin film magnetic element shown in FIG. 7 in which the intermediate layers 29 and the electrode layers 28 are formed to extend to the dead regions of the lamination 26.

In this embodiment, the dimension of each of the overlay portions 28a in the track width direction may be set in the range of about 0.1 $\mu$m through about 0.5 $\mu$m by setting the difference between the dimensions R1' and R5 of the first lift off resist 70 and second lift off resist 82 in the widthwise direction of the lamination 26 (the track width direction) in the range of about 0.2 $\mu$m through about 1.0 $\mu$m, i.e., setting the difference (R1'-R5) between the width dimensions of each side portions of the resists 70 and 82 in the track width direction in the range of about 0.1 $\mu$m through 0.5 $\mu$m.

When the dimension of each of the overlay portions 28a in the track width direction is set to less than about 0.1 $\mu$m, sufficient alignment precision may not be obtained in formation of the second lift off resist 82. The right and left overlay portions 28a may not be easily formed in an equal length with high reproducibility, thus causing variations in off track properties. When the dimension of each of the overlay portions 28a in the track width direction is set to about 0.5 $\mu$m or more, the probability of causing error due to side reading of adjacent tracks is undesirably increased.

The width dimension ((R5-R4)/2) of each of the notch portions 82a of the second lift off resist 82 in the widthwise direction of the lamination 26, which do not contact the lamination 26, may be set in the range of about 0.01 $\mu$m through about 0.10 $\mu$m on the basis of the width dimension R5 of the second lift off resist 82 in the widthwise direction of the lamination 26. This permits lift off of the resist 82, and setting of the length dimension of the overlay portions 28a.

The lamination 26 and the hard bias layers 27 may be formed using each of the lift off resists 70 and 82 twice. On the laminated film 26', the lift off resists 70 and 82 may have different width dimensions and notch portions formed. The intermediate layers 29 and the electrode layers 28 may be formed in the desired shapes by any one or a combination of ion beam sputtering, long slow sputtering, collimation sputtering or the like. The target 76 may be opposed to the substrate 10 in a state the target 76 is selectively inclined or not inclined at an angle with the substrate 20, to easily obtain the spin valve thin film element.

In this embodiment, the length of each of the overlay portions 28a of the electrode layers 28 may be set to be long in comparison with the manufacturing method of the first embodiment comprising one step of forming the photoresist 72. In addition, the overlay portions 28a may be formed regardless of the width dimension of each of the notch portions 82a in the track width direction. The thickness dimension of the overlay portions 28a, particularly, the thickness dimension of the tip portions through which the sensing current flows into the lamination 26, may be set to a great value, thus further preventing the occurrence of side reading.

Third Embodiment

A method of manufacturing a spin valve thin film magnetic element according to a third embodiment of the invention, and a thin film magnetic head comprising a spin valve thin film magnetic element is described below with reference to the drawings.

Figure 14:
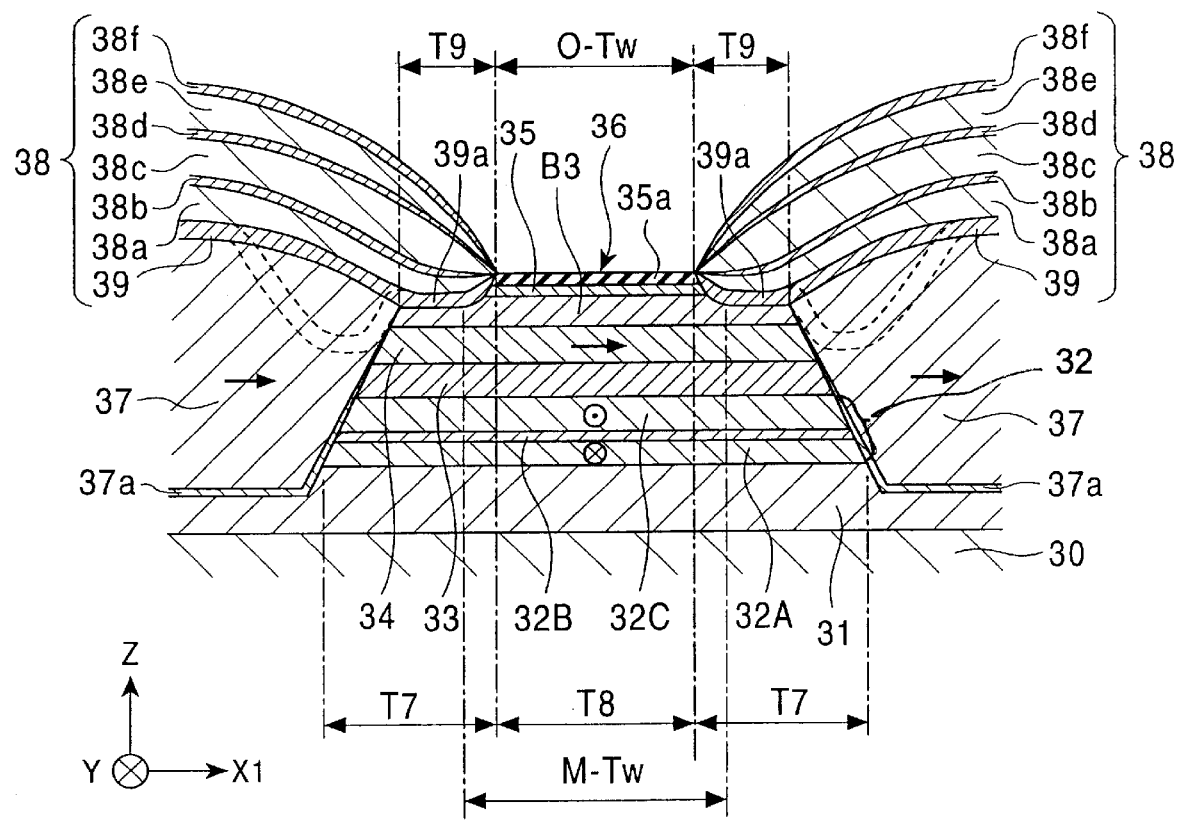
FIG. 14 is a sectional view of a spin valve thin film magnetic element in accordance with a third embodiment of the invention, as viewed from the side facing a recording medium.

FIG. 14 is a sectional view of a spin valve thin film element according to a third embodiment of the invention, as viewed from the side facing a recording medium.

The spin valve thin film element of this embodiment is also the bottom type synthetic-ferri-pinned single spin valve thin film element that is different from the second embodiment shown in FIGS. 7 to 13 with respect to electrode layers 38 and the manufacturing method.

In FIG. 14, antiferromagnetic layer 31 is provided on a substrate 30. A pinned magnetic layer 32 is formed on the antiferromagnetic layer 31.

The pinned magnetic layer 32 includes a first pinned magnetic layer 32A and a second pinned magnetic layer 32C formed on the first pinned magnetic layer 32A. A nonmagnetic intermediate layer 32B is provided between the first and second pinned magnetic layer 32A and 32C. The magnetization direction of the second pinned layer 32C is oriented in antiparallel with the magnetization direction of the first pinned magnetic layer 32A.

Furthermore, a nonmagnetic conductive layer 33 made of Cu or the like is formed on the second pinned magnetic layer 32C, and a free magnetic layer 34 is formed on the nonmagnetic conductive layer 33. A backed layer B3 is formed on the free magnetic layer 34. A protecting layer 35 made of Ta or the like is formed on the backed layer B3. The protecting layer 35 comprises an oxide layer 35a made of tantalum oxide (Ta-oxide) formed on the upper side of the protecting layer 35.

In FIG. 14, the layers ranging from a portion of the antiferromagnetic layer 31 to the oxide layer 35a constitute a lamination 36 having a substantially trapezoidal sectional form.

Hard bias layers 37 are formed on the portions of the antiferromagnetic layer 31, which extend to both sides of the lamination 36. The hard bias layers 37a are provided between the antiferromagnetic layer 31 and the lamination 36. Electrode layers 38 are formed on the hard bias layers 37. Intermediate layers 39 of Ta are provided between the electrode layers 38 and the hard bias layers 37.

In this embodiment, the antiferromagnetic layer 31, the first pinned magnetic layer 32A, the nonmagnetic intermediate layer 32B, the second pinned magnetic layer 32C, the nonmagnetic conductive layer 33, the free magnetic layer 34, the protecting layer 35, the lamination 36, the hard bias layers 37, the electrode layers 38, the overlay portions 38a, and the intermediate layers 39 correspond to the antiferromagnetic layer 21, the first pinned magnetic layer 22A, the nonmagnetic intermediate layer 22B, the second pinned magnetic layer 22C, the nonmagnetic conductive layer 23, the free magnetic layer 24, the protecting layer 25, the lamination 26, the hard bias layers 27, the electrode layers 28, the overlay portions 28a, and the intermediate layers 29, respectively, of the second embodiment shown in FIGS. 7 to 13.

Each of the electrode layers 38 may comprise a multilayer film of Au and Ta having a structure in which gold electrode layers 38a, 38c and 38e and tantalum electrode layers 38b, 38d, and 38f are alternatively laminated. The gold electrode layers 38a, 38c, and 38e each having a flat portion of about 500 angstroms thick. The tantalum electrode layers 38b, 38d, and 38f each have a thickness of about 50 angstroms.

The spin valve thin film element of this embodiment exhibits the same effect as the spin valve thin film element of the second embodiment shown in FIGS. 7 to 13. Each of the electrode layers 28 comprises Au/Ta multilayer film. The use of Au having lower resistance than Cr, or the like may decrease the resistance value of the electrode layers 38, thus decreasing the DC resistance value and improving the rate of change in resistance (ΔR/R).

By interposing Ta between the Au layers, it is possible to prevent the phenomenon of smearing. Au of the electrode layers 38 is extended through polishing, grinding, or cutting to cause an electrical short circuit with a shield layer.

The method of manufacturing the spin valve thin film element of this embodiment is the same as the method of manufacturing the spin valve thin film element of the second embodiment shown in FIGS. 7 to 13. In forming the electrode layers 28 shown in FIG. 13, targets comprising Au and Ta are used in place of the target 76 comprising Cr to form the electrode layers 38.

Fourth Embodiment

A method of manufacturing a spin valve thin film magnetic element according to a fourth embodiment of the invention, and a thin film magnetic head comprising a spin valve thin film magnetic element will be described below with reference to the drawings.

Figure 15:
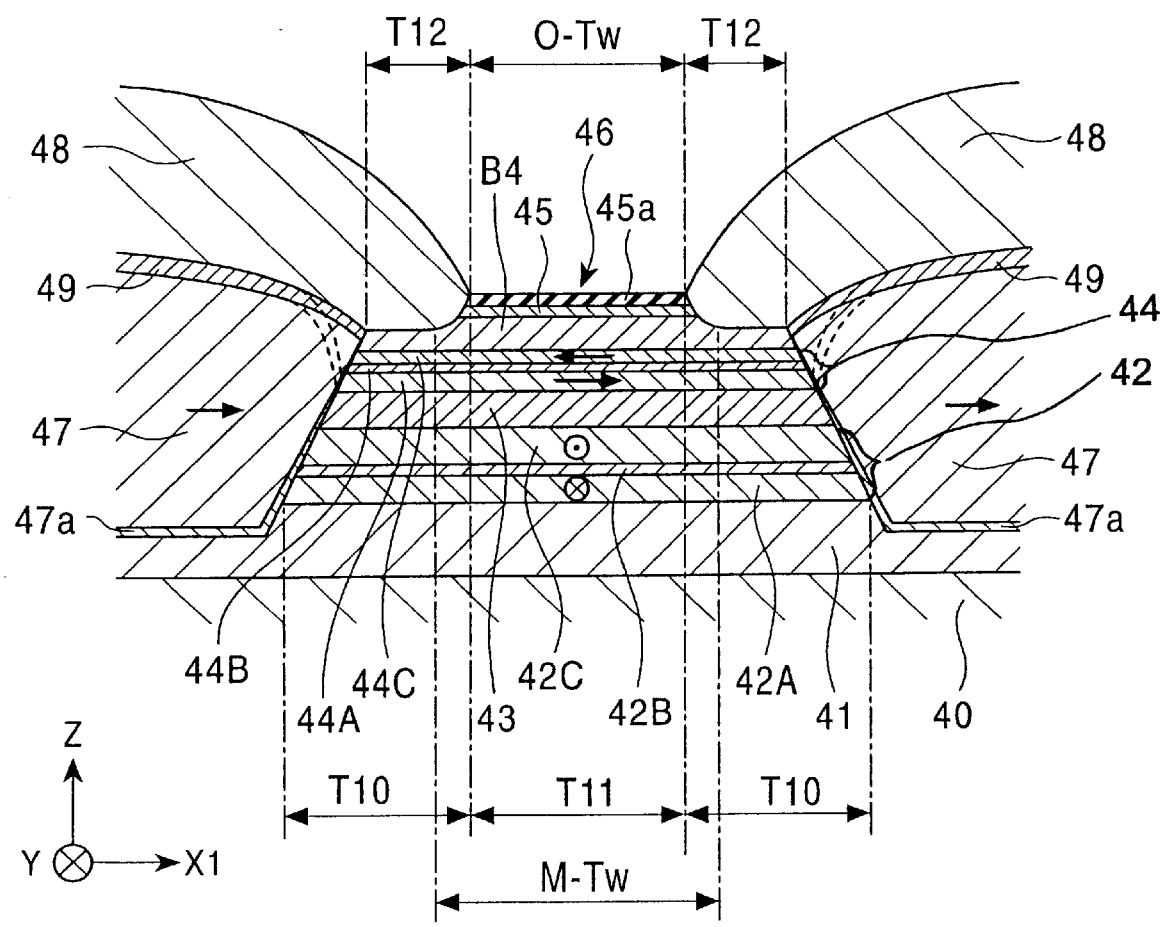
FIG. 15 is a sectional view of a spin valve thin film magnetic element in accordance with a fourth embodiment of the invention, as viewed from the side facing a recording medium.

FIG. 15 is a sectional view illustrating the structure of a spin valve thin film element according to the fourth embodiment of the invention, as viewed from the side facing a recording medium.

The spin valve thin film element of this embodiment is also the bottom type synthetic-ferri-pinned single spin valve thin film element, which is different from the first embodiment shown in FIGS. 1 to 6 with respect to a synthetic-ferri-free type free magnetic layer.

In FIG. 15, an antiferromagnetic layer 41 is provided on a substrate 40. A pinned magnetic layer 42 is formed on the antiferromagnetic layer 41.

The pinned magnetic layer 42 includes a first pinned magnetic layer 42A and a second pinned magnetic layer 42C formed on the first pinned magnetic layer 42A. A first nonmagnetic intermediate layer 42B is provided between the first and second pinned magnetic layer 42A and 42C. The magnetization direction of the second pinned layer 42C is oriented in antiparallel with the magnetization direction of the first pinned magnetic layer 42A.

A nonmagnetic conductive layer 43 made of Cu or the like is formed on the second pinned magnetic layer 42C. A free magnetic layer 44 is formed on the nonmagnetic conductive layer 43. The free magnetic layer 44 is divided into a first free magnetic layer 44A and a second free magnetic layer 44C. A second nonmagnetic intermediate layer 44B is provided between the first and second free magnetic layers 44A and 44C. The magnetization directions of the first and second free magnetic layers 44A and 44C are about 180° different in a ferromagnetic state. A backed layer B4 is formed on the second free magnetic layer 44C. A protecting layer 45 made of Ta or the like is formed on the backed layer B4. The protecting layer 45 comprises an oxide layer 45a made of tantalum oxide (Ta-oxide) formed on the upper side.

As shown in FIG. 15, the layers ranging from a portion of the antiferromagnetic layer 41 to the oxide layer 45a constitute a lamination 46 having a substantially trapezoidal sectional form.

Hard bias layers 47 are formed on the portions of the antiferromagnetic layer 41, which extend to both sides of the lamination 46. Bias base layers 47a are provided between the hard bias layer 47 and the antiferromagnetic layer 41. Electrode layers 48 are formed on the hard bias layers 47. Intermediate layers 49 of Ta are provided between the hard bias layers 47 and the electrode layer 48.

In this embodiment, the antiferromagnetic layer 41, the first pinned magnetic layer 42A, the nonmagnetic intermediate layer 42B, the second pinned magnetic layer 42C, the nonmagnetic conductive layer 43, the protecting layer 45, the lamination 46, the hard bias layers 47, the electrode layers 48, the overlay portions 48a, and the intermediate layers 49 correspond to the antiferromagnetic layer 11, the first pinned magnetic layer 12A, the nonmagnetic intermediate layer 12B, the second pinned magnetic layer 12C, the nonmagnetic conductive layer 13, the protecting layer 15, the lamination 16, the hard bias layers 17, the electrode layers 18, the overlay portions 18a, and the intermediate layers 19, respectively, of the first embodiment shown in FIGS. 1 to 6.

Similar to in the case described above based on FIG. 20 in which the backed layer B1 is provided in the first embodiment, the nonmagnetic intermediate layer 44B and the second free magnetic layer 44C shift the central position of the sensing current J flow to the free magnetic layer side to weaken the sensing current magnetic field $H_j$ in the free magnetic layer. A synthetic-ferri-free type structure may be formed, in which the backed layer B4 is omitted.

Each of the first and second free magnetic layers 44A and 44C in one aspect comprises the same material as the free magnetic layer 14 of the first embodiment. The nonmagnetic intermediate layer 44B is one aspect comprises an alloy of at least one of Ru, Rh, Ir, Cr, Re, and Cu.

Each of the first and second free magnetic layers 44A and 44C may be made of a NiFe alloy, a CoFe alloy, a CoNiFe alloy, or the like. The first and second free magnetic layers 44A and 44C may have different thickness.

Each of the first and second free magnetic layers 44A and 44C may comprise two layers. A Co layer may be formed on each of the sides of the first and second free magnetic layers 44A and 44C, which contact the nonmagnetic intermediate layer 44B and the backed layer B4. By forming a Co layer on the side in contact with the nonmagnetic conductive layer 43, the rate of change in resistance can be increased, and diffusion to the nonmagnetic intermediate layer 44B and the backed layer B4 can be prevented.

In the free magnetic layer, the magnetization direction of the first free magnetic layer 44A is pinned in the X1 direction shown in FIG. 15 by a magnetic flux of the hard bias layers 47. The magnetization direction of the second free magnetic layer 44C is pinned in the direction opposite to the X1 direction. The second free magnetic layer 44C is magnetically coupled with the first free magnetic layer 44A by an exchange coupling magnetic field (RKKY interaction) to be magnetized in the direction opposite to the X1 direction shown in FIG. 15. The magnetizations of the first and second free magnetic layers 44A and 44C are freely reversed by the influence of an external magnetic field while maintaining the ferrimagnetic state.

When the thickness of the first free magnetic layer 44A is greater than that of the second free magnetic layer 44C, the magnetic moment of the first free magnetic layer 44C is greater than that of the second free magnetic layer 44C. The magnetic moment of the first free magnetic layer 44C may be represented by the product of the magnitude of magnetization and the layer thickness. Therefore, as a whole, the magnetization of the free magnetic layer is oriented in the direction of synthetic moment of the magnetic moments of the first and second free magnetic layers 44A and 44C, (i.e., the X1 direction shown in FIG. 15).

The thickness of the first free magnetic layer 44A which contributes to GMR may be increased, as compared with a free magnetic single layer, preventing the output characteristics from deteriorating due to a decrease in thickness. It is also possible to decrease the synthetic magnetic moment of the whole free magnetic layer, and thus improve the responsiveness of rotation of the magnetization direction with the external magnetic field applied, increasing the rate of change in resistance, (i.e., improving the sensitivity to a magnetic field).

The spin valve thin film element of this embodiment exhibits the same effect as the spin valve thin film element of the first embodiment shown in FIGS. 1 to 6. The spin valve thin film element is also the synthetic-ferri-free spin valve type. A high rate of change in resistance ($\Delta R/R$) may be obtained.

The method of manufacturing the spin valve thin film element of this embodiment is the same as the method of manufacturing the spin valve thin film element of the first embodiment shown in FIGS. 1 to 6, or the method of manufacturing the spin valve thin film element of the second embodiment shown in FIGS. 7 to 13. In forming the lamination 16 shown in FIG. 2, the free magnetic layer may be divided into the first and second free magnetic layers 44A and 44C. The nonmagnetic intermediate layer 44C may be provided between the first and second free magnetic layers 44A and 44C.

Fifth Embodiment

A method of manufacturing a spin valve thin film magnetic element according to a fifth embodiment of the invention, and a thin film magnetic head comprising a spin valve thin film magnetic element is described below with reference to the drawings.

Figure 16:
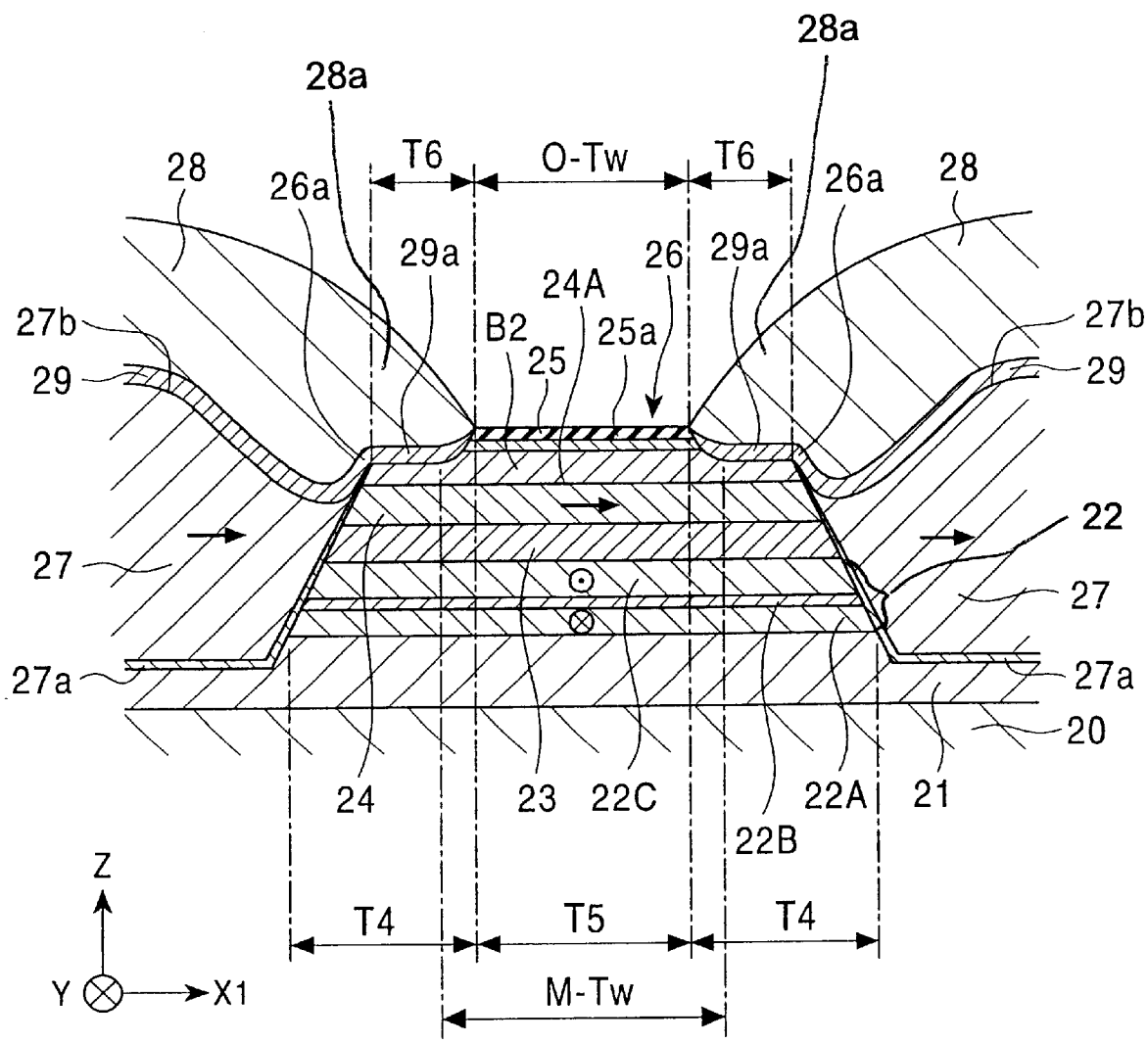
FIG. 16 is a sectional view of a spin valve thin film magnetic element in accordance with a fifth embodiment of the invention, as viewed from the side facing a recording medium.

FIG. 16 is a sectional view of a spin valve thin film element according to a fifth embodiment of the invention, as viewed from the side facing a recording medium.

The spin valve thin film element of this embodiment is also the bottom type synthetic-ferri-pinned single spin valve thin film element, which is different from the second embodiment shown in FIGS. 7 to 13 with respect to hard bias layers 27. In FIG. 16, the same portions as those of the second embodiment shown in FIGS. 7 to 13 are denoted by the same reference numerals.

In FIG. 16, reference numerals 27 each denote a hard bias layer, and reference numerals 28 each denote an electrode layer.

Hard bias layers 27 are formed on the portions of the antiferromagnetic layer 21, which extend to both sides of the lamination 26. Bias base layers 27a are provided between the antiferromagnetic layer 21 and the hard bias layer 27. Electrode layers 28 are formed on the hard bias layers 27. Intermediate layers 29 of Ta or Cr are provided between the hard bias layers 27 and the electrode layers 28.

The electrode layers 28 are extended to the exposed portions of the backed layer B2 at the top of the lamination 26. The electrode layers 28 form the overlay portions 28a that are connected to the backed layer B2. The intermediate layer portions 29a are provided between the overlay portions 28a and the backed layer B2.

In one aspect, the hard bias layers 27 are arranged at the same layer position as the free magnetic layer 24. The hard bias layers have a thickness greater than that of the free magnetic layer 24 in the thickness direction of the free magnetic layer 24. The upper surfaces 27b of the hard bias layers 27 are arranged farther away from the substrate 20 (on the upper side of FIG. 16) than the upper surface 24A of the free magnetic layer 24. The lower surfaces of the hard bias layers 27 are arranged nearer the substrate 20 (i.e., on the lower side of FIG. 16) than the lower surface of the free magnetic layer 24.

In one aspect, the junction points between the upper surfaces 27b of the hard bias layers 27 and the sides of the lamination 26 are located at positions nearer (on the lower side in FIG. 16) the substrate 20 than the upper surface 24A of the free magnetic layer 24, and lower than the highest positions (in the example shown in FIG. 16, both side ends of the upper surfaces 27b of the hard bias layers 27) of the hard bias layers 27 at a distance from the lamination 26.

As a result, flux control of a magnetic field applied to the free magnetic layer 24 from the hard bias layers 27 occurs. A leakage magnetic field from the hard bias layers 27 is absorbed less by an upper shield layer or the like formed above the lamination 26 to prevent a decrease in the effective magnetic field applied to the free magnetic layer 24. Also, the magnetic domain of the free magnetic layer is disturbed less by a reverse magnetic field acting on both ends of the free magnetic layer from hard bias layers which overhang the backed layer. Therefore, the free magnetic layer 24 may be easily put into a single magnetic domain state, permitting sufficient domain control of the free magnetic layer 24.

The spin valve thin film element of this embodiment exhibits the same effect as the spin valve thin film element of the second embodiment shown in FIGS. 7 to 13. The free magnetic layer 24 may be easily put into a single magnetic domain state, thereby further decreasing the occurrence of Barkhausen noise.

Figure 17:
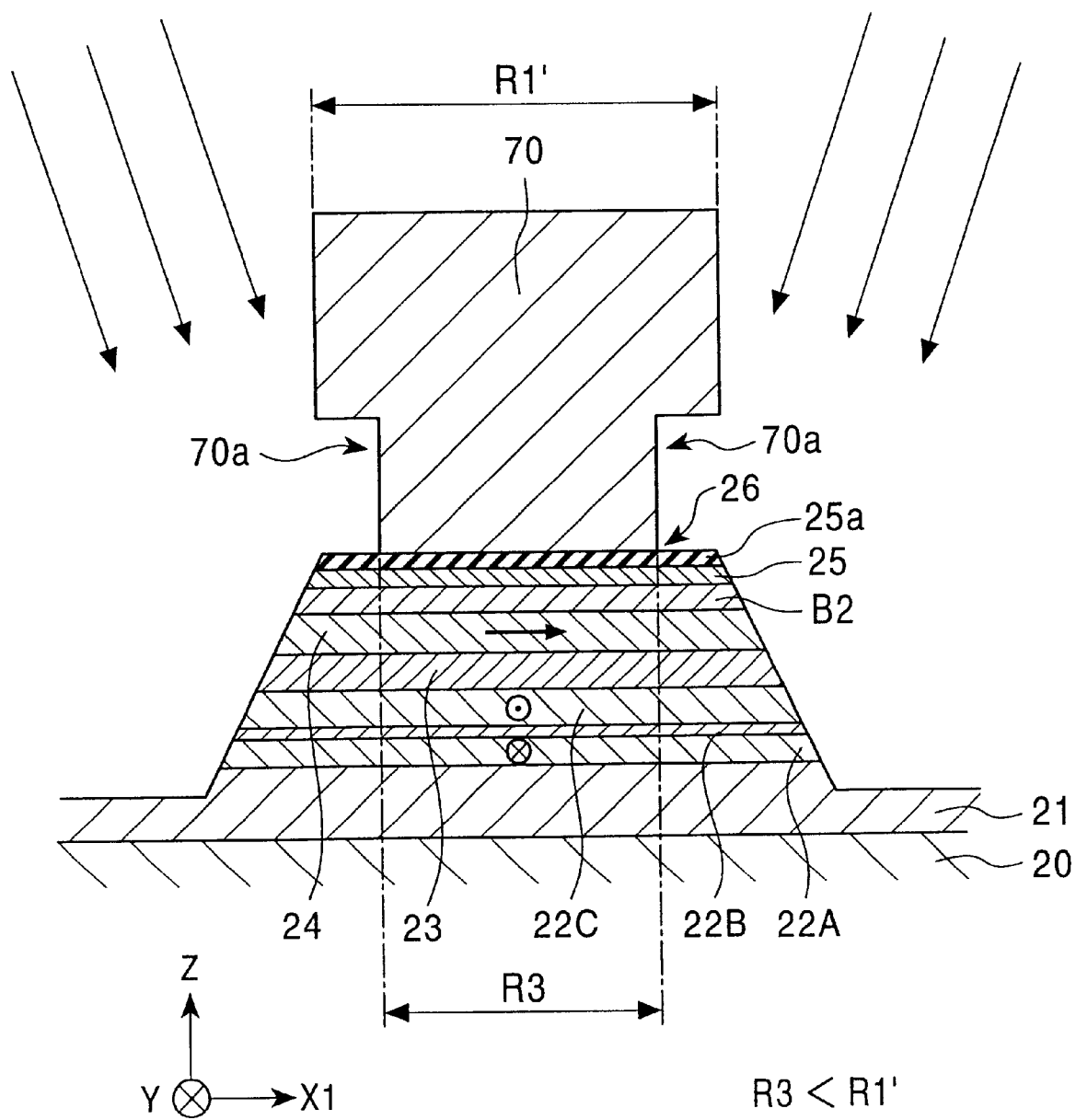
FIG. 17 is a sectional front view illustrating a method of manufacturing a spin valve thin film magnetic element in accordance with the fifth embodiment of the invention.

FIG. 17 is a sectional front view illustrating a method of manufacturing the spin valve thin film element of this embodiment.

The method of manufacturing a spin valve thin film element of this embodiment is the same as the method of manufacturing a spin valve thin film element of the second embodiment shown in FIGS. 7 to 13. In the second embodiment, the incident ion beams in ion milling are substantially perpendicular to the substrate 20 as shown in FIG. 8. The incident sputtered particles to be deposited in formation of the hard bias layers 27 are substantially perpendicular to the substrate 20, as shown in FIG. 9. However, in this embodiment, ion beams in ion milling are inclined to shift the formation position of the lamination 26 to the central side of the resist 70 (inward in the track width direction), as shown in FIG. 17. Similar to the second embodiment, the incident sputtered particles to be deposited in formation of the hard bias layers 27 are substantially perpendicular to the substrate 20. Under these conditions, the junction positions between the hard bias layers 27 and the sides of the lamination 26 may be moved to the substrate side.

In the fourth embodiment shown in FIG. 15, the junction points between the upper surfaces 47b of the hard bias layers 47 and the sides of the lamination 46 may be located at positions nearer (on the lower side in FIG. 15) the substrate 20 than the upper surface 44A of the free magnetic layer 44, and lower than the highest positions (in the example shown in FIG. 15, both side ends of the upper surfaces 47b of the hard bias layers 47) of the hard bias layers 47 at a distance from the lamination 46.

As a result, the free magnetic layer may be more easily put into a single magnetic domain state.

A thin film magnetic head of the invention is described below.

Figure 22:
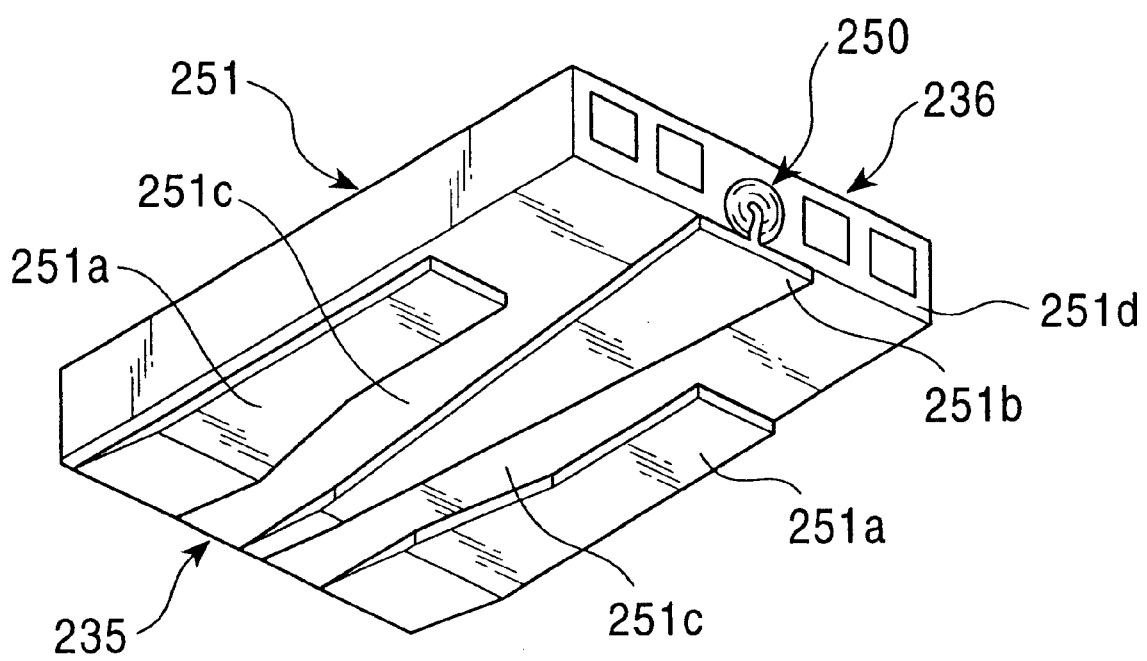
FIG. 22 is a perspective view of a thin film magnetic head of the present invention.

FIG. 22 is a perspective view showing a thin film magnetic head of the invention.

The thin film magnetic head is a floating type that is mounted on a magnetic recording medium such as a hard disk device, or the like. A slider 251 of the thin film magnetic head has a leading side 235 on the upstream side in the movement direction of the disk plane and a trailing side 236. The slider 251 forms a floating surface having rails—rails 251a and 251b and air grooves 251c are formed on an ABS air bearing surface (ABS) facing the disk.

In addition, a magnetic core 250 is provided on an end surface 251d on the trailing side 236 of the slider 251.

Figure 23:
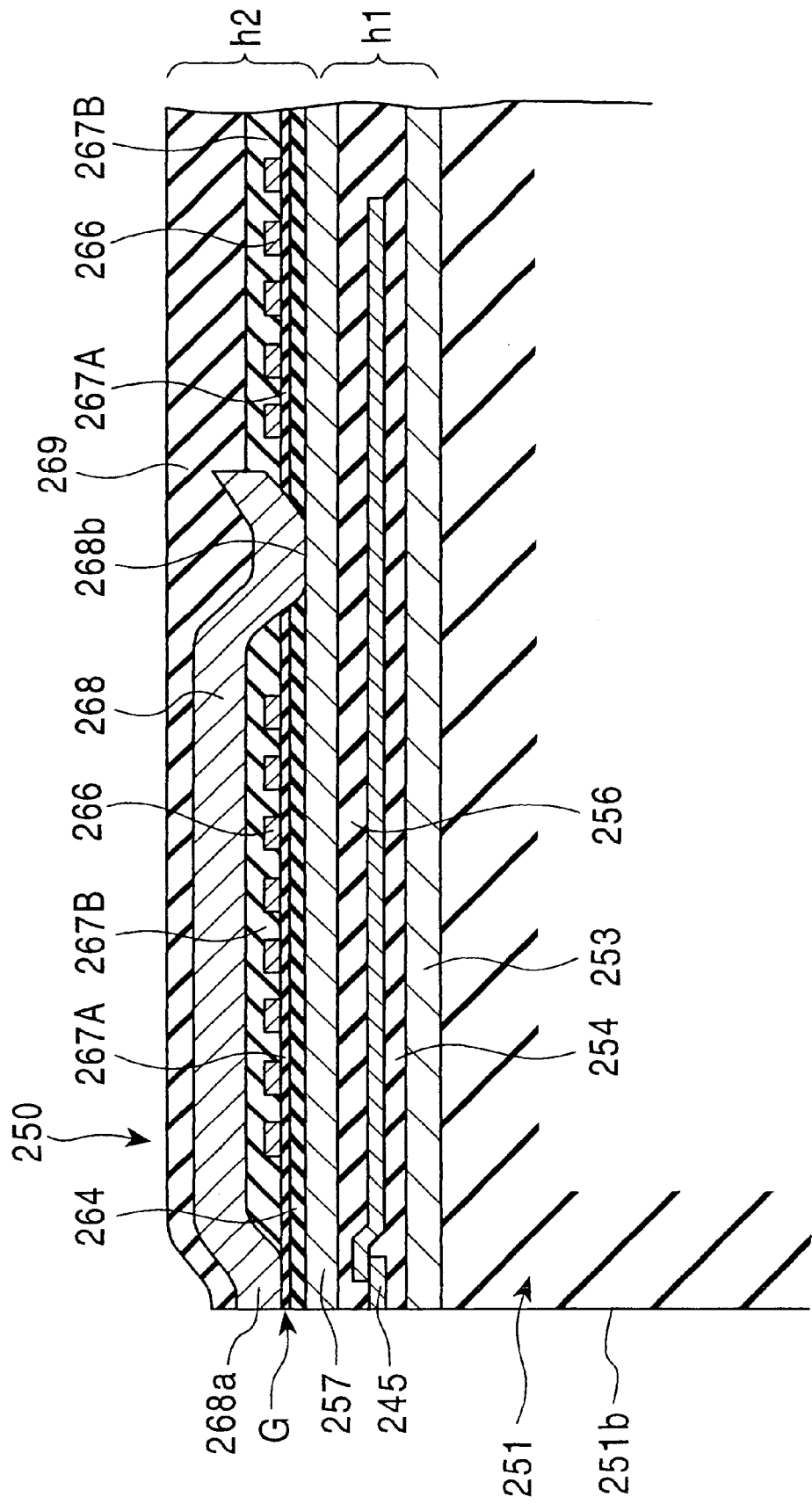
FIG. 23 is a sectional view of a magnetic core portion of the thin film magnetic head shown in FIG. 22.
Figure 24:
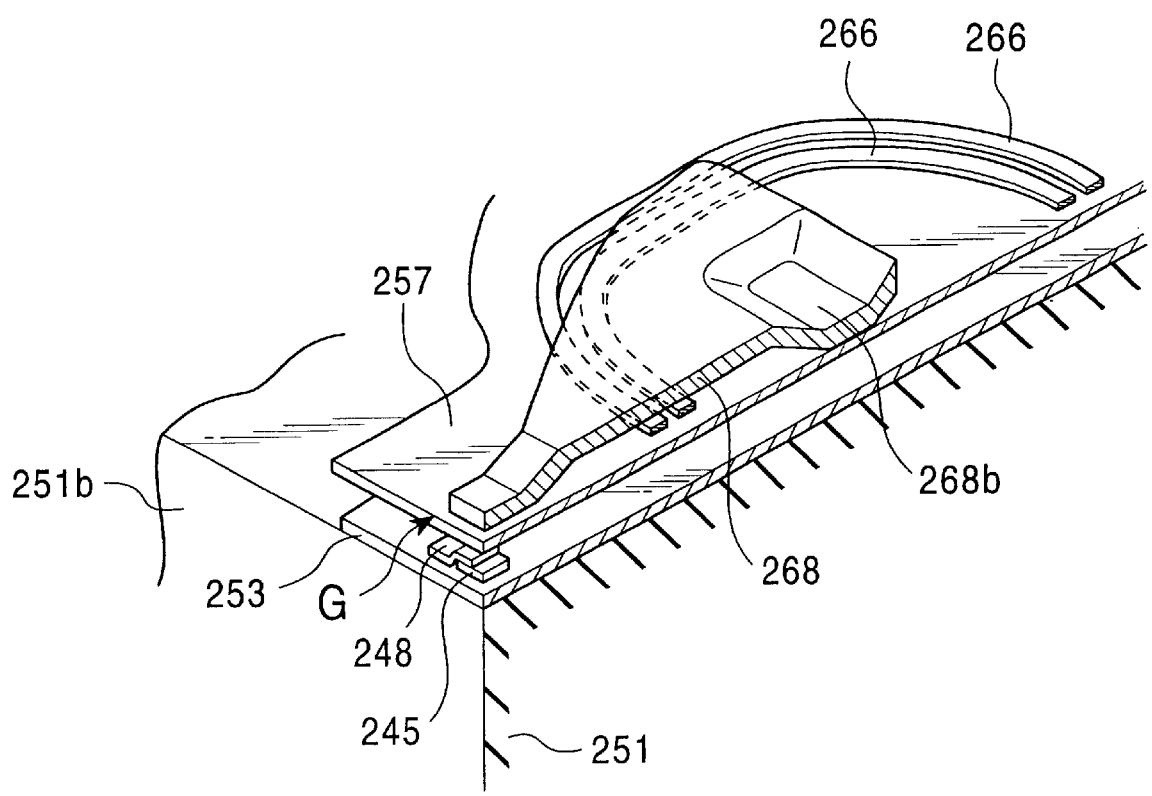
FIG. 24 is a schematic perspective view of the thin film magnetic head shown in FIG. 23.

In one aspect, the magnetic core 250 comprises a combination magnetic head having the structure shown in FIGS. 23 and 24. A MR head (read head) h1 and an inductive head (write head) h2 are laminated in turn on the trailing side end surface 251d of the slider 251.

In one aspect, the MR head h1 comprises a lower shield layer 253 and a lower gap layer 254. The lower shield layer 253 is made of a magnetic alloy and is formed on the trailing side 236 of the slider 251 serving as a substrate. The lower gap layer 254 is formed on the lower shield layer 253. A magnetoresistive element layer 245 is laminated on the lower gap layer 254. An upper gap layer 256 is formed on the magnetoresistive element layer 245. An upper shield layer 257 is formed on the upper gap layer 256. The upper shield layer 257 also is used as a lower core layer of the inductive head h2.

In the MR head h1, the resistance of the magnetoresistive element layer 245 is changed by the presence of a leakage magnetic field from the magnetic recording medium such as the disk of a hard disk device. The recording contents of the recording medium are read by reading the change in resistance.

In one aspect, the magnetoresistive element layer 245 provided in the MR head h1 comprises the above-described spin valve thin film element.

The spin valve thin film element is most important for constituting the thin film magnetic head (reproducing head).

The inductive head h2 comprises a gap layer 264 formed on the lower core layer 257, and a coil layer 266 formed in a spiral planar pattern on the gap layer 264. The coil layer 266 is surrounded by first and second insulating material layers 267A and 267B. The pole tip 268a of an upper core layer 268 formed on the second insulating material layer 267B is opposed to the lower core layer 257. A magnetic gap G is provided between the upper and lower core layers 268 and 257 along an air bearing surface (ABS) 251b. The base end 268b of the upper core layer 268 is magnetically connected to the lower core layer 257, as shown in FIGS. 23 and 24.

Furthermore, a protecting layer 269 made of alumina is provided on the upper core layer 268.

In the inductive head h2, a recording current is supplied to the coil layer 266 to apply a recording magnetic field to the upper and lower core layers 268 and 257 from the coil layer 266. The inductive head h2 records magnetic signals on the magnetic recording medium such as the hard disk or the like by using a leakage magnetic field from the magnetic gap G between the lower core layer 257 and the pole tip of the upper core layer 268.

In manufacturing a thin film magnetic head of the invention, the lower gap layer 254 is formed on the lower shield layer 253 made of a magnetic material as shown in FIG. 23. The spin valve thin film element, which formed the magnetoresistive element layer 245, is then deposited. Then, the upper shield layer 257 is formed on the spin valve thin film element 245. The upper gap layer 256 is provided between the upper shield layer 257 and the spin valve thin film element 245 to complete the MR head (read head) h1.

Then, the gap layer 264 is formed on the lower core layer 257 serving as the upper shield layer 257 of the MR head h1. The spiral coil layer 266 is formed on the gap layer 264 and is surrounded by the first and second insulating material layers 267A and 267B. The upper core layer 268 is formed on the second insulating material layer 267B. The protecting layer 269 is provided on the upper core layer 268 to obtain the thin film magnetic head.

The thus-obtained thin film magnetic head is a thin film magnetic head comprising the above-described spin valve thin film element, and thus exhibits excellent heat resistance and reliability, and small asymmetry.

The constructions of the slider and the inductive head of the thin film magnetic head are not limited to those shown in FIGS. 22 to 24. Sliders and inductive heads having various structures may be used.

EXAMPLES

In a spin valve thin film element of the invention, improvement in asymmetry due to the formation of the backed layer, and the relations between the track width and the electrode layer overlay portions and the ratio of reproduced output/effective reproducing track width and noise were measured.

The spin valve thin film magnetic element used in experiment was the spin valve thin film magnetic element of the second embodiment shown in FIG. 7.

The track width dimension O-Tw shown in FIG. 7 was about 0.5 μm. The width T6 dimension of each of the overlay portions was about 0.5 μm.

The thickness of each of the layers of the lamination was set from below as follows:

Ta30/PtMn150/Co20/Ru8/Co25/Cu*27/Co5/NiFe30/Cu20/Ta2 0 (each of the numerals corresponds to the thickness of each layer by angstrom)

In the spin valve thin film magnetic element, asymmetry was measured by changing the magnitude of the sensing current supplied from the electrode layers.

Figure 25A:
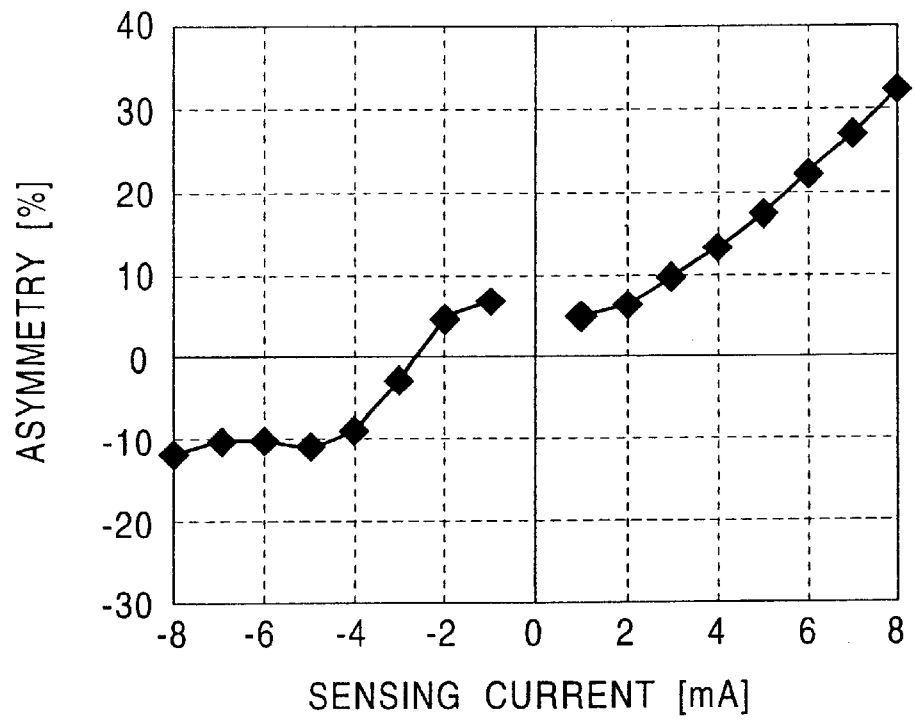
Figure 25B:
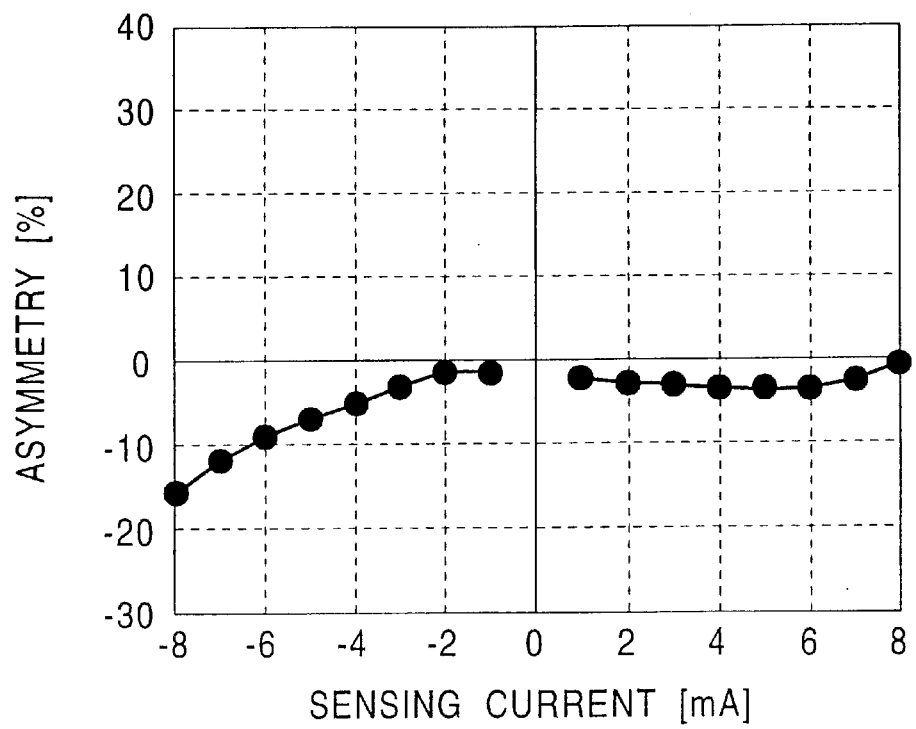
FIG. 25(b) shows and example of the invention.

The results are shown in FIG. 25B.

On the other hand, a spin valve thin film magnetic element of a comparative example different in that the backed layer (Cu*) was not provided, as schematically shown in FIG. 20(a), was produced. Asymmetry was measured by changing the sensing current supplied from the electrode layers.

The results are shown in FIG. 25A.

FIGS. 25A and 25B indicate that asymmetry is decreased by the presence of the backed layer. With a sensing current of about 5 mA in an actual operation state, the comparative example shows an asymmetry of about 15%. With a similar sensing current of about 5 MA, the asymmetry of the element of the invention was about −3%.

Next, a plurality of spin valve thin film magnetic elements having different element heights were formed. The ratio of reproduced output/effective reproducing track width of each of the elements was measured. The element height represents the width dimension of the sensitive region in the Y direction shown in FIG. 7.

A plurality of spin valve thin film magnetic elements of a comparative example having different element heights and comprising electrode layers having no overlay portion, as schematically shown in FIG. 26 were formed. The ratio of reproduced output/effective reproducing track width of each of the elements was measured.

Figure 27:
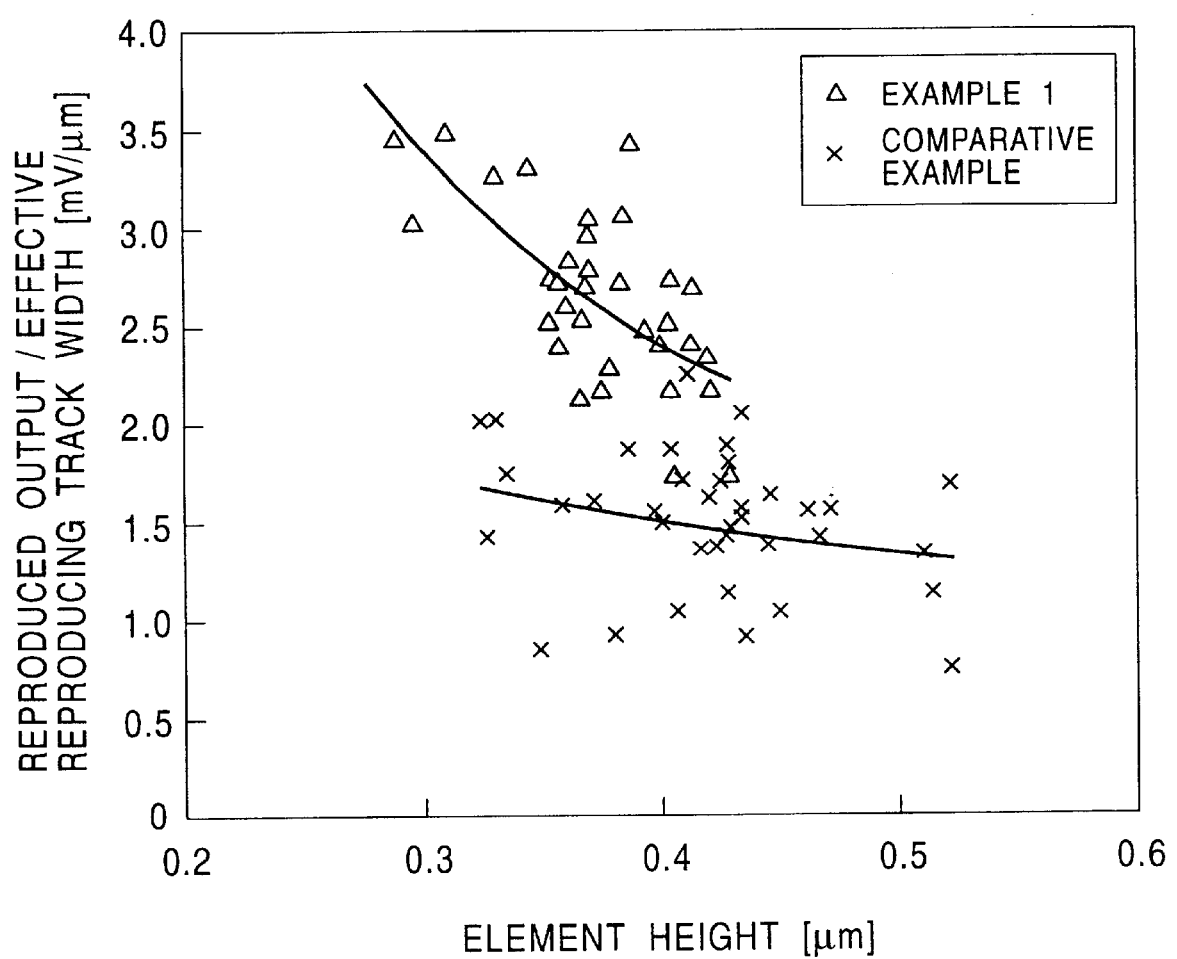
FIG. 27 is a graph showing the relation between the element height and the ration of reproduced output/effective reproducing track width of a spin valve thin film magnetic element of the invention.

The results are shown in FIG. 27.

FIG. 27 indicates that by proving the electrode layer overlay portions, the ratio of reproduced output/effective reproducing track width is improved. With an element height of about 0.4 μm, the output obtained in the element of the invention is about 1.6 times the comparative example.

In the example of the invention and the comparative example, reproduced output was measured by the micro track profile technique. The results are shown in FIGS. 28A and 28B.

Figure 28A:
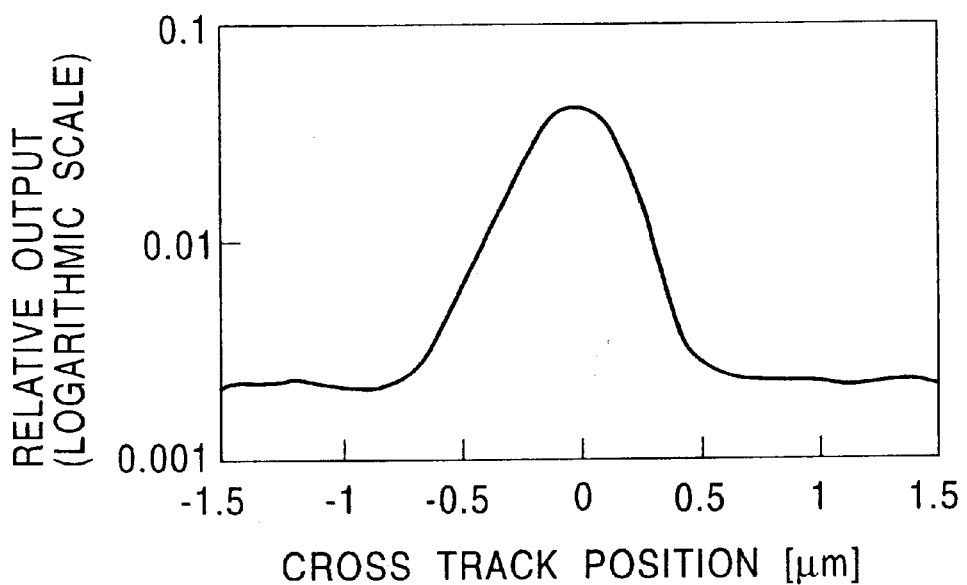
Figure 28B:
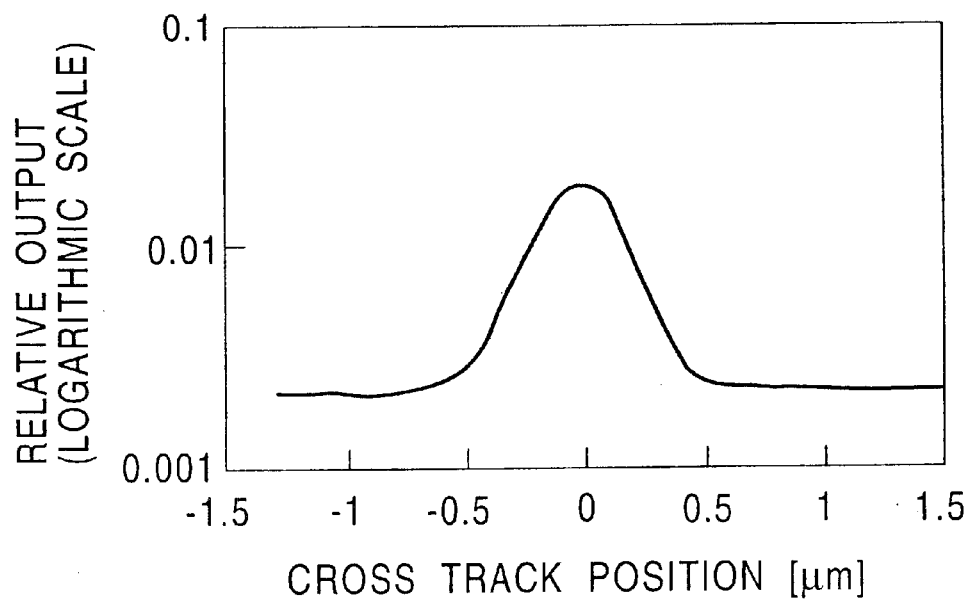

FIGS. 28A and 28B indicate that output is substantially obtained at a cross track position of about 0±0.5 μm without the overlay portions. Output equal to the base is obtained at a cross track position of about −0.5 μm or less, and about 0.5 μm or more with the overlay portions. Namely, the positions of the electrode layers substantially coincide with the positions of the sensitive regions and the dead regions. It is also found that the effective reproducing track width is about 0.6 μm.

Comparison between the example of the invention shown in FIG. 28A and the comparative example shown in FIG. 28B reveals that the maximum output based on the base output is relatively increased in the example of the invention.

It is thus found that in the invention, the DC resistance value may be decreased, no noise due to side reading caused by reading adjacent track signals occurs in reproduced output. The ratio of reproduced output/effective track width is significantly improved.

While the arrangement of the layers in the spin valve thin film element has been described in several embodiments, the layers may be operatively connected in other fashions as long as the required electrical, mechanical, and magnetic properties of a spin valve are achieved. They may have one or more additional layers between any or all of them.

The spin valve thin film magnetic element and the method of manufacturing the same of the invention, and the thin film magnetic head comprising the spin valve thin film magnetic element exhibit the following effects.

(1) In an electrode overlay type element in which the electrode layers are extended to the spin valve lamination, the lamination is the synthetic-ferri-pinned type. The demagnetizing (dipole) magnetic field due to pinned magnetization of the pinned magnetic layer may be canceled by counteraction between the magnetostatic coupling magnetic fields of first and second pinned magnetic layers. Therefore, the contribution of the demagnetizing (dipole) magnetic field due to pinned magnetization of the pinned magnetic layer, which influences the direction of variable magnetization of a free magnetic layer, may be decreased.

(2) By adding a backed layer to the above construction in part (1), the contribution of a sensing current magnetic field due to a sensing current to the variable magnetization of the free magnetic layer may be decreased.

(3) The contributions of the demagnetizing (dipole) magnetic field due to pinned magnetization of the pinned magnetic layer, and the sensing current magnetic field due to the sensing current to the variable magnetization of the free magnetic layer may be decreased to obtain an excellent spin valve thin film element having small asymmetry.

(4) As described above in parts (1) through (3), the contribution of the sensing current magnetic field to the variable magnetization of the free magnetic layer is decreased so that the magnetization direction of the free magnetic layer may be made substantially the same in both electrode overlay portions and the element central portion without the overlay portions. Therefore, the free magnetic layer may be easily put into a single magnetic domain state, to prevent the occurrence of Barkhausen noise or the like, and to improve the stability of reproduced waveforms.

(5) By providing the backed layer, the mean free path of +spin electrons contributing to the magnetoresistive effect may be lengthened. A high rate of change in resistance (ΔR/R) may be obtained in the spin valve thin film element due to the spin filter effect, thereby making adaptable to high density recording.

(6) In the "electrode overlay type" element in which the electrode layers are extended to the spin valve lamination, the lamination is the bottom type spin valve lamination. The shut component of the sensing current flowing directly into the lower portion of the lamination through hard bias layers may be decreased. Therefore, side reading may be prevented. The element may be made adaptable to a higher magnetic recording density, particularly, a higher track density.

(7) The electrode layers may be extended to the lamination and connected to the backed layer to decrease contact resistance, and decrease the DC resistance value, thereby improving the rate of change in resistance (ΔR/R).

(8) The electrode layers may be formed on intermediate layers to decrease the resistivity value of the electrode layers, thereby improving the rate of change in resistance (ΔR/R).

(9) Each of the electrode layers may comprise a multi-layer film formed by alternately laminating hard Ta or W, thereby preventing smearing in which Au of the electrode layers is extended during subsequent polishing, grinding, or cutting.

(10) A connection state between the hard bias layers and the lamination may be set so that a stronger bias magnetic field may be easily applied to the free magnetic layer. The free magnetic layer may be easily put into a single magnetic domain state, thereby further decreasing the occurrence of Barkhausen noise.

(11) The electrode layers may be extended to the dead regions, but not formed in the sensitive regions, or may be extended to the sensitive region so that the effective track width is defined by the distance between the electrode layers. It is thus possible to prevent a decrease in reproduced output due to the presence of the dead regions in the effective track region, which are due to the hard bias magnetic field.

(12) The lamination, the hard bias layers, and the electrode layers may be formed in desired shapes by forming one photoresist by the sputtering method using a target opposed to a substrate in a state in which the target is selectively inclined or not inclined at an angle with the substrate, thereby easily obtaining the spin valve thin film element by a small number of steps.

(13) The lamination and the hard bias layers may be formed by the two resist steps of forming two times lift off resists having different width dimensions and notch portions formed therein. The electrode layers may be formed in a desired shape by any one or a combination of ion beam sputtering, long slow sputtering, collimation sputtering, and the like. A target may be opposed to a substrate in a state in which the target is selectively inclined or not inclined at an angle with the substrate, thereby easily obtaining the spin valve thin film element by a small number of steps.

(14) The width dimensions of each of the notch portions, or the difference between the width dimensions of first and second photoresists may be set to set the length dimension of the extension of each of the electrode layers which are formed to extend to the surface of the lamination toward the central portion thereof from both sides.

(15) The step of removing portions of the surface of the lamination, which correspond to the notch portions of the lift off resist of the second lift off resist, and the portions covered with the second photoresist, may be done by ion milling or reverse sputtering after the step of forming the hard bias layers, so that the protecting layer and the backed layer at the top of the lamination are cleaned by ion milling or reverse sputtering to obtain sufficient connection between the electrode layers and the backed layer, this decreasing contact resistance. Alternatively, intermediate layers of Ta may be provided between the backed layer and the electrode layers. In use of Cr for the electrode layers, Cr may be epitaxially grown on Ta to form the electrode layers, thereby further decreasing the electric resistance value.

Various embodiments of the invention have been described and illustrated. However, the description and illustrations are by way of example only. Many more embodiments and implementations are possible within the scope of this invention and will be apparent to those of ordinary skill in the art therefore, the invention is not limited to the specific details, representative embodiments, and illustrated examples in this description. Accordingly, the invention is not to be restricted except in light as necessitated by the accompanying claims and their equivalents.

What is claimed is:

1. A spin valve thin film element comprising:
   an antiferromagnetic layer formed on a substrate;
   a pinned magnetic layer operatively disposed to have an exchange coupling magnetic field with the antiferromagnetic layer, where the pinned magnetic layer comprises a first pinned magnetic layer formed in contact with the antiferromagnetic layer so that the magnetization direction of the first pinned magnetic layer is pinned by an exchange coupling magnetic field with the antiferromagnetic layer;
   a nonmagnetic intermediate layer disposed adjacent to the pinned magnetic layer, where the nonmagnetic intermediate layer is formed between the first pinned magnetic layer and a second pinned magnetic layer, where the magnetization direction of the second pinned magnetic layer is oriented in antiparallel with the magnetization direction of the first pinned magnetic layer;
   a free magnetic layer disposed adjacent to the nonmagnetic conductive layer, where the magnetization direction of the free magnetic layer is oriented in a direction crossing the magnetization direction of the pinned magnetic layer, where the nonmagnetic conductive layer is formed between the second pinned magnetic layer and the free magnetic layer, where the magnetization direction of the free magnetic layer is oriented in a direction crossing the magnetization direction of the second pinned magnetic layer;
   a backed layer operatively connected to a side of the free magnetic layer opposite to the nonmagnetic conductive layer side, where the backed layer comprises a nonmagnetic conductive material and is formed in contact with a side of the free magnetic layer opposite to the nonmagnetic conductive layer side;
   hard bias layers formed on both sides of a lamination comprising at least the antiferromagnetic layer, the first and second pinned magnetic layers, the nonmagnetic conductive layer, the free magnetic layer, and the backed layer, where the hard bias layers orient the magnetization direction of the free magnetic layer in a direction crossing the magnetization direction of the pinned magnetic layers; and
   electrode layers formed on the hard bias layers, where the electrode layers supply a sensing current to the lamination, where the electrode layers are formed to extend from both sides of the lamination to the central portion of a surface of the lamination.

2. A spin valve thin film element according to claim 1, wherein an extension length of one of the electrode layers on both sides of the lamination which extend to the central portion of the surface of the lamination is set in the range of about 0.1 $\mu$m through about 0.5 $\mu$m.

3. A thin film magnetic head comprising a spin valve thin film magnetic element according to claim 2.

4. A spin valve thin film element according to claim 1, wherein an extension length of one of the electrode layers on both sides of the lamination which extend to the central portion of the surface of the lamination is set in the range of about 0.03 $\mu$m through about 0.10 $\mu$m.

5. A thin film magnetic head comprising a spin valve thin film magnetic element according to claim 4.

6. A spin valve thin film element according to claim 1, where the lamination is formed by laminating in turn the antiferromagnetic layer, the first pinned magnetic layer, the nonmagnetic intermediate layer, the second pinned layer, the nonmagnetic conductive layer, the free magnetic layer, and the backed layer on the substrate.

7. A thin film magnetic head comprising a spin valve thin film magnetic element according to claim 6.

8. A spin valve thin film element according to claim 1, wherein the backed layer comprises a material selected from Au, Ag, and Cu.

9. A thin film magnetic head comprising a spin valve thin film magnetic element according to claim 8.

10. A spin valve thin film element according to claim 1, wherein a protecting layer made of Ta is formed on a surface of the backed layer.

11. A thin film magnetic head comprising a spin valve thin film magnetic element according to claim 10.

12. A spin valve thin film element according to claim 1, wherein an intermediate layer is provided between the backed layer and the hard bias layers, the intermediate layer comprising one of Ta and Cr.

13. A thin film magnetic head comprising a spin valve thin film magnetic element according to claim 12.

14. A spin valve thin film element according to claim 1, wherein an intermediate layer is provided between the backed layer and the electrode layers, the intermediate layer comprising one of Ta and Cr.

15. A thin film magnetic head comprising a spin valve thin film magnetic element according to claim 14.

16. A spin valve thin film element according to claim 1, wherein an intermediate layer is provided between the hard bias layers and the electrode layers, the intermediate layer comprising one of Ta and Cr.

17. A thin film magnetic head comprising a spin valve thin film magne element according to claim 16.

18. A spin valve thin film element according to claim 1, wherein each of the electrode layers comprises a film having at least one layer, wherein the film is made of at least one element selected from Cr, Au, Ta, and W.

19. A thin film magnetic head comprising a spin valve thin film magnetic element according to claim 18.

20. A spin valve thin film element according to claim 1, where each of the electrode layers comprises a multilayer film formed by alternately depositing Au and one of Ta and W.

21. A thin film magnetic head comprising a spin valve thin film magnetic element according to claim 20.

22. A spin valve thin film element according to claim 1, where the hard bias layers are arranged at the same layer position as the free magnetic layer on the substrate, and where upper surfaces of the hard bias layers are joined to the sides of the lamination at positions nearer the substrate than upper edges of the sides of the lamination.

23. A thin film magnetic head comprising a spin valve thin film magnetic element according to claim 22.

24. A spin valve thin film element according to claim 22, where the upper surfaces of the hard bias layers are joined to the sides of the lamination at positions between upper and lower surfaces of the free magnetic layer.

25. A thin film magnetic head comprising a spin valve thin film magnetic element according to claim 24.

26. A spin valve thin film element according to claim 1, where the antiferromagnetic layer comprises an X—Mn alloy, where X represents an element selected from Pt, Pd, Ir, Rh, Ru, and Os.

27. A thin film magnetic head comprising a spin valve thin film magnetic element according to claim 26.

28. A spin valve thin film element according to claim 1, where the antiferromagnetic layer comprises a Pt—Mn—X' alloy, where X' represents at least one element selected from Pd, Cr, Ru, Ni, Ir, Rh, Os, Au, Ag, Ne, Ar, Xe, and Kr.

29. A thin film magnetic head comprising a spin valve thin film magnetic element according to claim 28.

30. A spin valve thin film element according to claim 1, where the free magnetic layer is divided into two layers, where the nonmagnetic intermediate layer is provided between the two layers, and where the two layers are brought into a ferrimagnetic state in which the magnetization directions of the two layers are about 180° different.

31. A thin film magnetic head comprising a spin valve thin film magnetic element according to claim 30.

32. A spin valve thin film element according to claim 1, where the lamination comprises a sensitive region in a central portion, where the sensitive region has excellent reproduction sensitivity and substantially exhibits a magnetoresistive effect, where the lamination comprises dead regions on both sides of the sensitive region, where the dead regions have poor reproduction sensitivity and substantially no magnetoresistive effect and where the electrode layers are formed to extend to the dead regions of the lamination and adhere to the surface of the lamination.

33. A thin film magnetic head comprising a spin valve thin film magnetic element according to claim 1.

34. A spin valve thin film element comprising:
  an antiferromagnetic layer comprising a Pt—Mn—X' alloy, where X' represents at least one element selected from Pd, Cr, Ru, Ni, Ir, Rh, Os, Au, Ag, Ne, Ar, Xe, and Kr;
  a pinned magnetic layer operatively disposed to have an exchange coupling magnetic field with the antiferromagnetic layer;
  a nonmagnetic conductive layer disposed adjacent to the pinned magnetic layer;
  a free magnetic layer disposed adjacent to the nonmagnetic conductive layer, where the magnetization direction of the free magnetic layer is oriented in a direction crossing the magnetization direction of the pinned magnetic layer; and
  a backed layer operatively connected to a side of the free magnetic layer opposite to the nonmagnetic conductive layer side.

35. A spin valve thin film element according to claim 34, where Pt+X' is in the range of about 37 atomic % through about 63 atomic %.

36. A spin valve thin film element according to claim 34, where Pt+X' is in the range of about 47 atomic % through about 57 atomic %.

37. A spin valve thin film element according to claim 34, where X' is in the range of about 0.2 atomic % through about 10 atomic %.

38. A spin valve thin film element according to claim 34, where the free magnetic layer comprises:

a first free magnetic layer;
  a second free magnetic layer; and
  a nonmagnetic intermediate layer disposed between the two layers, and
  where the first and second free magnetic layers have a ferrimagnetic state.

39. A spin valve thin film element according to claim 38, where the magnetization directions of the first and second free magnetic layers are about 180° different.

40. A spin valve thin film element according to claim 34, further comprising:
  the pinned magnetic layer comprising a first pinned magnetic layer operatively disposed to have a first magnetization direction pinned by an exchange coupling magnetic field with the antiferromagnetic layer;
  a first nonmagnetic intermediate layer disposed adjacent to the first pinned magnetic layer;
  a second pinned magnetic layer operatively disposed to have a second magnetization direction oriented in anti-parallel with the first magnetization direction;
  the nonmagnetic conductive layer disposed adjacent to the second pinned magnetic layer;
  the free magnetic layer comprising a first free magnetic layer operatively disposed to orient a third magnetization direction of the first free magnetic layer in a direction crossing the first and second magnetization directions;
  a second nonmagnetic intermediate layer disposed adjacent to the first free magnetic layer;
  a second free magnetic layer operatively disposed to form a ferrimagnetic state with the second free magnetic layer; and
  the backed layer operatively connected to the second free magnetic layer on an opposite side from the nonmagnetic conductive layer side.

41. A spin valve thin film element according to claim 40, where the thickness ratio of the first and second pinned magnetic layers is configured to maintain a thermally stable ferrimagnetic state between the first and second pinned magnetic layers.

42. A spin valve thin film element according to claim 40, where the backed layer has a protecting layer.

43. A spin valve thin film element according to claim 42, where the protecting layer has an oxide layer.

44. A spin valve thin film element according to claim 40, further comprising hard bias layers operatively disposed adjacent to the first and second free magnetic layers.

45. A spin valve thin film element according to claim 44, further comprising at least one intermediate layer provided between the backed layer and the hard bias layers.

46. A spin valve thin film element according to claim 44, further comprising electrode layers operatively disposed on the hard bias layers.

47. A spin valve thin film element according to claim 46, where at least one electrode layer comprises a film having at least one layer.

48. A spin valve thin film element according to claim 47, where at least one hard bias layer is arranged at the same layer position as the first and second free magnetic layers, and
  where at least one upper surface of the at least one hard bias layer is operatively connected between upper and lower surfaces of the free magnetic layer.

49. A spin valve thin film element according to claim 47, further comprising:
  a sensitive region in a central portion of a surface of the backed layer, where the sensitive region has excellent reproduction sensitivity and substantially exhibits a magnetoresistive effect; and at least one dead region on a side of the sensitive region, where at least one dead region has poor reproduction sensitivity and substantially no magnetoresistive effect.

50. A spin valve thin film element according to claim 49, where the sensitive region and the at least one dead region extends through the antiferromagnetic layer, the first and second pinned magnetic layers, the first and second nonmagnetic intermediate layers, the nonmagnetic conductive layer, and the first and second free magnetic layers.

51. A spin valve thin film element according to claim 49, where the electrode layers extend to the dead regions and adhere to the surface of the backed layer.

52. A spin valve thin film element according to claim 46, further comprising at least one intermediate layer provided between the electrode layers and one of the backed layer and the hard bias layers.

53. A spin valve thin film element comprising:
an antiferromagnetic layer;
a pinned magnetic layer operatively disposed to have an exchange coupling magnetic field with the antiferromagnetic layer;
a nonmagnetic conductive layer disposed adjacent to the pinned magnetic layer;
a free magnetic layer disposed adjacent to the nonmagnetic conductive layer, where the magnetization direction of the free magnetic layer is oriented in a direction crossing the magnetization direction of the pinned magnetic layer; and
a backed layer operatively connected to a side of the free magnetic layer opposite to the nonmagnetic conductive layer side, where the backed layer has a protecting layer, where the protecting layer comprises tantalum and tantalum oxide.

54. A spin valve thin film element comprising:
an antiferromagnetic layer;
a pinned magnetic layer operatively disposed to have an exchange coupling magnetic field with the antiferromagnetic layer;
a nonmagnetic conductive layer disposed adjacent to the pinned magnetic layer;
a free magnetic layer disposed adjacent to the nonmagnetic conductive layer, where the magnetization direction of the free magnetic layer is oriented in a direction crossing the magnetization direction of the pinned magnetic layer; and
a backed layer operatively connected to a side of the free magnetic layer opposite to the nonmagnetic conductive layer side;
hard bias layers operatively disposed adjacent to the free magnetic layer, the hard bias layers to orient the magnetization direction of the free magnetic layer in a direction crossing the magnetization direction of the pinned magnetic layer; and
at least one intermediate layer provided between the backed layer and the hard bias layers, the intermediate layer comprising one of Ta and Cr.

55. A spin valve thin film element comprising:
an antiferromagnetic layer;
a pinned magnetic layer operatively disposed to have an exchange coupling magnetic field with the antiferromagnetic layer;
a nonmagnetic conductive layer disposed adjacent to the pinned magnetic layer;
a free magnetic layer disposed adjacent to the nonmagnetic conductive layer, where the magnetization direction of the free magnetic layer is oriented in a direction crossing the magnetization direction of the pinned magnetic layer; and
a backed layer operatively connected to a side of the free magnetic layer opposite to the nonmagnetic conductive layer side;
hard bias layers operatively disposed adjacent to the free magnetic layer, the hard bias layers to orient the magnetization direction of the free magnetic layer in a direction crossing the magnetization direction of the pinned magnetic layer; and
electrode layers operatively disposed on the hard bias layers, the electrode layers to supply a sensing current;
where the antiferromagnetic layer, the pinned magnetic layer, the nonmagnetic conductive layer, the free magnetic layer, and the backed layer form a lamination, and
where the electrode layers extend from both sides of the lamination to a central portion of a surface of the lamination.

56. A spin valve thin film element according to claim 55, where at least one electrode layer has an extension length less than about 0.5 $\mu$m.

57. A spin valve thin film element according to claim 56, where the at least one electrode layer has an extension length in the range of about 0.1 $\mu$m through about 0.5 $\mu$m.

58. A spin valve thin film element according to claim 56, where the at least one electrode layer has an extension length in the range of about 0.03 $\mu$m through about 0.10 $\mu$m.

59. A spin valve thin film element according to claim 55, where at least one electrode layer comprises a multilayer film formed by alternately depositing Au and one of Ta and W.

60. A spin valve thin film element according to claim 55, further comprising at least one intermediate layer provided between the electrode layers and one of the backed layer and the hard bias layers, the intermediate layer comprising one of Ta and Cr.

61. A spin valve thin film element according to claim 60, where the at least one intermediate layer comprises Ta, and where at least one electrode layer comprises Cr grown epitaxially on the at least one intermediate layer.

62. A spin valve thin film element according to claim 55,
where at least one hard bias layer is arranged at the same layer position as the free magnetic layer, and
where at least one upper surface of the hard bias layers is joined to at least one side of the lamination at a junction point nearer the antiferromagnetic layer than an upper edge of the at least one side.

63. A spin valve thin film element according to claim 62, where the junction point is between upper and lower surfaces of the free magnetic layer.

64. A spin valve thin film element according to claim 55, where the lamination comprises:
a sensitive region in a central portion of the lamination, where the sensitive region has excellent reproduction sensitivity and substantially exhibits a magnetoresistive effect; and
at least one dead region on a side of the sensitive region, where the dead regions have poor reproduction sensitivity and substantially no magnetoresistive effect.

65. A spin valve thin film element according to claim 64, where the electrode layers extend to the dead regions of the lamination and adhere to the surface of the lamination.

* * * * *